US011898553B2

(12) United States Patent
Byrne et al.

(10) Patent No.: US 11,898,553 B2
(45) Date of Patent: Feb. 13, 2024

(54) POWER END FRAME ASSEMBLY FOR RECIPROCATING PUMP

(71) Applicant: SPM Oil & Gas Inc., Fort Worth, TX (US)

(72) Inventors: Joseph H. Byrne, Hudson Oaks, TX (US); Chandu Kumar, Fort Worth, TX (US); Kourosh Momenkhani, Dallas, TX (US); Jacob A. Bayyouk, Richardson, TX (US); Sean P. Moran, York, PA (US); Donald Keith Plemons, Fort Worth, TX (US); William Walter Marshall, IV, Pipe Creek, TX (US); Christopher B. Buckley, Tomball, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 495 days.

(21) Appl. No.: 16/424,173

(22) Filed: May 28, 2019

(65) Prior Publication Data

US 2019/0277341 A1 Sep. 12, 2019

Related U.S. Application Data

(63) Continuation of application No. 14/808,513, filed on Jul. 24, 2015, now Pat. No. 10,393,182.
(Continued)

(51) Int. Cl.
*F16C 35/04* (2006.01)
*F04B 19/22* (2006.01)
(Continued)

(52) U.S. Cl.
CPC .......... *F04B 53/006* (2013.01); *F04B 39/128* (2013.01); *F04B 53/16* (2013.01);
(Continued)

(58) Field of Classification Search
CPC ........ F04B 53/22; F04B 53/006; F04B 53/16; F04B 53/162; F04B 53/14; F04B 19/22;
(Continued)

(56) References Cited

U.S. PATENT DOCUMENTS 364,627 A 6/1887 Arnold
879,560 A 2/1908 Lepley
(Continued)

FOREIGN PATENT DOCUMENTS

BR 8700642 8/1988
CA 2486126 10/2005
(Continued)

OTHER PUBLICATIONS

Canadian Office Action dated Jul. 12, 2019 in Application No. 2,955,673, 9 pages.
(Continued)

*Primary Examiner* — Nkeisha Smith
(74) *Attorney, Agent, or Firm* — Foley & Lardner LLP

(57) ABSTRACT

A plate segment for a reciprocating pump power end frame assembly, the power end frame assembly having a pair of end plate segments and at least one middle plate segment disposed between the end plate segments. The plate segment consists of the middle plate segment or one of the pair of end plate segments and includes a plate having a front wall, a rear wall, a top wall, a bottom wall and a pair of sidewalls and at least one opening forming a bearing support surface, the opening extending through the plate. The plate segment further includes at least one extension extending from at least one of the sidewalls of the plate at a position to align with and contact a corresponding extension on an adjacently positioned plate.

13 Claims, 57 Drawing Sheets

Related U.S. Application Data

(60) Provisional application No. 62/155,793, filed on May 1, 2015, provisional application No. 62/095,689, filed on Dec. 22, 2014, provisional application No. 62/029,271, filed on Jul. 25, 2014.

(51) Int. Cl.

| | |
|---|---|
| *F04B 37/00* | (2006.01) |
| *F04B 53/00* | (2006.01) |
| *F04B 53/22* | (2006.01) |
| *F04B 39/12* | (2006.01) |
| *F16C 9/02* | (2006.01) |
| *F16C 35/067* | (2006.01) |
| *F04B 53/16* | (2006.01) |
| *F04B 7/00* | (2006.01) |
| *F04B 9/02* | (2006.01) |
| *B21K 1/26* | (2006.01) |
| *F04B 53/14* | (2006.01) |

(52) U.S. Cl.
CPC .............. *F04B 53/22* (2013.01); *F16C 9/02* (2013.01); *F16C 35/067* (2013.01); *B21K 1/26* (2013.01); *F04B 7/0069* (2013.01); *F04B 9/02* (2013.01); *F04B 19/22* (2013.01); *F04B 37/00* (2013.01); *F04B 53/14* (2013.01); *F04B 53/162* (2013.01); *F04B 2201/06* (2013.01); *F16C 35/04* (2013.01)

(58) Field of Classification Search
CPC ...... F04B 37/00; F04B 39/128; F04B 7/0069; F04B 9/02; F04B 2201/06; B21K 1/26; F16C 35/04
See application file for complete search history.

(56) References Cited

U.S. PATENT DOCUMENTS

| | | |
|---|---|---|
| 1,490,294 A | 4/1924 | Steffen |
| 1,707,228 A | 4/1929 | Knapp |
| 1,890,428 A | 12/1932 | Ferris et al. |
| 1,893,699 A | 1/1933 | Dunning |
| 1,899,743 A | 2/1933 | Berry |
| 1,901,358 A | 3/1933 | Ryder |
| 1,926,925 A | 9/1933 | Wescott |
| 2,249,802 A | 7/1941 | Hart |
| 2,443,332 A | 6/1948 | Summers |
| 2,461,056 A | 2/1949 | Hess |
| 2,561,227 A | 7/1951 | Reed |
| 2,682,433 A | 6/1954 | Maier |
| 2,729,117 A | 1/1956 | Maybach |
| 2,755,739 A | 7/1956 | Euwe |
| 2,766,701 A | 10/1956 | Giraudeau |
| 2,823,085 A | 2/1958 | Keylwert |
| 2,828,931 A | 4/1958 | Harvey |
| 2,878,990 A | 3/1959 | Zurcher |
| 2,883,874 A | 4/1959 | Bynum |
| 2,899,247 A | 8/1959 | Clarkson |
| 3,039,317 A | 6/1962 | Wilson |
| 3,049,082 A | 8/1962 | Barry |
| 3,053,195 A | 9/1962 | Williamson |
| 3,158,211 A | 11/1964 | Mccue et al. |
| 3,179,451 A | 4/1965 | Blank |
| 3,206,242 A | 9/1965 | Fensin |
| 3,207,142 A | 9/1965 | Gorissen et al. |
| 3,236,315 A | 2/1966 | Lora |
| 3,238,892 A | 3/1966 | Coberly |
| 3,356,036 A | 12/1967 | Repp |
| 3,487,892 A | 1/1970 | Kiefer |
| 3,493,201 A | 2/1970 | Marran |
| 3,583,052 A | 6/1971 | Herbenar et al. |
| 3,595,101 A | 7/1971 | Cooper, Jr. |
| 3,760,694 A | 9/1973 | Lieb |
| 3,967,542 A | 7/1976 | Hall et al. |
| 4,048,909 A | 9/1977 | Jepsen |
| 4,099,447 A | 7/1978 | Ogles |
| 4,129,974 A | 12/1978 | Ojalvo |
| 4,191,238 A | 3/1980 | Pichl |
| 4,209,079 A | 6/1980 | Marchal et al. |
| 4,210,399 A | 7/1980 | Jain |
| 4,211,190 A | 7/1980 | Indech |
| 4,269,569 A | 5/1981 | Hoover |
| 4,338,054 A | 7/1982 | Dahl |
| 4,341,508 A | 7/1982 | Rambin, Jr. |
| 4,388,837 A | 6/1983 | Bender |
| 4,477,237 A | 10/1984 | Grable |
| 4,494,415 A | 1/1985 | Elliston |
| 4,512,694 A | 4/1985 | Foran et al. |
| 4,553,298 A | 11/1985 | Grable |
| 4,729,249 A | 3/1988 | Besic |
| 4,771,801 A | 9/1988 | Crump et al. |
| 4,809,646 A | 3/1989 | Paul et al. |
| 4,824,342 A | 4/1989 | Buck |
| 4,876,947 A | 10/1989 | Rhodes |
| 4,887,518 A | 12/1989 | Hayakawa |
| 4,950,145 A | 8/1990 | Zanetos et al. |
| 5,060,603 A | 10/1991 | Williams |
| 5,062,311 A * | 11/1991 | Bennitt ............... F01M 1/02 74/44 |
| 5,076,220 A | 12/1991 | Evans et al. |
| 5,080,319 A | 1/1992 | Nielsen |
| 5,115,725 A | 5/1992 | Horiuchi |
| 5,247,873 A | 9/1993 | Owens et al. |
| 5,249,600 A | 10/1993 | Blume |
| 5,425,306 A | 6/1995 | Binford |
| 5,594,665 A | 1/1997 | Walter et al. |
| 5,658,250 A | 8/1997 | Blomquist et al. |
| 5,671,655 A | 9/1997 | Vollrath |
| 5,673,666 A | 10/1997 | Beardmore et al. |
| 5,772,403 A | 6/1998 | Allison et al. |
| 5,855,397 A | 1/1999 | Black et al. |
| 5,984,645 A | 11/1999 | Cummings |
| 6,330,525 B1 | 12/2001 | Hays et al. |
| 6,405,992 B1 | 6/2002 | Palmer |
| 6,419,459 B1 | 7/2002 | Sibbing |
| 6,663,349 B1 | 12/2003 | Discenzo et al. |
| 6,697,741 B2 | 2/2004 | Yu et al. |
| 6,718,955 B1 | 4/2004 | Knight |
| D495,342 S | 8/2004 | Tojo et al. |
| D496,670 S | 9/2004 | Ohnishi |
| 6,859,740 B2 | 2/2005 | Stephenson et al. |
| 6,873,267 B1 | 3/2005 | Tubel et al. |
| 6,882,960 B2 | 4/2005 | Miller |
| 7,111,604 B1 | 9/2006 | Hellenbroich et al. |
| D538,824 S | 3/2007 | Tojo |
| 7,219,594 B2 | 5/2007 | Kugelev et al. |
| 7,220,119 B1 | 5/2007 | Kirchmer et al. |
| 7,272,533 B2 | 9/2007 | Schlosser |
| 7,364,412 B2 | 4/2008 | Kugelev et al. |
| D591,311 S | 4/2009 | Tojo |
| 7,621,179 B2 | 11/2009 | Ens et al. |
| 8,162,631 B2 | 4/2012 | Patel et al. |
| D658,684 S | 5/2012 | Roman |
| 8,186,900 B2 | 5/2012 | Riley et al. |
| D668,266 S | 10/2012 | Ramirez, Jr. |
| D670,312 S | 11/2012 | Alexander et al. |
| D676,875 S | 2/2013 | Ramirez, Jr. |
| D678,911 S | 3/2013 | Prevost |
| D685,393 S | 7/2013 | Prevost |
| D692,026 S | 10/2013 | Alexander et al. |
| 8,662,865 B2 | 3/2014 | Bayyouk et al. |
| 8,701,546 B2 | 4/2014 | Pacht |
| 8,707,853 B1 | 4/2014 | Dille et al. |
| D704,385 S | 5/2014 | Hoofman |
| D708,401 S | 7/2014 | Krueger |
| D713,101 S | 9/2014 | Bruno et al. |
| 8,833,301 B2 | 9/2014 | Donegan et al. |
| 8,833,302 B2 | 9/2014 | Donegan et al. |
| 9,004,033 B2 * | 4/2015 | Flender ............... F01L 1/047 123/90.6 |
| 9,121,402 B2 * | 9/2015 | Marshall ............. F04B 47/00 |
| 9,188,123 B2 * | 11/2015 | Hubenschmidt ...... F04B 53/162 |

(56) References Cited

U.S. PATENT DOCUMENTS

| | | | |
|---|---|---|---|
| D759,728 S | 6/2016 | Byrne et al. | |
| 9,500,195 B2 | 11/2016 | Blume | |
| 10,520,037 B2 | 12/2019 | Kumar et al. | |
| 10,526,862 B2* | 1/2020 | Witkowski | E21B 43/26 |
| 11,204,030 B2 | 12/2021 | Kumar et al. | |
| 2002/0046905 A1 | 4/2002 | Hulkkonen et al. | |
| 2002/0189587 A1 | 12/2002 | Hirano | |
| 2003/0024386 A1 | 2/2003 | Burke | |
| 2004/0219040 A1 | 11/2004 | Kugelev et al. | |
| 2004/0244577 A1 | 12/2004 | Haughom | |
| 2006/0029502 A1 | 2/2006 | Kugelev et al. | |
| 2007/0041849 A1 | 2/2007 | Allen | |
| 2007/0144842 A1 | 6/2007 | Zhou | |
| 2008/0006148 A1 | 1/2008 | McKelroy | |
| 2008/0080992 A1 | 4/2008 | Cummins | |
| 2008/0187409 A1 | 8/2008 | Bodin et al. | |
| 2008/0213115 A1 | 9/2008 | Hilger et al. | |
| 2009/0092510 A1 | 4/2009 | Williams | |
| 2010/0129245 A1 | 5/2010 | Patel et al. | |
| 2010/0129249 A1 | 5/2010 | Bianchi et al. | |
| 2010/0158726 A1 | 6/2010 | Donald et al. | |
| 2010/0160710 A1 | 6/2010 | Strickland | |
| 2010/0172778 A1 | 7/2010 | Kugelev et al. | |
| 2010/0242720 A1 | 9/2010 | Matzner et al. | |
| 2010/0322802 A1 | 12/2010 | Kugelev | |
| 2011/0081268 A1* | 4/2011 | Ochoa | F04B 53/12 417/521 |
| 2012/0144995 A1 | 6/2012 | Bayyouk et al. | |
| 2012/0148430 A1* | 6/2012 | Hubenschmidt | F04B 53/007 417/521 |
| 2012/0167759 A1 | 7/2012 | Chinthan et al. | |
| 2012/0213651 A1* | 8/2012 | Ochoa | F04B 53/16 417/437 |
| 2012/0272764 A1 | 11/2012 | Pendleton | |
| 2013/0064696 A1 | 3/2013 | Mccormick et al. | |
| 2013/0112074 A1 | 5/2013 | Small | |
| 2013/0195701 A1 | 8/2013 | Skurdalsvold et al. | |
| 2013/0206108 A1 | 8/2013 | Schule et al. | |
| 2014/0013769 A1 | 1/2014 | Martin et al. | |
| 2014/0147291 A1* | 5/2014 | Burnette | F04B 53/14 417/53 |
| 2014/0196570 A1 | 7/2014 | Small et al. | |
| 2014/0219824 A1 | 8/2014 | Burnette | |
| 2014/0322050 A1 | 10/2014 | Marette et al. | |
| 2015/0101694 A1* | 4/2015 | Forrest | B24C 7/0015 137/861 |
| 2015/0377318 A1 | 12/2015 | Byrne | |
| 2016/0025082 A1 | 1/2016 | Byrne et al. | |
| 2016/0025088 A1 | 1/2016 | Byrne et al. | |
| 2016/0025089 A1 | 1/2016 | Kumar et al. | |
| 2016/0025090 A1 | 1/2016 | Bayyouk et al. | |
| 2017/0211565 A1* | 7/2017 | Morreale | F04B 39/125 |
| 2018/0045187 A1 | 2/2018 | Nagel et al. | |
| 2021/0148208 A1 | 5/2021 | Thomas et al. | |
| 2021/0148349 A1 | 5/2021 | Nowell et al. | |

FOREIGN PATENT DOCUMENTS

| | | | |
|---|---|---|---|
| CA | 2686204 | | 5/2010 |
| CA | 2749110 | | 7/2010 |
| CA | 153846 | | 9/2014 |
| CN | 2436688 | | 6/2001 |
| CN | 2705626 | | 6/2005 |
| CN | 1908435 | A | 2/2007 |
| CN | 2926584 | | 7/2007 |
| CN | 101012821 | A | 8/2007 |
| CN | 200964929 | | 10/2007 |
| CN | 201092955 | | 7/2008 |
| CN | 101356399 | A | 1/2009 |
| CN | 101476558 | | 7/2009 |
| CN | 201836038 | | 5/2011 |
| CN | 201874803 | | 6/2011 |
| CN | 201961961 | U | 9/2011 |
| CN | 102371537 | A | 3/2012 |
| CN | 102374159 | A | 3/2012 |
| CN | 202187877 | U | 4/2012 |
| CN | 102439314 | | 5/2012 |
| CN | 102652223 | A | 8/2012 |
| CN | 202493418 | U | 10/2012 |
| CN | 202527901 | U | 11/2012 |
| CN | 202707463 | U | 1/2013 |
| CN | 102959244 | A | 3/2013 |
| CN | 203067205 | U | 7/2013 |
| CN | 103403351 | | 11/2013 |
| CN | 2009100265839 | | 4/2014 |
| CN | ZL201330555622.7 | | 5/2014 |
| CN | 103850908 | A | 6/2014 |
| CN | 104204519 | A | 12/2014 |
| CN | 104355227 | A | 2/2015 |
| CN | 105264275 | A | 1/2016 |
| CN | 106687688 | A | 5/2017 |
| CN | 106937530 | A | 7/2017 |
| DE | 11 91 069 | | 4/1965 |
| DE | 34 41 508 | | 5/1986 |
| DE | 38 02 714 | | 8/1988 |
| DE | 10 2007 028 446 | A1 | 12/2008 |
| EP | 0 300 905 | | 1/1989 |
| EP | 1 640 571 | A1 | 3/2006 |
| EP | 2 397 694 | A1 | 12/2011 |
| EP | 2 626 525 | A1 | 8/2013 |
| FR | 2618509 | | 1/1989 |
| GB | 361192 | A | 11/1931 |
| GB | 2 419 671 | | 5/2006 |
| GB | 2 482 786 | | 2/2012 |
| JP | 60175753 | | 9/1985 |
| JP | 40-7208479 | A | 8/1995 |
| JP | 10288086 | | 10/1998 |
| JP | 2920004 | B2 | 4/1999 |
| JP | 2920004 | | 7/1999 |
| JP | 11200947 | | 7/1999 |
| JP | 3974386 | | 9/2007 |
| JP | 2008539364 | | 11/2008 |
| JP | 2012002225 | | 1/2012 |
| JP | 2012002225 | A | 1/2012 |
| KP | 19990079544 | | 11/1999 |
| KP | 100287572 | | 6/2001 |
| KR | 1019990060438 | | 7/1999 |
| KR | 100275877 | | 12/2000 |
| KR | 20010065249 | | 7/2001 |
| KR | 100302886 | | 11/2001 |
| KR | 10200170108223 | | 12/2001 |
| RU | 2037700 | | 6/1995 |
| SG | 20131413 | | 3/2014 |
| WO | WO-2008/137515 | | 11/2008 |
| WO | WO-2010/080961 | | 7/2010 |
| WO | WO-2010/080963 | | 7/2010 |
| WO | WO-2011/005571 | | 1/2011 |
| WO | WO-2012/092452 | | 7/2012 |
| WO | WO-2013/183990 | | 12/2013 |
| WO | WO-2014/143094 | | 9/2014 |
| WO | WO-2016/014967 | | 1/2016 |
| WO | WO-2016/014988 | | 1/2016 |
| WO | WO-2016/015006 | | 1/2016 |
| WO | WO-2016/015012 | | 1/2016 |

OTHER PUBLICATIONS

European Examination Report dated Dec. 2, 2019 for European Patent Application No. EP 15824854.2, 4 pages.

Canadian Examination Report for Canadian Patent Application No. 3,031,128 dated Jan. 22, 2020.

"Metaldyne, Torsional Vibration Dampers, Brochure."

"Simatool Bearing Handling Tool BHT," Simatec Smart Technologies; Dec. 19, 2013; http://www.simatec.com/products/simatool/bearinghandlingtool/.

Advisory Action dated Apr. 7, 2009, by the USPTO, re U.S. Appl. No. 10/833,921.

Advisory Action dated Jul. 17, 2018, by the USPTO, re U.S. Appl. No. 14/808,513, 4 pages.

Advisory Action dated Sep. 15, 2017, by the USPTO, re U.S. Appl. No. 14/808,581, 2 pages.

(56) References Cited

OTHER PUBLICATIONS

Australia Exam Report, dated Feb. 9, 2015, by IP Australia, re App No. 2011352095.
Canadian Examiner's Report dated Aug. 18, 2016, by the CIPO, re App No. 2905809.
Canadian Examiner's Report dated Jan. 11, 2016, by the CIPO, re App No. 2749110.
Canadian Examiner's Report, dated Oct. 22, 2015, by the CIPO, re App No. 2686204.
Canadian Examiner's Report, dated May 13, 2014, by the CIPO, re App No. 153846.
Canadian Examiner's Report, dated Oct. 8, 2014, by the CIPO, re App No. 2823213.
Canadian Office Action dated Jul. 12, 2018, by the CIPO, re App. No. 2,955,814, 9 pages.
Canadian Office Action dated May 17, 2011, re App No. 2486126.
Chinese Office Action dated Mar. 15, 2013, re App No. 200910226583.9.
Chinese Office Action dated Jul. 3, 2018, re App. No. 201580075755.0, 6 pages.
Chinese Office Action dated Jun. 12, 2018 in corresponding Chinese Patent Application No. 201580050912.2, translated, 7 pages.
Chinese Office Action dated Oct. 29, 2013, re App No. 201080008236.X.
Chinese Office Action, dated Sep. 2, 2014, by SIPO, re App No. 201080008236.X.
Decision on Appeal dated Feb. 20, 2013, by USPTO, re U.S. Appl. No. 10/831,467.
Dirk Guth et al., "New Technology for a High Dynamical MRF-Clutch for Safe and Energy-Efficient Use in Powertrain," FISITA 2012 World Automotive Congress, Beijing, China, Nov. 27-30, 2012, 31 pages.
Election Requirement, dated Nov. 18, 2014, by the USPTO, re U.S. Appl. No. 29/455,618.
*Estee Lauder Inc.* v. *L'Oreal, USA*, 129 F.3d 588, 44 U.S.P.Q.2d 1610, No. 96-1512, United States Court of Appeals, Federal Circuit, Decided Nov. 3, 1997.
Examiner's Answer dated Jan. 29, 2010, by USPTO, re U.S. Appl. No. 10/831,467.
Examiner's Interview Summary dated Apr. 10, 2008, by the USPTO, re U.S. Appl. No. 10/833,921.
Examiner's Interview Summary dated Jul. 17, 2008, by the USPTO, re U.S. Appl. No. 10/831,467.
Extended European Search Report dated Jul. 18, 2018, by EPO, re App. No. 15873853.4, 11 pages.
Extended European Supplementary Search Report in corresponding European Patent No. 15825024.1 dated Jan. 23, 2018, 8 pages.
Final Office Action on U.S. Appl. No. 14/808,618 dated Jan. 17, 2019.
Final Office Action on U.S. Appl. No. 14/808,618 dated Jul. 13, 2018.
Final Office Action on U.S. Appl. No. 14/808,618 dated May 4, 2018.
Final Office Action on U.S. Appl. No. 14/808,726 dated Dec. 11, 2018.
Gardner Denver Well Servicing Pump Model C-2500Q Power End Parts List, Feb. 2009.
International Preliminary Report on Patentability dated Feb. 9, 2017 in PCT/US2015/042111, 9 pages.
International Preliminary Report On Patentability in corresponding international application No. PCT/US2015/42104; 8 pages.
International Preliminary Report on Patentability dated Mar. 10, 2017 in International Application No. PCT/US2015/042078, 10 pages.
International Preliminary Report on Patentability dated Mar. 10, 2017 in PCT/US15/42078, 10 pages.
International Preliminary Report on Patentability, by the IPEA/US, dated Aug. 23, 2016 re PCT/US2013/042043.
International Preliminary Report on Patentability, by the IPEA/US, dated Jan. 4, 2012 re PCT/US2010/039651.
International Preliminary Report on Patentability, by the IPEA/US, dated Jul. 12, 2011 re PCT/US2010/020445.
International Preliminary Report on Patentability, by the IPEA/US, dated Jul. 12, 2011 re PCT/US2010/020447.
International Preliminary Report on Patentability, by the IPEA/US, dated Mar. 9, 2015 re PCT/US2013/040106.
International Preliminary Report on Patentability, by the IPEA/US, dated Sep. 16, 2016 re PCT/US2015/042104.
International Search Report and Written Opinion dated Dec. 28, 2015 in corresponding international application PCT/US2015/042043, 14 pages.
International Search Report and Written Opinion dated Dec. 28, 2015 in corresponding PCT application PCT/US2015/042043, 14 pages.
International Search Report and Written Opinion dated Dec. 4, 2015 in corresponding PCT Application PCT/US2015/042111; 13 pages.
International Search Report and Written Opinion dated Jun. 29, 2015 in corresponding PCT application PCT/US2015/014898, 14 pages.
International Search Report and Written Opinion dated Oct. 19, 2015 in corresponding PCT Application PCT/US2015/042104, 11 pages.
International Search Report and Written Opinion dated Oct. 19, 2015 in corresponding PCT application, PCT/US2015/042119; 12 pages.
International Search Report and Written Opinion dated Oct. 19, 2015 in corresponding PCT/US2015/042104; 11 pages.
International Search Report and Written Opinion, by the ISA/US, dated Aug. 28, 2012, re PCT/US2011/067770, 6 pages.
International Search Report and Written Opinion, by the ISA/US, dated Aug. 3, 2010, re PCT/US2010/020445, 7 pages.
International Search Report and Written Opinion, by the ISA/US, dated Aug. 3, 2010, re PCT/US2010/020447, 7 pages.
International Search Report and Written Opinion, by the ISA/US, dated Feb. 24, 2011, re PCT/US2010/039651, 7 pages.
International Search Report and Written Opinion, by the ISA/US, dated Mar. 4, 2015, re PCT/US2014/069567.
International Search Report and Written Opinion, by the ISA/US, dated Nov. 27, 2015, re PCT/US2015/038008.
International Search Report and Written Opinion, by the ISA/US, dated Oct. 19, 2015, re PCT/US2015/042104.
International Search Report and Written Opinion, by the ISA/US, dated Oct. 19, 2015, re PCT/US2015/042119.
International Search Report and Written Opinion, by the ISA/US, dated Sep. 5, 2013, re PCT/US2013/040106.
International Search Report dated Dec. 4, 2015 in corresponding PCT application PCT/US2015/042078, 13 pages.
International Search Report dated Dec. 4, 2015 in corresponding PCT application, PCT/US2015/042111, 13 pages.
International Search Report dated Jun. 29, 2015 in corresponding PCT application, PCT/US2015/014898, 14 pages.
International Search Report dated Oct. 19, 2015 in corresponding PCT/US2015/042104; 10 pages.
MSI/Dixie Iron Works, Ltd., Technical Manual for MSI Hybrid Well Service Pump Triplex and Quintuplex Modesl, Rev. D, 91 pages, date unknown.
Non-Final Office Action on U.S. Appl. No. 14/808,513 dated Oct. 4, 2018.
Non-Final Office Action on U.S. Appl. No. 14/808,618 dated Aug. 15, 2018.
Notice of Allowance dated Dec. 23, 2011, by the USPTO, re U.S. Appl. No. 12/277,849.
Notice of Allowance dated Feb. 12, 2016, by the USPTO, re U.S. Appl. No. 29/534,091.
Notice of Allowance dated Jan. 28, 2015, by the USPTO, re U.S. Appl. No. 29/455,618.
Notice of Allowance dated May 25, 2018, by the USPTO, re U.S. Appl. No. 14/808,581, 10 pages.
Notice of Allowance dated Oct. 12, 2012, by the USPTO, re U.S. Appl. No. 12/683,804.
Notice of Allowance on U.S. Appl. No. 14/808,513 dated Feb. 15, 2019.

(56) References Cited

OTHER PUBLICATIONS

Office Action dated Apr. 19, 2012, by the USPTO, re U.S. Appl. No. 12/821,663.
Office Action dated Apr. 19, 2018, by the USPTO, re U.S. Appl. No. 14/808,513.
Office Action dated Jan. 6, 2017, by the USPTO, re U.S. Appl. No. 15/808,581.
Office Action dated Jan. 18, 2013, by the USPTO, re U.S. Appl. No. 12/748,127.
Office Action dated Jan. 2, 2014, by the USPTO, re U.S. Appl. No. 13/866,121.
Office Action dated Jan. 21, 2009, by the USPTO, re U.S. Appl. No. 10/833,921.
Office Action dated Jan. 27, 2012, by the USPTO, re U.S. Appl. No. 12/683,804.
Office Action dated Jul. 16, 2007, by the USPTO, re U.S. Appl. No. 10/831,467.
Office Action dated Jul. 16, 2012, by the USPTO, re U.S. Appl. No. 12/683,804.
Office Action dated Jul. 28, 2008, by the USPTO, re U.S. Appl. No. 10/833,921.
Office Action dated Jun. 1, 2016, by the USPTO, re U.S. Appl. No. 14/565,962.
Office Action dated Jun. 24, 2009, by the USPTO, re U.S. Appl. No. 10/831,467.
Office Action dated Jun. 30, 2017, by the USPTO, re U.S. Appl. No. 15/808,581, 17 pages.
Office Action dated Mar. 9, 2012, by the USPTO, re U.S. Appl. No. 12/821,663.
Office Action dated May 23, 2013, by the USPTO, re U.S. Appl. No. 12/683,900.
Office Action dated May 29, 2007, by the USPTO, re U.S. Appl. No. 10/833,921.
Office Action dated May 7, 2008, by the USPTO, re U.S. Appl. No. 10/831,467.
Office Action dated Nov. 22, 2017, by the USPTO, re U.S. Appl. No. 15/808,581, 15 pages.
Office Action dated Nov. 14, 2008, by the USPTO, re U.S. Appl. No. 10/831,467.
Office Action dated Oct. 11, 2011, by the USPTO, re U.S. Appl. No. 12/277,849.
Office Action dated Oct. 7, 2013, by the USPTO, re U.S. Appl. No. 13/843,525.
Office Action dated Sep. 21, 2017, by the USPTO, re U.S. Appl. No. 14/808,513.
Office Action dated Sep. 18, 2007, by the USPTO, re U.S. Appl. No. 10/833,921.
Office Action dated Sep. 29, 2014, by the USPTO, re U.S. Appl. No. 13/339,640.
Office Action/Restriction dated Mar. 29, 2016, by the USPTO, re U.S. Appl. No. 14/565,962.
Suction Requirements for Reciprocating Power Pumps, p. 59, Figure 3.4 Composite Pump Dynamics.
Supplemental Notice of Allowance dated Mar. 21, 2012, by the USPTO, re U.S. Appl. No. 12/277,849.
U.S. Notice of Allowance on U.S. Appl. No. 14/808,581 dated May 25, 2018.
U.S. Office Action on U.S. Appl. No. 14/808,726 dated Jun. 1, 2018.
PGR 2022-00033 Petition for Post Grant Review, 93 pages, Apr. 15, 2022.
PGR 2022-00033 Ex-1002—Declaration of Steven M. Tipton, Ph.D., P.E., 143 pages, Apr. 15, 2022.
PGR 2022-00033 Ex-1003—Gardner Denver Drilling Pump Model Maverick Parts List, 29 pages, Jun. 2013.
PGR 2022-00033 Ex-1007 Part 1—May 31 YouTube Video available at . . . 40 pages.
PGR 2022-00033 Ex-1007 Part 2—May 31 YouTube Video available at . . . 41 pages.
PGR 2022-00033 Ex-1008 Declaration of Ryan Volkerink, 11 pages, Apr. 7, 2022.
PGR 2022-00033 Ex-1010 Gardner Denver Drilling Pump Model Maverick Operating and Service Manual, 52 pages, Aug. 2013.
PGR 2022-00033 Ex-1011 Kerr Machine Company, 12 pages, Oct. 29, 2013.
PGR 2022-00033 Ex-1012 28th Edition Kerr Machine Company, Machinery's Handbook, 33 pages, 2008.
PGR 2022-00033 Ex-1014 Defendant's SPM Oil & Gas Inc. and SPM Flow Control, Inc. Disclosure of Asserted Claims and Infringement Contentions Under Patent Disclosures, 199 pages, Mar. 18, 2022.
PGR 2022-00033 Ex-1026 American Institute of Steel Construction 13th Edition Steel Construction Manual, 27 pages, 2005.
PGR 2022-00033 Ex-1027 Yurisman et al Behavior of Shear Link of WF Section with Diagonal Web Stiffener of Eccentrically Braced Frame (EBF) of Steel Structure, 26 pages, 2010.
PGR 2022-00033 Ex-1028 Harper et al BETA Machinery Analysis Optimized Skid Design for Compressor Packages, 9 pages, Gas Machinery Conference 2013. Held in Albuquerque, NM on October Jul. 10, 2013.
PGR 2022-00033 Ex-1029 Kaiser et al Analysis Guide for Variable Frequency Drive Operated Centrifugal Pumps, 26 pages, 2008.
PGR 2022-00033 Ex-1030 National Oilwell Varco Reciprocating Plunger Pumps Installation, Care, and Operation Manual, 83 pages, Aug. 27, 2010.
PGR 2022-00033 Patent Owner's Preliminary Response, 51 pages, Jul. 26, 2022.
PGR 2022-00033 Ex-2001—Expert Declaration of Timothy L. Morse, Ph.D., 53 pages, Jul. 26, 2022.
PGR 2022-00033 Ex-2004—Kerr's Preliminary Invalidity Contentions in *Kerr Machine Co.* v. *SPM Oil & Gas Inc., et al.*, No. 4:21-cv-1191-O (N.D. Tex.), 119 pages, Apr. 18, 2022.
PGR 2022-00033 Ex-2005 Part 1—S. A. Holditch, Recent Advances in Hydraulic Fracturing, 242 pages, 1989.
PGR 2022-00033 Ex-2005 Part 2—S. A. Holditch, Recent Advances in Hydraulic Fracturing, 226 pages, 1989.
PGR 2022-00033 Ex-2006—U.S. Department of Energy, Office of Fossil Energy National Energy Technology Laboratory, Modern Shale Gas Development in the United States: A Primer, 116 pages, Apr. 2009.
PGR 2022-00033 Ex-2007—M.J. Economides and K.G. Nolte, Reservoir stimulation, 3rd edition, 824 pages, 2000.
PGR 2022-00033 PGR 2022-00033 Ex-2008—R.D. Langenkamp, Terms and Phrases 4th Edition, 11 pages, 2008.
PGR 2022-00033 Ex-2009 Part 1—L.W. Lake and R.F. Mitchell (Eds.), Petroleum Engineering Handbook, vol. II: Drilling Engineering, 600 pages, 2007.
PGR 2022-00033 Ex-2009 Part 2—L.W. Lake and R.F. Mitchell (Eds.), Petroleum Engineering Handbook, vol. II: Drilling Engineering, 172 pages, 2007.
PGR 2022-00033 Ex-2010—Karassik, Igor J., et al., Pump Handbook, McGraw-Hill (Third Edition), 1789 pages, 2001.
PGR 2022-00033 Ex-2011—Kerr's Opening Claim Construction Brief in *Kerr Machine Co.* v. *SPM Oil & Gas Inc., et al.*, No. 4:21-cv-1191-O, Dkt. 55, 35 pages, (N.D. Tex. Jul. 14, 2022).
PGR 2022-00033 Petitioner's Preliminary Reply, 6 pages, Aug. 11, 2022.
PGR 2022-00033 Institution Decision: Granting Institution of Post-Grant Review, 43 pages, Oct. 24, 2022.
IPR 2022-00881 Petition for Inter Partes Review, 90 pages, Apr. 15, 2022.
IPR 2022-00881 Patent Owner Preliminary Response, 50 pages, Jul. 26, 2022.
IPR 2022-00881 Ex-1002 Declaration of Steven M. Tipton, 140 pages, Apr. 15, 2022.
IPR 2022-00881 Ex-1003 Gardener Denver Drilling Pump Model Maverick Parts List 400TLS997 Ref. F Jun. 2013 copyright 2012, 29 pages.
IPR 2022-00881 Ex-1007 Part 1 Gardner Denver Maverick Power End by Goldmark Diesel, https://youtu.be/OQ162MDDmeY, 40 pages, May 31, 2014.
IPR 2022-00881 Ex-1007 Part 2 Gardner Denver Maverick Power End by Goldmark Diesel, https://youtu.be/OQ162MDDmeY, 41 pages, May 31, 2014.

(56) References Cited

OTHER PUBLICATIONS

IPR 2022-00881 Ex-1008 Declaration of Ryan Volkerink, 11 pages, Apr. 15, 2022.
IPR 2022-00881 Ex-1010 Gardner Denver Drilling Pump Model Maverick Operating and Service Manual 400TLS996 Rev B Aug. 2013, 52 pages.
IPR 2022-00881 Ex-1011 Goldmark System Photographs of Maverick Model Pump Assembly, 12 pages, Apr. 15, 2022.
IPR 2022-00881 Ex-1012 Machinery's Handbook, 28th Ed., E. Oberg et al., 2008 Industrial Press, Inc. New York, New York, 33 pages, 2008.
IPR 2022-00881 Ex-2001—Expert Declaration of Timothy L. Morse, Ph.D., 53 pages, Jul. 26, 2022.
IPR 2022-00881 Ex-2004—Kerr's Preliminary Invalidity Contentions in *Kerr Machine Co.* v. *SPM Oil & Gas Inc., et al.*, No. 4:21-cv-1191-O (N.D. Tex.).
IPR 2022-00881 Ex-2005 Part 1—S. A. Holdrich, "Recent Advances in Hydraulic Fracturing," 1989.
IPR 2022-00881 Ex-2005 Part 2—S. A. Holdich, "Recent Advances in Hydraulic Fracturing," 1989.
IPR 2022-00881 Ex-2006—U.S. Department of Energy, Office of Fossil Energy National Energy Technology Laboratory, "Modern Shale Gas Development in the United States: A Primer," Apr. 2009.
IPR 2022-00881 Ex-2007—M.J. Economides and K.G. Nolte, "Reservoir stimulation," 3rd edition, 2000.
IPR 2022-00881 Ex-2008—R.D. Langenkamp, "Handbook of Oil Industry Terms & Phrases," Fourth Edition.
IPR 2022-00881 Ex-2009 Part 1—L.W. Lake and R.F. Mitchell (Eds.), "Petroleum Engineering Handbook, vol. II: Drilling Engineering," 2007.
IPR 2022-00881 Ex-2009 Part 2—L.W. Lake and R.F. Mitchell (Eds.), "Petroleum Engineering Handbook, vol. II: Drilling Engineering," 2007.
IPR 2022-00881 Ex-2010—Karassik, Igor J., et al., "Pump Handbook," McGraw-Hill (Third Edition), 2001.
IPR 2022-00881 Ex-2011—Kerr's Opening Claim Construction Brief in *Kerr Machine Co.* v. *SPM Oil & Gas Inc., et al.*, No. 4:21-cv-1191-O, Dkt. 55 (N.D. Tex. Jul. 14, 2022).
IPR 2022-00881 Petitioner's Preliminary Reply, 6 pages, Aug. 11, 2022.
IPR 2022-881 Ex-1014 Defendant SPM Oil & Gas Inc.'s Disclosure of Asserted Claims and Infringement Contentions with Exhibits 1-4, *Kerr Machine Co.* v. *SPM Oil & Gas Inc. et al.*, C.A. No. 4:21-cv-01191-O (N.D. Texas.) served Mar. 18, 2022), 199 pages.
IPR 2022-00881 Ex-1026 Steel Construction Manual, American Institute of Steel Construction, Thirteenth Edition, 2005, 27 pages.
PR 2022-00881 Ex-1027 Behavior of Shear Link of WF Section with Diagonal Web Stiffener of Eccentrically Braced Frame (EBF of Steel Structure. ITB Journal of Engineering Science. 42. 103-128. 10.5614/itbj.eng.sci.2010.42.2.1., Urisman et al. (2010), 26 pages.
PR 2022-00881 Ex-1028 Optimized Skid Design for Compressor Packages, Beta Machinery Analysis, Harper et al., presented at Gas Machinery Conference Oct. 7-10, 2013, Albuquerque, NM, available at https://www.betamachinery.com/knowledge-center/technical-articles/ as of Apr. 15, 2022, 9 pages.
IPR 2022-00881 Ex-1029 Analysis Guide for Variable Frequency Drive Operated Centrifugal Pumps, Kaiser, Thomas F. et al. (2008) Texas A&M University. Turbomachinery Laboratories. (Available electronically from https: //hdl.handle.net/1969.1/163916 as of Apr. 15, 2022), 26 pages.
IPR 2022-00881 Ex-1030 Reciprocating Plunger Pumps, Installation, Care and Operation Manual, National Oilwell Varco (Revised Aug. 27, 2010) (available electronically from https://calroc.ca/equipment/media/Reciprocating-Plunger-PumpsInstallation-Care-and-Operation-Manual.pdf as of Apr. 15, 2022), 83 pages.
IPR 2022-00881 Institution Decision: Grant.
IPR 2022-00882 Inter Partes Review, 85 pages, Apr. 15, 2022.
IPR 2022-00882 Ex-1002, Declaration of Steven M. Tipton, PhD, P.E., 136 pages, Apr. 15, 2022.
IPR 2022-00882 Ex-1003, Gardner Denver Drilling Pump Model Maverick Parts List 400TLS997 Rev F. Jun. 2013, Copyright 2012 ("Maverick").
IPR 2022-00882 Ex-1007, Part 1—Gardner Denver Maverick Power End by Goldmark Diesel, https://youtu.be/OQ162MDDmeY, 40 pages, May 31, 2014.
IPR 2022-00882 Ex-1007 Part 2—Gardner Denver Maverick Power End by Goldmark Diesel, https://youtu.be/OQ162MDDmeY, 41 pages, May 31, 2014.
IPR 2022-00882 Ex-1008, Declaration of Ryanb Vokerink, 11 pages, Apr. 15, 2022.
IPR 2022-00882 Ex-1010—Gardner Denver Drilling Pump Model Maverick Operating and Service Manual 400TLS996 Rev B Aug. 2013, 52 pages.
IPR 2022-00882 Ex-1011, Goldmark System Photographs of Maverick Model Pump Assembly, 12 pages, Apr. 15, 2022.
IPR 2022-00882 Ex-1012, Machinery Handbook, 28th Ed., E. Oberg et al., 2008 Industrial Press, Inc. New York, New York, 33 pages, 2008.
IPR 2022-00882 Ex-1014, Defendants SPM Oil & Gas Inc.'s Disclosure of Asserted Claims and Infringement Contentions with Exhibits 1-4, *Kerr Machine Co.* v. *SPM Oil & Gas Inc. et al.*, C.A. No. 4:21-cv-01191-O (N.D. Texas.) served Mar. 18, 2022), 199 pages.
IPR 2022-00882 Ex-1026—Steel Construction Manual, American Institute of Steel Construction, Thirteenth Edition, 2005, 27 pages.
IPR 2022-00882 Ex-2001—Expert Declaration of Timothy L. Morse, Ph.D., 53 pages.
IPR 2022-00882 Ex-1027—Behavior of Shear Link of WF Section with Diagonal Web Stiffener of Eccentrically Braced Frame (EBF of Steel Structure. ITB Journal of Engineering Science. 42. 103-128. 10.5614/itbj.eng.sci.2010.42.2.1., Urisman et al. (2010), 26 pages.
IPR 2022-00882 Ex-2004—Kerr's Preliminary Invalidity Contentions in *Kerr Machine Co.* v. *SPM Oil & Gas Inc., et al.*, No. 4:21-cv-1191-O (N.D. Tex.), 119 pages.
IPR 2022-00882 Patent Owner Preliminary Response, 48 pages, dated Jul. 26, 2022.
IPR 2022-00882 Ex-2005—Part 1—S. A. Holdich, Recent Advances in Hydraulic Fracturing, 1989.
IPR 2022-00882 Ex-2005 Part 2—S. A. Holdich, Recent Advances in Hydraulic Fracturing, 1989.
IPR 2022-00882 Ex-2006—U.S. Department of Energy, Office of Fossil Energy National Energy Technology Laboratory, modern Shale Gas Development in the United States: A Primer, Apr. 2009. 116 pages.
IPR 2022-00882 Ex-2007—M.J. Economides and K.G. Nolte, Reservoir stimulation, 3rd edition, 2000, 824 pages.
IPR 2022-00882 Ex-2008—R.D. Langenkamp, Handbook of Oil Industry Terms & Phrases, Fourth Edition, 11 pages.
IPR 2022-00882 Ex-2009 Part 1—L.W. Lake and R.F. Mitchell (Eds.), Petroleum Engineering Handbook, vol. II: Drilling Engineering, 2007.
IPR 2022-00882 Ex-2009 Part 2—L.W. Lake and R.F. Mitchell (Eds.), Petroleum Engineering Handbook, vol. II: Drilling Engineering, 2007, 172 pages.
IPR 2022-00882 Ex-2010—Karassik, Igor J., et al., Pump Handbook, McGraw-Hill (Third Edition), 2001, 1789 pages.
IPR 2022-00882 Ex-2011—Kerr's Opening Claim Construction Brief in *Kerr Machine Co.* v. *SPM Oil & Gas Inc., et al.*, No. 4:21-cv-1191-O, Dkt. 55 (N.D. Tex. Jul. 14, 2022), 35 pages.
IPR 2022-00882 Petitioner's Preliminary Reply, 6 pages, Aug. 11, 2022.
IPR 2022-00882 Ex-1028—Optimized Skid Design for Compressor Packages, Beta Machinery Analysis, Harper et al., presented at Gas Machinery Conference Oct. 7-10, 2013, Albuquerque, NM, available at https://www.betamachinery.com/knowledge-center/technical-articles/ as of Apr. 15, 2022, 9 pages.
IPR 2022-00882 Ex-1029—Analysis Guide for Variable Frequency Drive Operated Centrifugal Pumps, Kaiser, Thomas F. et al. (2008) Texas A&M University. Turbomachinery Laboratories. (Available electronically from https: //hdl.handle.net/1969.1/163916 as of Apr. 15, 2022), 26 pages.

(56) References Cited

OTHER PUBLICATIONS

IPR 2022-00882 Ex-1030, Reciprocating Plunger Pumps, Installation, Care and Operation Manual, National Oilwell Varco (Revised Aug. 27, 2010) (available electronically from https://calroc.ca/equipment/media/Reciprocating-Plunger-PumpsInstallation-Care-and-Operation-Manual.pdf as of Apr. 15, 2022), 83 pages.

IPR 2022-00882 Granting Institution of Inter Partes Review, 25 pages, Oct. 24, 2022.

United Arab Emirates Examination Report for Patent Appln. No. 38/2017, dated Jan. 10, 2023 (4 pgs).

Examination Report for Int'l. Patent Appln. No. 36/2017, dated Jan. 10, 2023 (4 pgs).

* cited by examiner

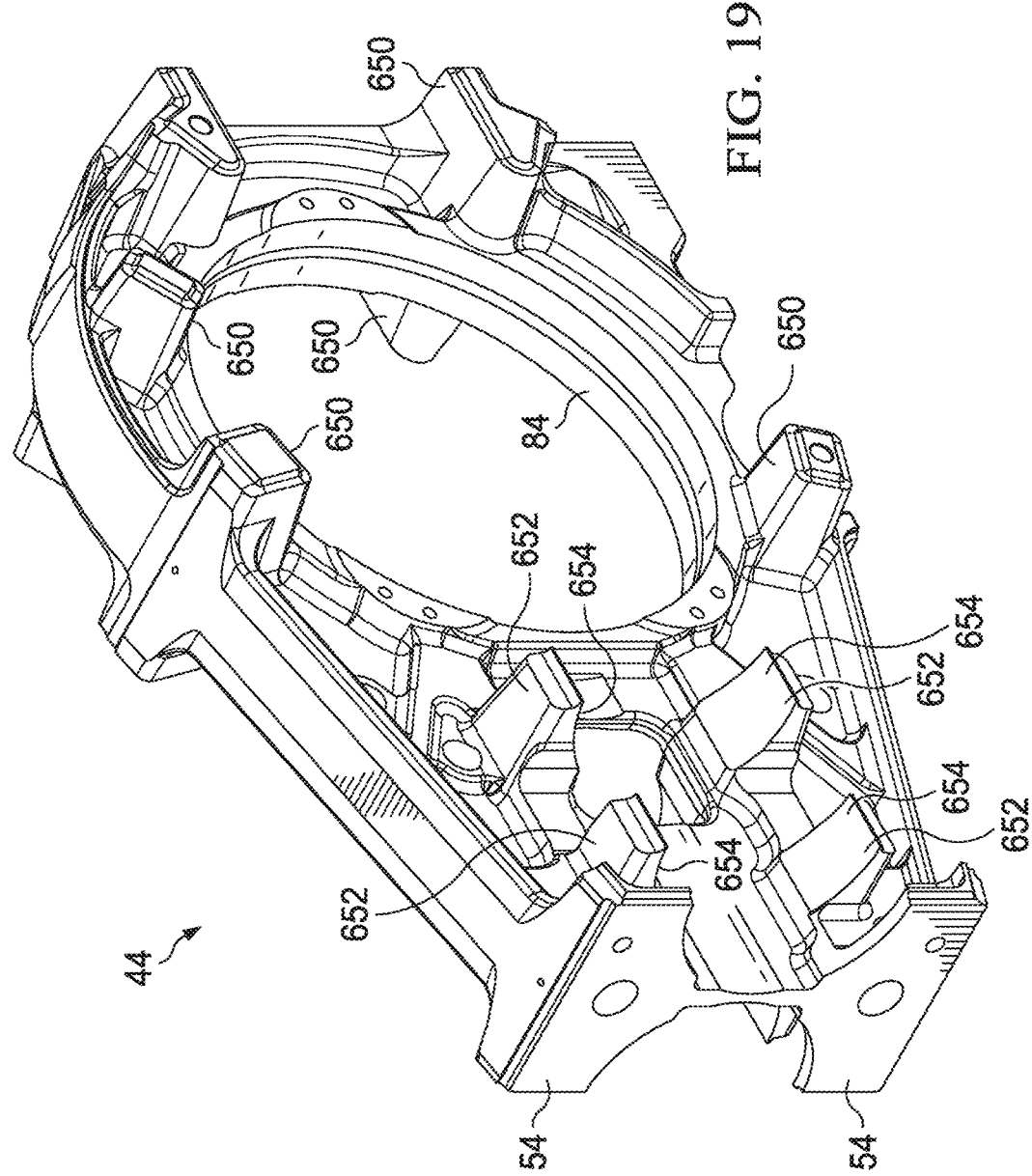

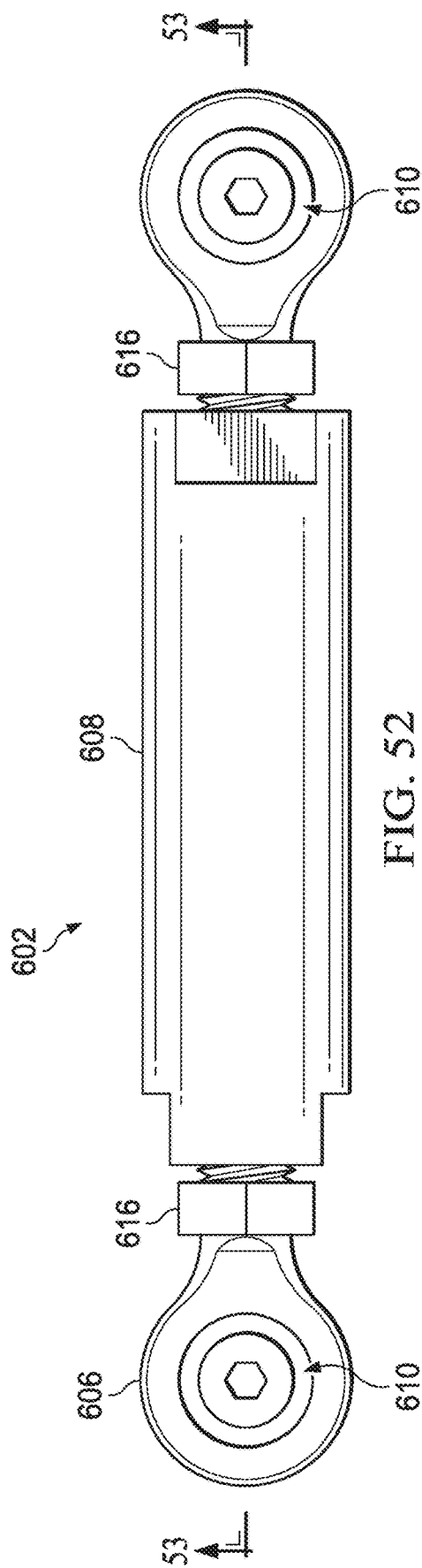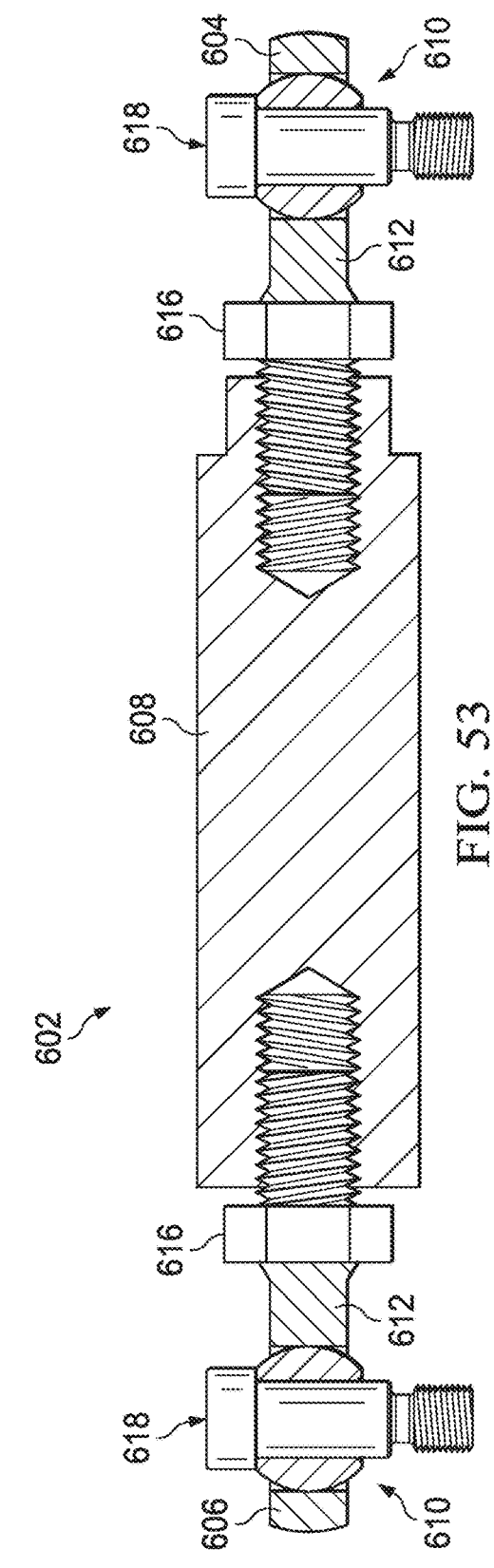

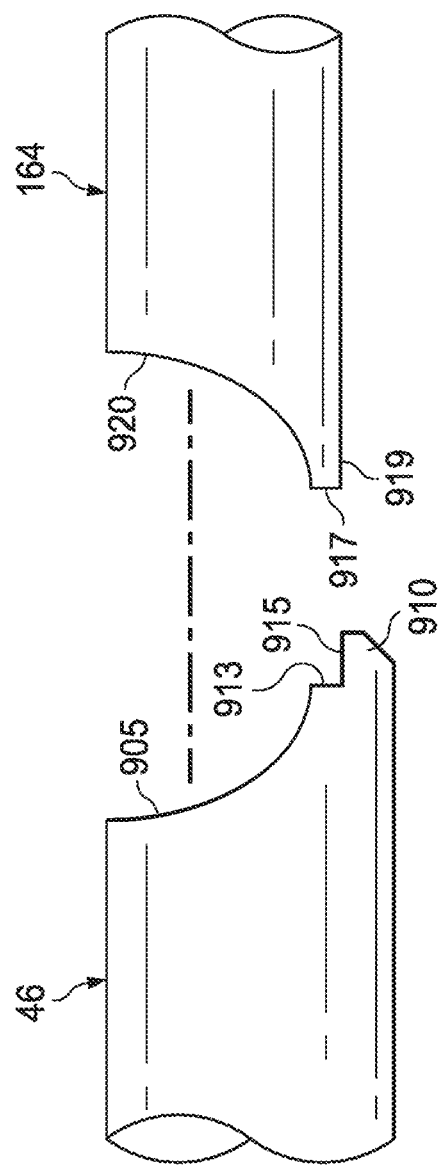
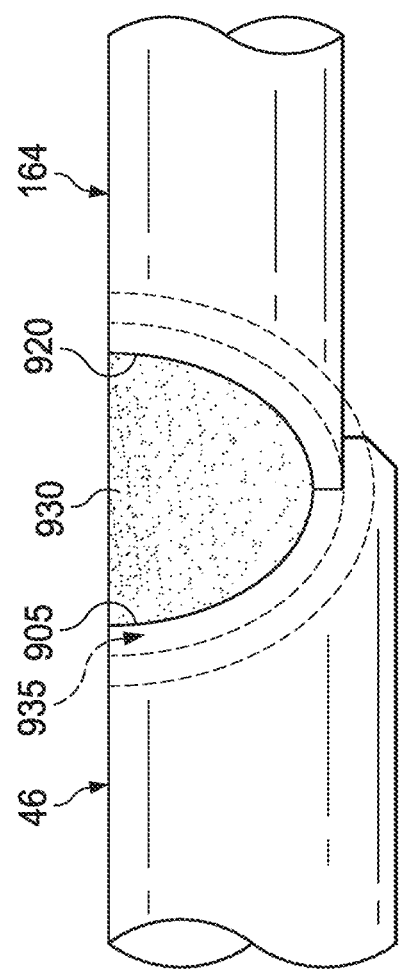

POWER END FRAME ASSEMBLY FOR RECIPROCATING PUMP

CROSS-REFERENCE TO RELATED APPLICATIONS

This application is a continuation of U.S. patent application Ser. No. 14/808,513, filed Jul. 24, 2015, now pending, which claims priority to U.S. Provisional Patent Application No. 62/155,793, filed May 1, 2015, U.S. Provisional Patent Application No. 62/095,689, filed Dec. 22, 2014, and U.S. Provisional Application No. 62/029,271, filed Jul. 25, 2014, each of which are incorporated herein by reference in their entireties.

TECHNICAL FIELD

This disclosure relates to a reciprocating pump assembly, and in particular, a power end housing for a reciprocating pump assembly, and even more particularly, to a frame assembly for a power end housing.

BACKGROUND OF THE DISCLOSURE

In oil field operations, reciprocating pumps are used for various purposes. For example, reciprocating pumps are commonly used for operations, such as cementing, acidizing, or fracing a well. Oftentimes, these reciprocating pumps are mounted to a truck, a skid or other type of platform for transport to and from the well sites. In operation, such pumps deliver a fluid or slurry at pressures up to and around 20,000 psi; however, due to such extreme operating conditions, these pumps are susceptible to damage from forces caused by excessive vibrations, bending moments and/or deformation.

A typical reciprocating pump includes a fluid end and a power end, the power end configured to reciprocatingly move one or more plungers toward and away from a corresponding fluid end pump chamber. Each chamber includes an intake port for receiving fluid, a discharge port for discharging the pressurized fluid, and a one-way flow valve in each port for preventing reverse fluid flow.

Manufacturing and assembling conventional power end housings is oftentimes difficult and cumbersome due to, for example, the sheer weight of the housing, the need for precise alignment certain components, and the difficultly in accessing certain areas of the housing, such as, for example, accessing and installing the crankshaft bearings within the housing.

Thus, there is a need for a pump design, and in particular, a power end housing for a reciprocating pump, having a decreased weight, that can be easily assembled while at the same time able to reduce the likelihood of damage due to excessive forces caused by excessive vibrations, bending moments and/or deformation.

SUMMARY

In a first aspect, there is provided a plate segment for a reciprocating pump power end frame assembly, the power end frame assembly having a pair of end plate segments and at least one middle plate segment disposed between the end plate segments, the plate segment consisting of the middle plate segment or one of the pair of end plate segments. In some embodiments, the plate segment includes a plate having a front wall, a rear wall, a top wall, a bottom wall and a pair of sidewalls. The plate segment also includes at least one opening forming a bearing support surface, the opening extending through the plate, and at least one extension extending from at least one of the sidewalls of the plate at a position to align with and contact a corresponding extension on an adjacently positioned plate.

In certain embodiments, the at least one extension is integrally formed with at least one of the sidewalls of the plate.

In other certain embodiments, the extension is a gusset extending from at least one of the sidewalls of the plate.

In another embodiment, the at least one extension includes a plurality of extensions extending from at least one of the sidewalls of the plate adjacent the bearing support surface.

In yet another embodiment, the at least one extension forms at least a portion of the front wall.

In still another embodiment, the at least one extension forms at least a portion of the rear wall.

In other embodiments, the plate is formed of forged steel.

In yet other embodiments, the plate includes at least one foot extending from the bottom wall to support the plate on a support surface.

In some embodiments, if the plate is an end plate segment, the end plate segment includes a pair of support feet extending from the bottom wall to support the plate on a support surface.

In other embodiments, the at least one extension forms at least a portion of the top wall.

In a second aspect, there is provided a method of assembling a power end for a reciprocating pump, the power end having a plurality of spaced apart frame segments. In some embodiments, the method includes providing a first and second frame segment, each of the frame segments having at least one extension extending from a sidewall. In some embodiments, the method also includes positioning the first frame segment adjacent the second frame segment and aligning the at least one extension of the first segment with the at least one extension of the second segment such that the at least one extension of the first segment and the at least one extension of the second segment are in contact with each other. In other embodiments, the method also includes securing the at least one extension of the first segment and the at least one extension of the second segment together to attach the first frame segment to the second frame segment.

In certain embodiments, the method also includes positioning the first frame segment to form a sidewall of the power end and positioning the second frame segment adjacent the first frame segment to form a middle segment of the power end.

In other embodiments, the method includes forming the first and second frame segments by forging.

In yet other embodiments, securing the at least one extension of the first segment and the at least one extension of the second segment together includes welding ends of the extensions together.

In another embodiment, the method includes forming the at least one extension of at least one of the first frame segment and the second frame segment at a front wall of the respective frame segment.

In yet another embodiment, the method includes forming the at least one extension of at least one of the first frame segment and the second frame segment at a rear wall of the respective frame segment.

In still another embodiment, the method includes forming the at least one extension of at least one of the first frame segment and the second frame segment at a top wall of the respective frame segment.

In other embodiments, the method includes forming the at least one extension of at least one of the first frame segment and the second frame segment at a bottom wall of the respective frame segment.

In certain embodiments, the method includes forming an opening in each of the first and second frame segments to form a bearing support surface for supporting a bearing assembly.

In other certain embodiments, the method includes providing a plurality of extensions around the bearing support surfaces.

In another embodiment, the method includes supporting at least a portion of a crosshead tube on at least one of the plurality of extensions around the bearing support surfaces.

In yet another embodiment, the method includes forming a recessed portion on at least a portion of the plurality of extensions to support at least a portion of a crosshead tube.

In a third aspect, there is provided a power end frame assembly for a reciprocating pump. In some embodiments, the power end frame includes a first and second end plate segment; at least one middle plate segment disposed between the first and second end plate segments; and each of the end plate segments and the at least one middle plate segment including at least one foot for supporting the power end frame assembly on a support surface.

In some embodiment, the power end frame assembly includes a crosshead support member extending between the first and second end plate segments, the crosshead support member secured to each of the first and second end plate segments and the at least one middle plate segment, the crosshead support member for supporting at least a portion of at least one crosshead tube.

In other embodiments, the crosshead support member includes a plurality of spaced apart recessed surfaces to support at least a portion of at least one crosshead tube.

In still other embodiments, the crosshead support member further includes a plurality notches sized to receive at least a portion of the first and second end plate segments and the at least one middle plate segment.

In another embodiment, the first and second end plate segments and the at least one middle plate segment each includes an opening extending therethrough to support a bearing assembly.

In still another embodiment, the at least one middle plate segment includes two spaced apart middle plate segments.

In certain embodiments, the at least one middle plate segment includes four middle plate segments.

In other certain embodiments, the frame assembly includes a plurality of extensions extending between the first and second end plate segments and the at least one middle plate segment.

In another embodiment, at least one of the plurality of extensions is integrally formed with an end plate segment.

In still another embodiment, at least one of the plurality of extensions is integrally formed with the at least one middle plate segment.

In some embodiments, the first and second end plate segments each includes a pair of support feet.

In other embodiments, the frame assembly further includes an exterior skin member extending between the at least one middle plate segment and the first and second end plate segments.

In a fourth aspect, there is provided a power end frame assembly for a reciprocating pump, the power end frame assembly including a first plate segment; a second plate segment disposed parallel to the first plate segment; and a crosshead support member secured to and extending between the first plate segment and the second plate segment, the crosshead support member configured for supporting at least a portion of a crosshead tube.

In some embodiments, the at least a portion of the crosshead support member is formed integral with the first plate segment and at least another portion of the crosshead support member is formed integral with the second plate segment.

In other embodiments, the crosshead support member includes a recessed portion to support at least a portion of a crosshead tube therein.

In yet other embodiments, the crosshead support member further includes a plurality of notches sized to receive and secure to at least a portion of the first and second plate segments.

In another embodiment, the first and second plate segments each includes a bearing support surface forming an opening extending therethrough, the bearing support surface configured to receive and support a bearing assembly thereon.

In certain embodiments, the power end frame assembly includes at least two middle plate segments disposed between the first and second plate segments.

In other certain embodiments, the crosshead support member extends between the first and second plate segments and through an opening in each of the middle plate segments.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

FIG. 19 is a perspective view of another embodiment of a middle plate segment.

FIG. 52 is a side view of the arm member of FIG. 51.

FIG. 53 is a section view of the arm member of FIG. 51 taken along the line 53-53 of FIG. 52.

FIG. 61 is an exploded cross sectional view of a portion of a middle plate segment of FIG. 19 and a portion of the bottom skin assembly of FIG. 10B.

FIG. 62 is a cross sectional view of the bottom skin and middle plate segment of FIG. 61 welded together.

DETAILED DESCRIPTION

Figure 1:
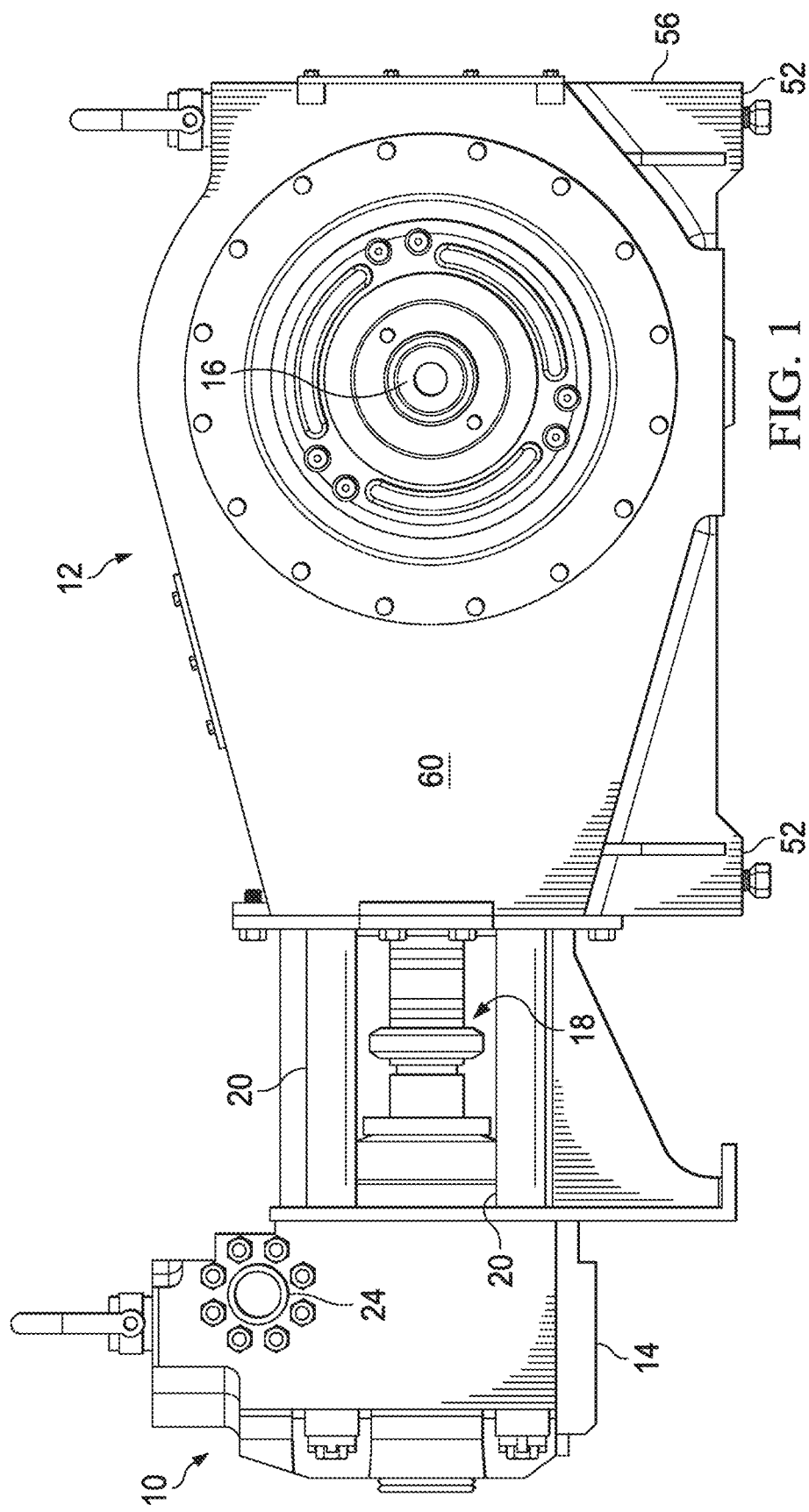
FIG. 1 is an illustration of a reciprocating pump assembly having a power end housing and a fluid end housing.

FIG. 1 is an illustration of a reciprocating pump assembly 10, such as, for example, a reciprocating plunger pump. Reciprocating pumps can be used, for example, as frac pumps, mud pumps, cement pumps, and the like. Terminology may be used in this disclosure that is commonly used in a given pump system; however, unless otherwise stated, this disclosure also includes comparable components of other pump systems (e.g., crossheads and pistons). Referring to FIG. 1, the pump assembly 10 includes a power end housing 12 coupled to a fluid end housing 14 via a plurality of stay rods 20. The power end housing 12 includes a crankshaft 16 depicted, for example, in FIG. 40), which is mechanically connected to a motor (not shown), which in operation, rotates the crankshaft 16 in order to drive the reciprocating pump assembly 10. In particular, rotation of the crankshaft 16 causes a plunger assembly 18 to reciprocate toward and away from the fluid end housing 14, which causes fluid to be pumped from one or more fluid cylinders (not illustrated) in the fluid end housing 14 through a discharge port 24. In one embodiment, the crankshaft 16 is cammed so that fluid is pumped from a plurality of cylinders in the fluid end housing 14 to minimize the primary, secondary and tertiary forces associated with reciprocating pumps 10. According to embodiments disclosed herein, the power end housing 12 employs a frame assembly 40 (FIGS. 2A and 2B), which provides for increased structural rigidity (i.e., increased resistance to deformation and/or deflection) and ease of assembly.

Figure 2A:
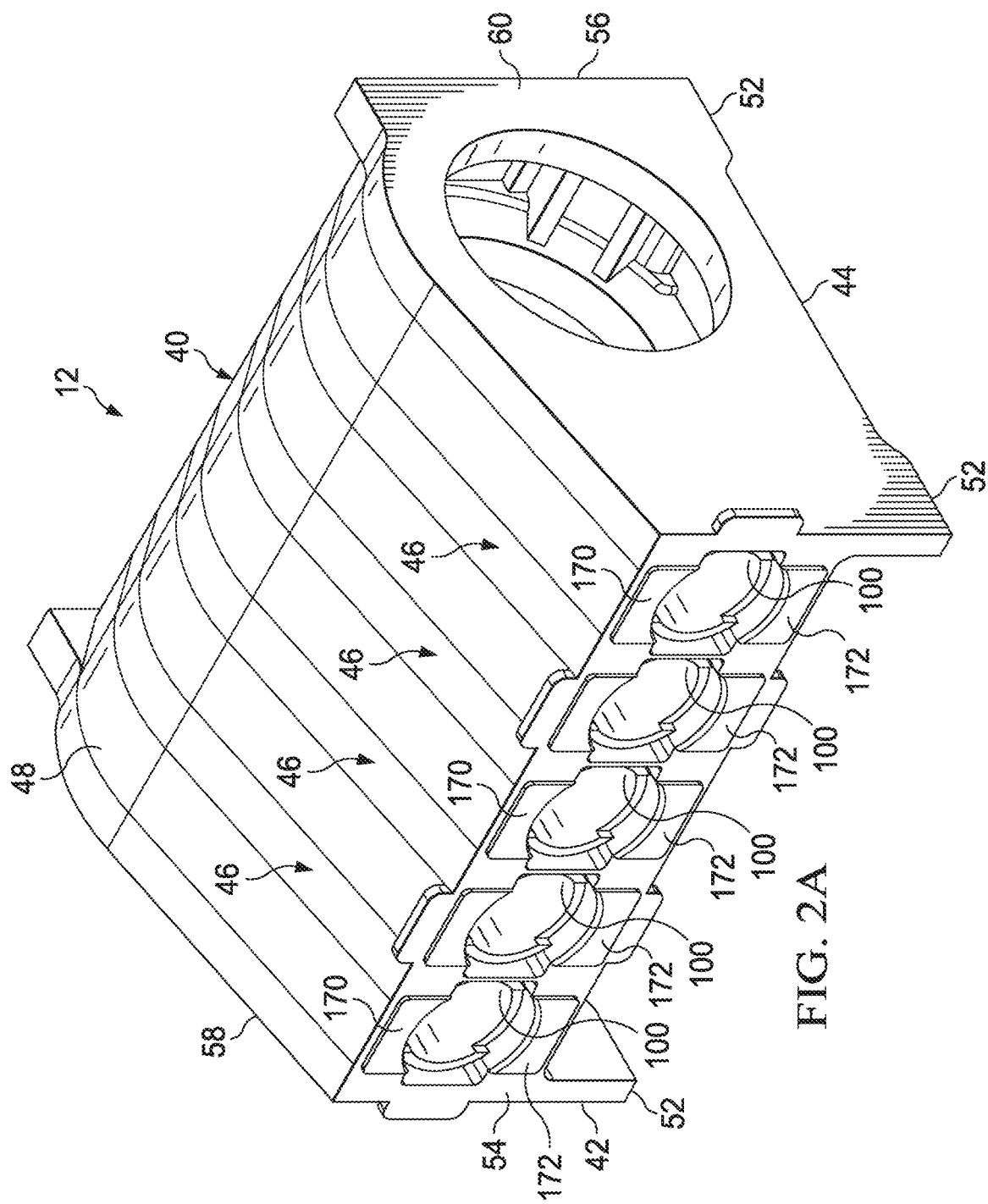
FIG. 2A is a top perspective view of a frame assembly of the power end housing of FIG. 1.
Figure 2B:
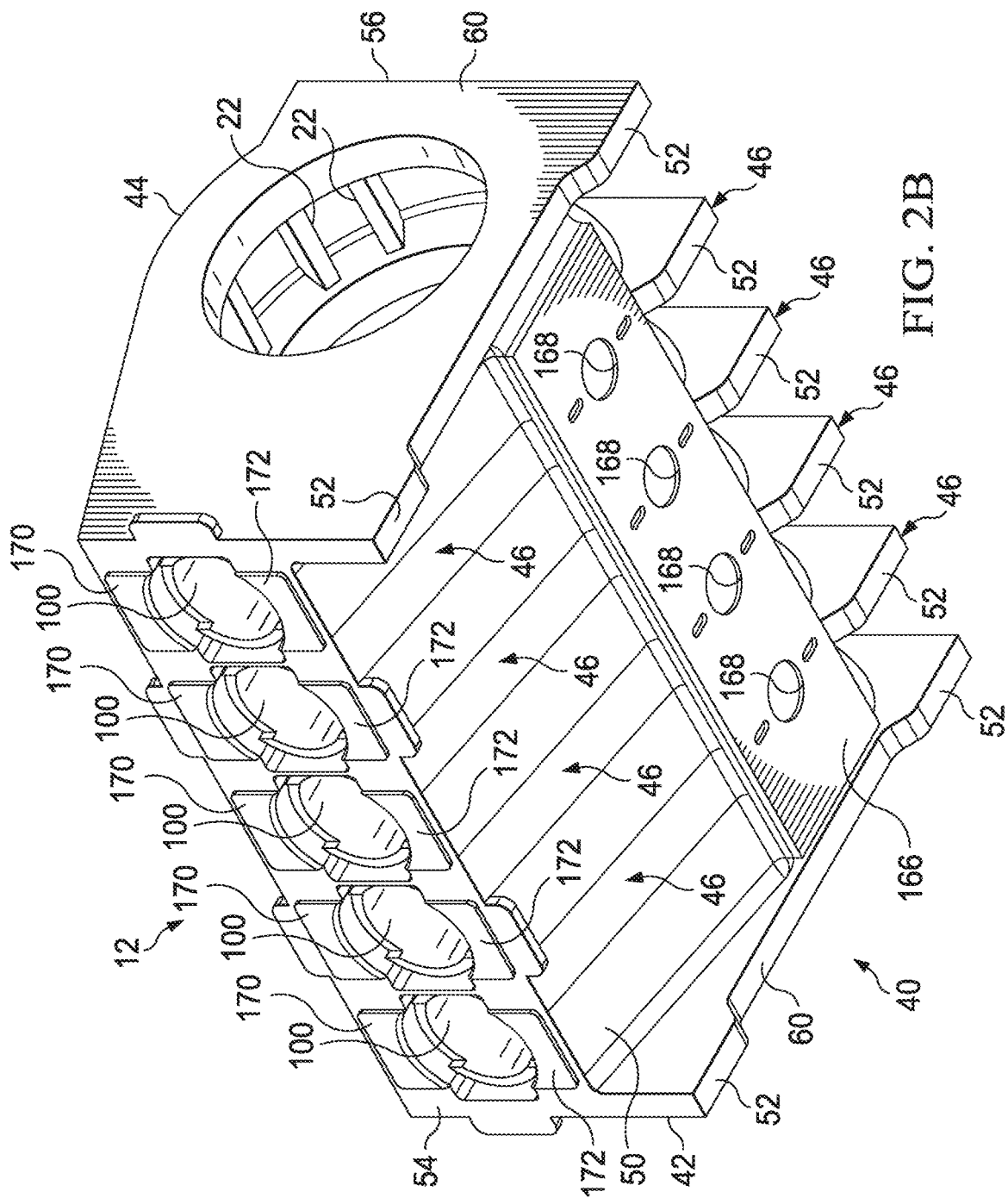
FIG. 2B is a bottom perspective view of the frame assembly of FIG. 2B.

In the embodiment illustrated in FIGS. 2A and 2B, the frame assembly 40 includes a pair of end segments 42 and 44, a plurality of middle segments 46, a top skin assembly 48 and a bottom skin assembly 50 forming a forward or front wall 54, a rear or back wall 56, and a pair of sidewalls 58 and 60. In the embodiment illustrated in FIGS. 2A and 2B, for example, the frame assembly 40 includes four equally spaced apart middle segments 46 disposed between the end segments 42 and 44 to accommodate, as discussed in further detail below, five plunger assemblies 18 thereby forming a quintuplex pump assembly. However, it should be understood the frame assembly 40 is otherwise configurable. For example, the frame assembly 40 is configurable to accommodate a duplex pump assembly, which can include at least one middle segment 46 disposed between the end segments 42 and 44. Likewise, the frame assembly 40 is configurable to accommodate a triplex pump assembly, which includes two spaced apart middle segments 46 disposed between the end segments 42 and 44. According to some embodiments, each of the segments 42, 44 and 46 are laterally spaced apart approximately twelve inches, although depending on the size of the pump assembly 10, the lateral spacing may be a longer or shorter distance. In yet other embodiments, the lateral spacing is not equal for the middle segments 46. In other embodiments, the frame assembly 40 is configured to include at least one segment 42 or 44. In still other embodiments, the frame assembly 40 includes at least one segment 42 or 44 and does not include the middle segments 46.

In the embodiment illustrated in FIGS. 2A and 2B, the frame assembly 40 includes a plurality of feet 52, which, as discussed in greater detail below, are configured to support the power end housing 12 on a support surface, such as, for example, a skid, a truck bed, trailer or other type of platform. In FIG. 2B, for example, each end segment 42 and 44 includes a foot 52 near or adjacent to the forward wall 54 and a foot 52 near or adjacent the rear wall 56. Furthermore, in the embodiment illustrated in FIG. 2B, each middle segment 46 includes a foot 52 extending near or adjacent to the rear wall 56. It should be understood, however, that the number, size and position of each foot 52 is variable depending on the desired configuration. For example, in some embodiments, an end segment 42 or 44 includes a single foot 52 extending entirely or at least partially between the front and rear walls 54 and 56. In some embodiments, one or more additional feet 52 are otherwise positionable between the feet 52 that are located near or adjacent to the front and rear walls 54 and 56. Thus, for example, in one embodiment, an end segment 42 or 44 includes three, four or even more spaced apart feet 52 for supporting the power end housing 12. In the embodiment illustrated in FIGS. 2B, the feet 52 are integrally formed on segments 42, 44 and 46; however, it should be understood that in other embodiments, the feet 52 are separately attachable to the segments 42, 44 and/or 46.

With continued reference to FIG. 2B, each middle segment 46 includes a single foot 52 generally near or adjacent to the rear wall 56. In alternate embodiments, each middle segment 46 includes additional feet 52. For example, in some embodiments, a middle segment 46 includes a foot 52 (not illustrated) at or near the front wall 54 or at any other position between the front and rear wall 54 or 56 in addition to the foot 52 at or near the rear wall 56. In the embodiment illustrated in FIG. 2B, for example, a total of eight feet 52 are used to support the power end housing 14 on a support surface (not illustrated). As will be discussed in greater detail below, the provision of additional feet 52 on the frame assembly 40, and in particular, feet 52 on middle segments 46, provide an increased stiffness resulting in less deflection and/or deformation of the frame assembly 40 during operation the reciprocating pump 10 thereby increasing the operating life of certain components, such as, for example, the bearings utilized to support the crankshaft 16.

Figure 3:
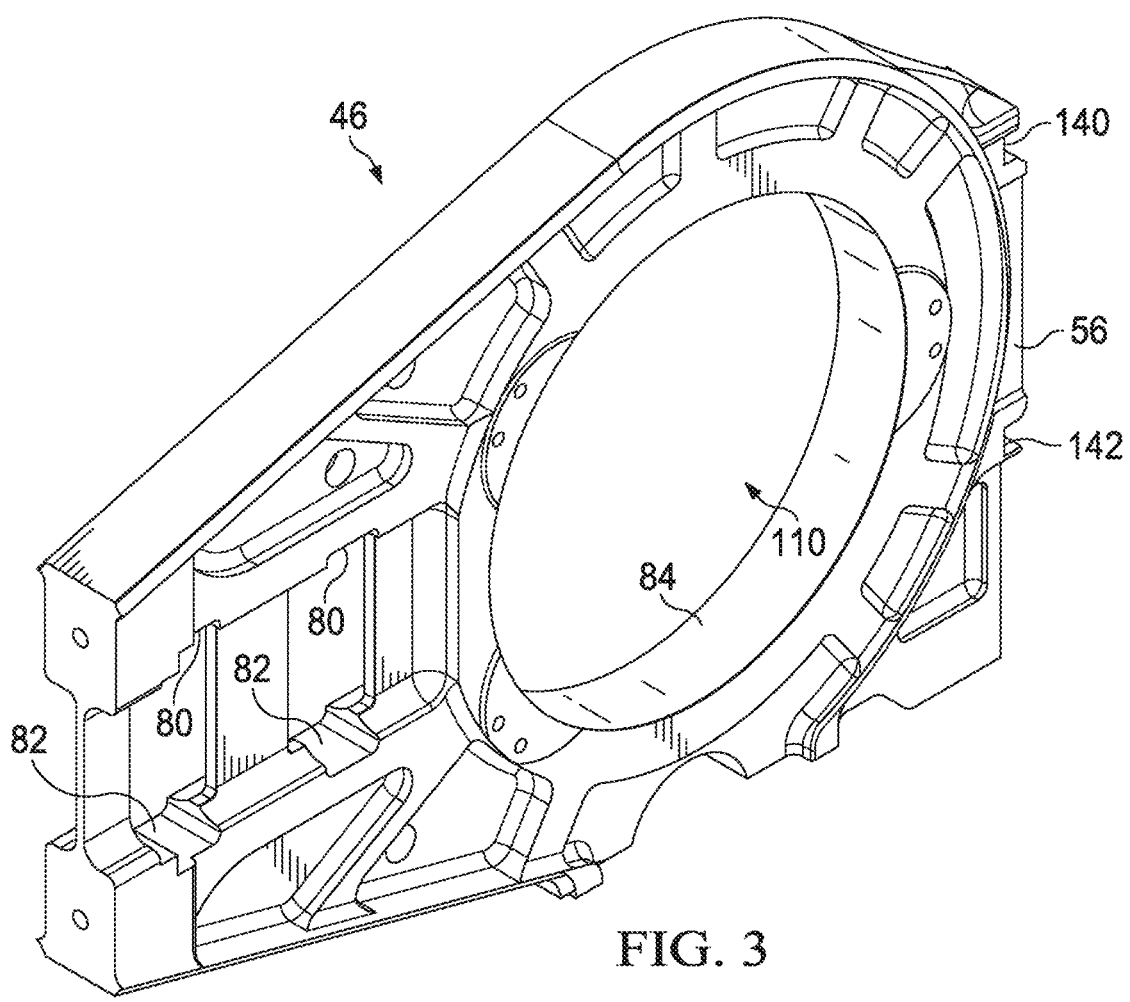
FIG. 3 is front perspective view of a middle plate segment of the frame assembly of FIGS. 2A and 2B.
Figure 4:
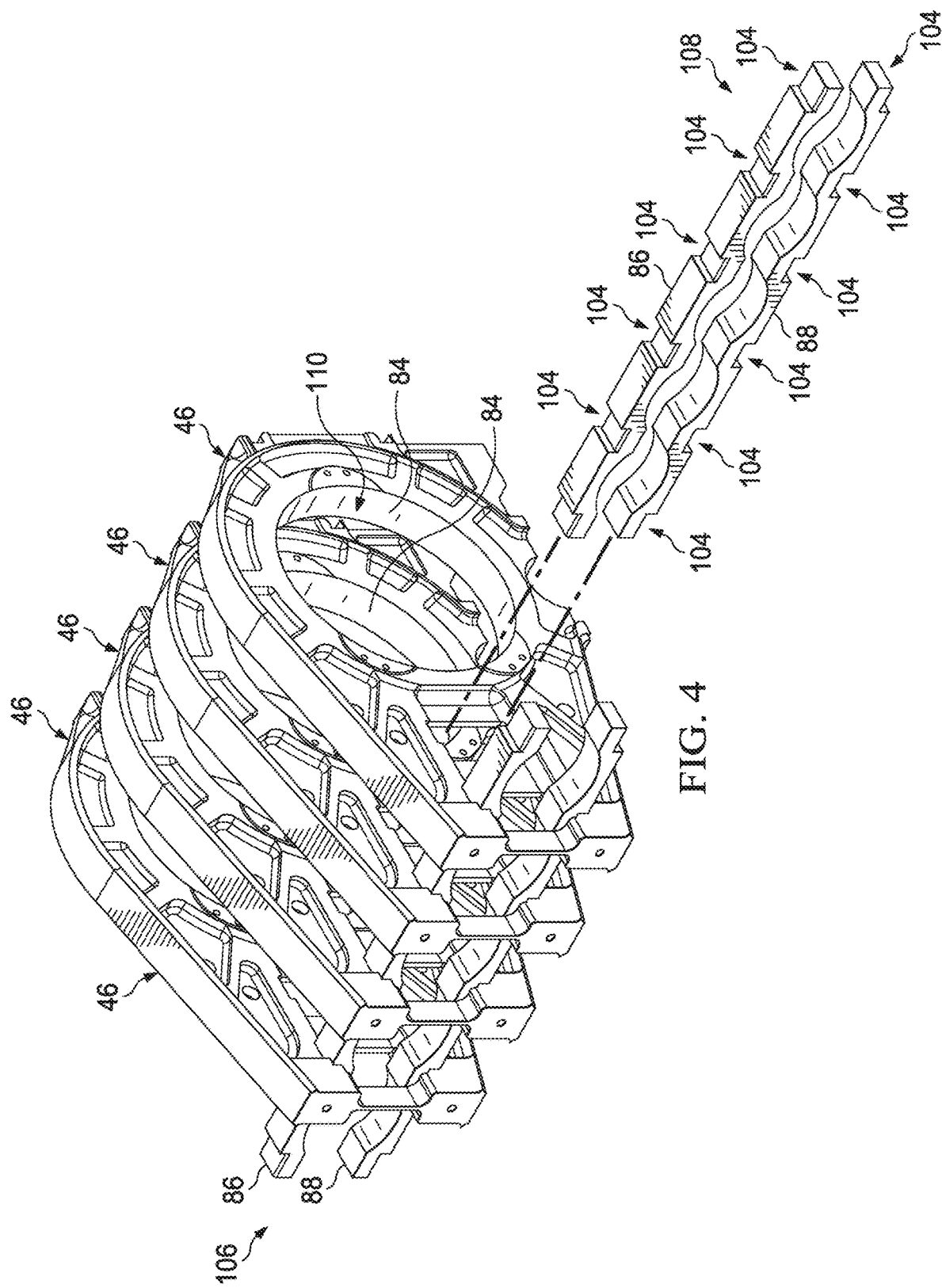
FIG. 4 is a partial exploded front perspective view of a plurality of the middle plate segments of FIG. 3 having a plurality of crosshead support bars.
Figure 5:
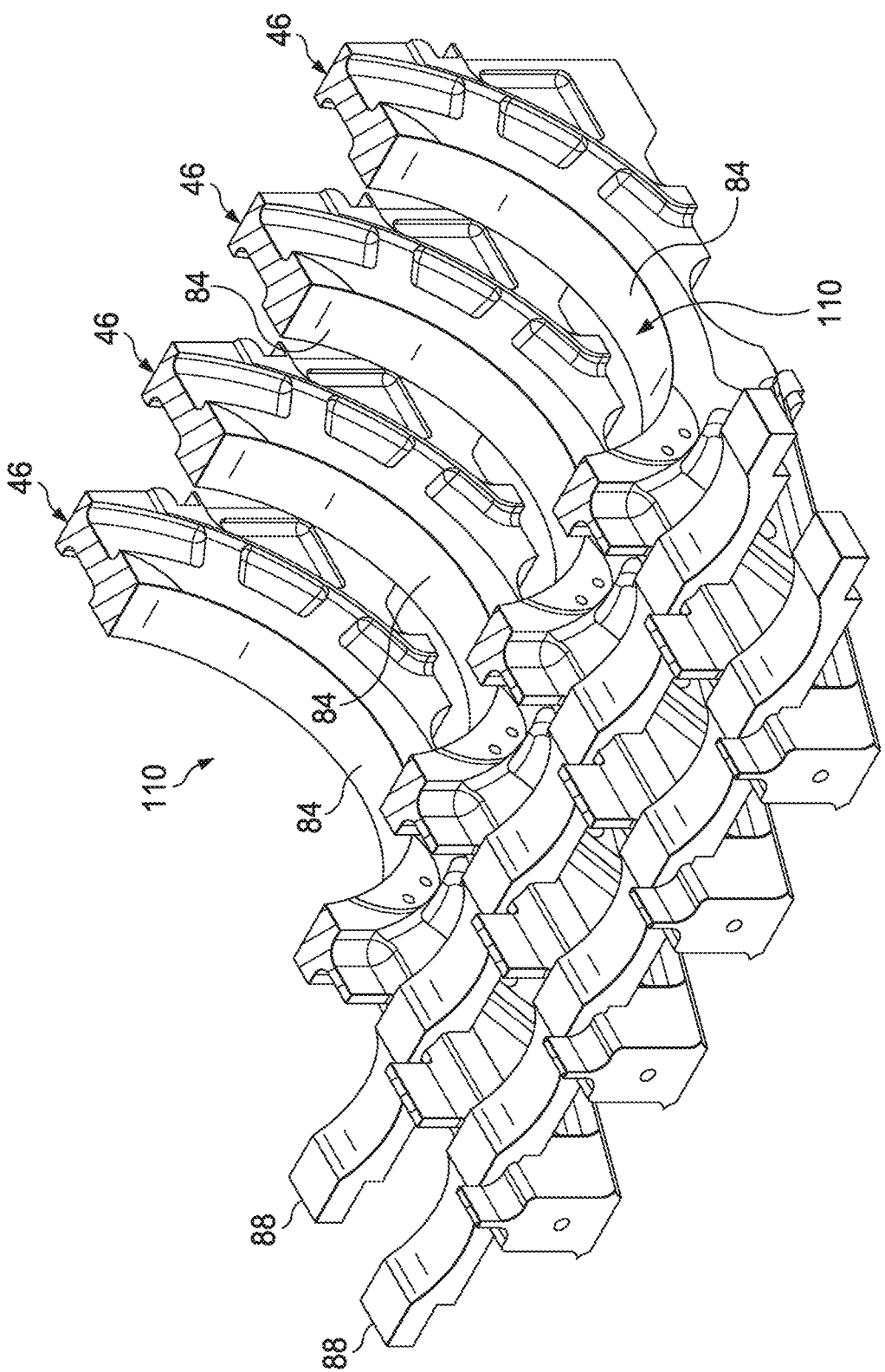
FIG. 5 is a section view of a portion of the frame assembly of FIG. 4 taken along the line 5-5.

Referring now to FIGS. 3-5, the middle segments 46 of FIGS. 2A and 2B are illustrated. In FIG. 3, for example, each middle segment 46 includes upper and lower grooves 80 and 82 and a bearing support surface 84. Upper and lower grooves 80 and 82 are positioned and otherwise sized so as to receive corresponding upper and lower crosshead support members 86 and 88 (FIG. 4) that, as explained in greater detail below, provide support for crosshead support tubes 100 (FIG. 9) and a means for more easily aligning and otherwise spacing apart the segments 42, 44 and 46. Furthermore, upper and lower support members 86 and 88 provide structural support to the segments 42, 44 and 46, and thus, the frame assembly 40. For example, referring specifically to FIGS. 3-6, each middle segment 46 is positioned such that the upper and lower grooves 80 and 82 are aligned to receive respective portions of the upper and lower crosshead support members 86 and 88. When secured together, the crosshead support members 86 and 88 provide additional rigidity to and maintain alignment of the segments 42, 44 and 46 and, thus, the frame assembly 40.

Figure 6:
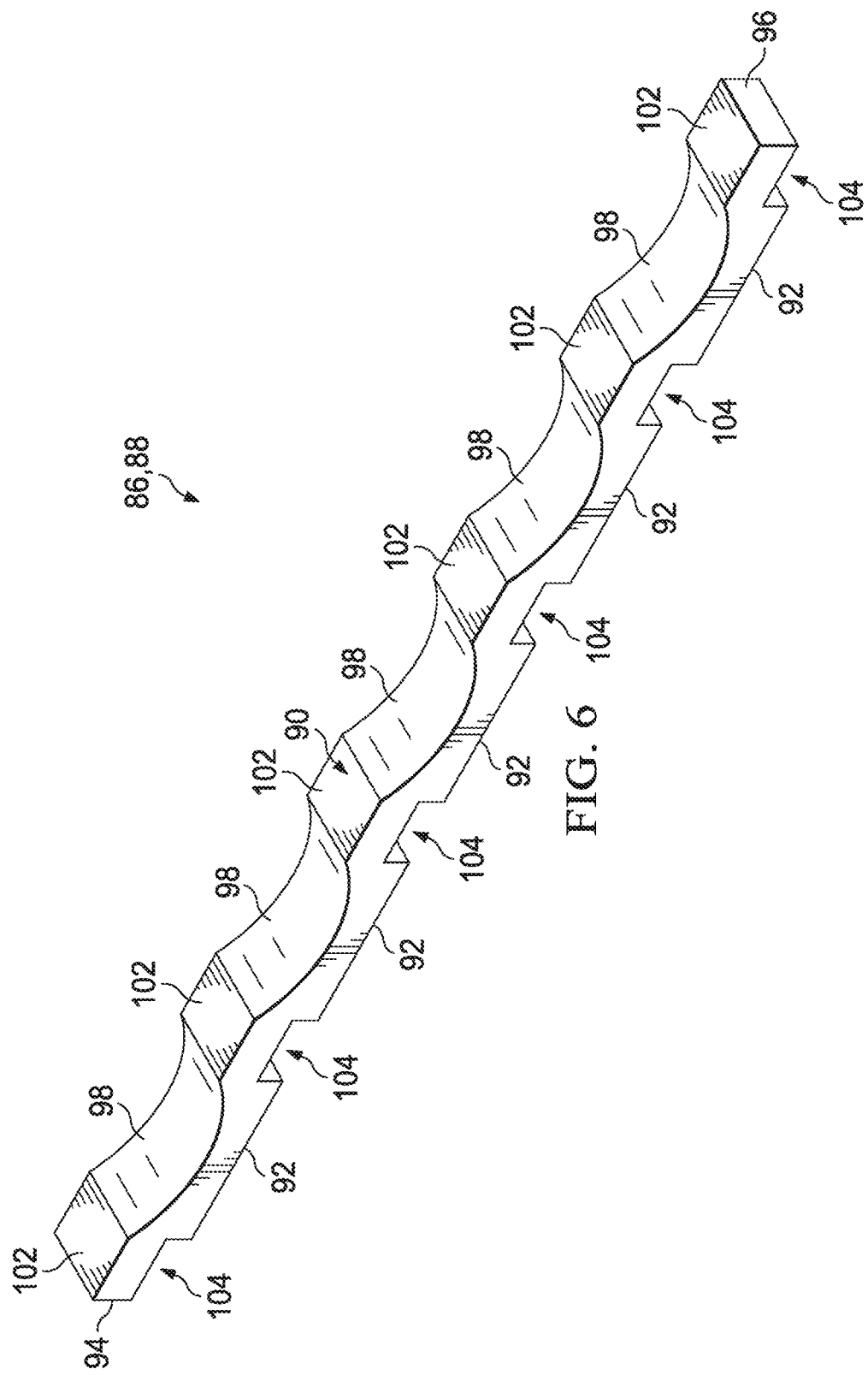
FIG. 6 is a perspective view of the crosshead support bar.
Figure 9:
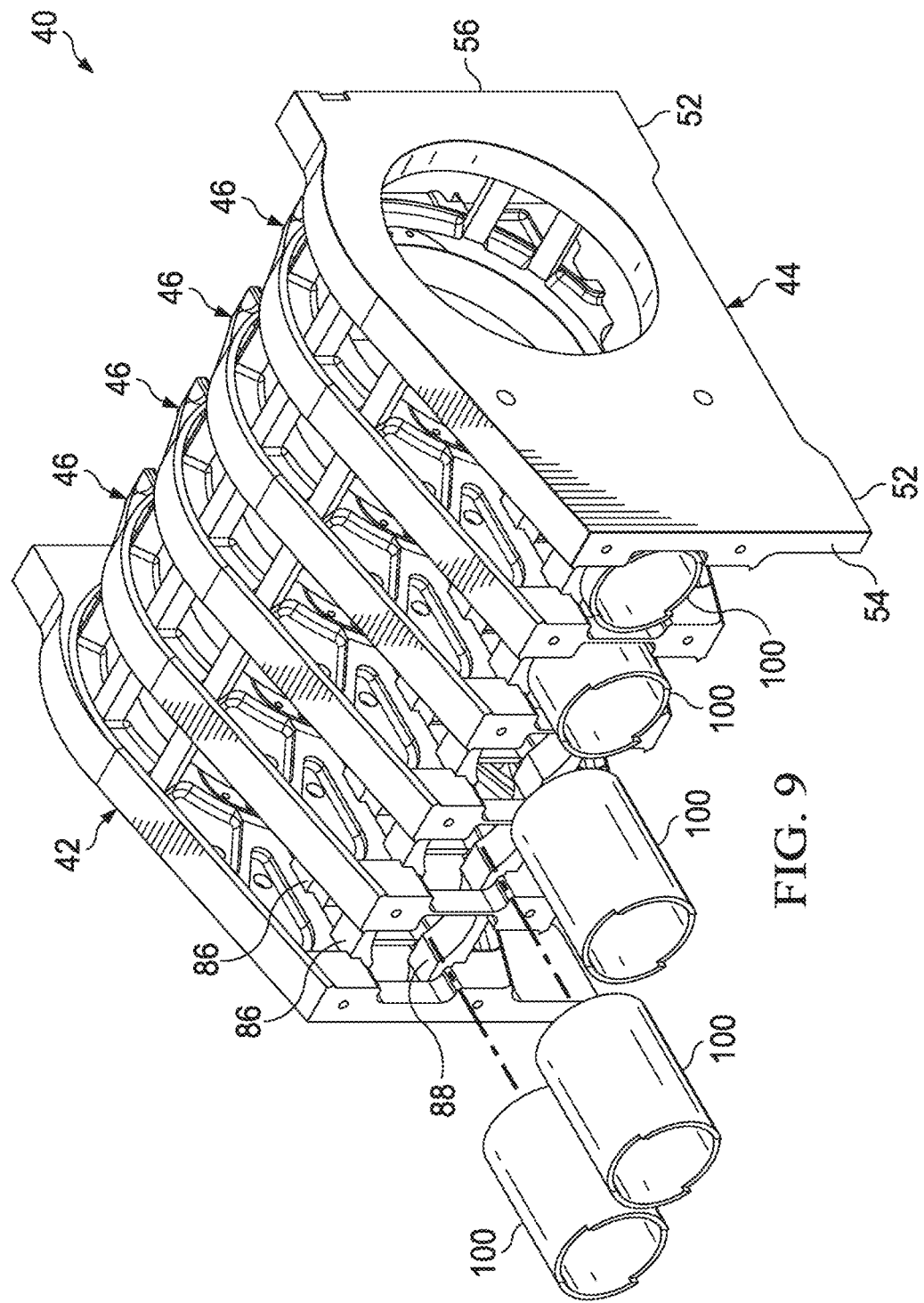
FIG. 9 is a partial exploded front perspective view of a portion of the frame assembly of FIGS. 2A and 2B with a plurality of crosshead support tubes supported therein.

Referring specifically to FIG. 6, the crosshead support members 86 and 88 are rigid rod-like members and are sized to extend through each of the middle segments 46 and attached to the end segments 42 and 44 (FIG. 9). In FIG. 6, the crosshead support members 86 and 88 are formed having a top surface 90, a bottom surface 92 and end surfaces 94 and 96. In the embodiment illustrated in FIG. 6, the top surface 90 includes a plurality of spaced apart recessed surfaces 98, each configured to receive and otherwise support at least a portion of a crosshead tube 100 (FIGS. 2A, 2B and 9) therein. Thus, for example, when the upper and lower crosshead support members 86 and 88 are positioned within the upper and lower grooves 80 and 82, respectively, the crosshead tubes 100 fit within and are supported by the recessed surfaces 98 in the upper and lower support members 86 and 88.

In the embodiment illustrated in FIG. 6, the recessed surfaces 98 are arcuately shaped and sized to receive and otherwise conform to the outer surface of the crosshead tubes 100. It should be understood, however, that the recessed surfaces 98 can be otherwise configured. For example, in some embodiments, the recessed surfaces 98 include non-arcuately formed notches or recessed areas. In other embodiments, spaced apart extension members (not illustrated) extend outward from the top surface 90 of the support members 86 and 88, the extension members being spaced apart a sufficient distance to receive and otherwise support the crosshead tube 100 therebetween to prevent movement of the crosshead tube 100 relative to the crosshead support member 86, 88.

With continued referenced to FIG. 6, each crosshead support member 86, 88 includes a support segment 102 extending between each of the recessed surfaces 98. The support segments 102 are configured to facilitate alignment and attachment of the support members 86, 88 to the segments 42, 44 and 46. In the embodiment illustrated in FIG. 6, for example, the bottom surface 92 of the support segments 102 includes an alignment notch or recessed portion 104 positioned to receive and otherwise engage the middle segments 46. Referring specifically to FIGS. 4 and 5, for example, the notches 104 on the upper and lower support members 86 and 88 are formed along the bottom surfaces 92 such that upon attachment of the support members 86 and 88 to the middle segments 46, such notches 104 are aligned with and are configured to conform and/or otherwise interlock with the segments 46.

In the embodiment illustrated in FIG. 4, the frame assembly 40 includes two upper crosshead support members 86 and two lower crosshead support members 88. For example, in FIGS. 3 and 4, each middle segment 46 includes a pair of parallel upper grooves 80 and a pair of parallel and corresponding lower grooves 82 to accommodate a front or first pair of crosshead tube support members 106 and a rear or second pair of crosshead support members 108. In other embodiments, additional pairs of crosshead support members 86 and 88 are utilized, such as, for example, a third pair (not illustrated) of crosshead support members 86 and 88 disposed between the first and second crosshead support members 106 and 108. Furthermore, in alternate embodiments, a single pair of crosshead support member 86 and 88 is utilized. Notwithstanding the number and/or position of the crosshead support members 86 and 88, the crosshead support members 86 and 88 assist in alignment of segments 42, 44 and 46, provide additional support and structural rigidity to the frame assembly 40, both during assembly and operation of the reciprocating pump assembly 10, and provide a means to support the crosshead tubes 100 within the frame assembly 40.

Figure 7:
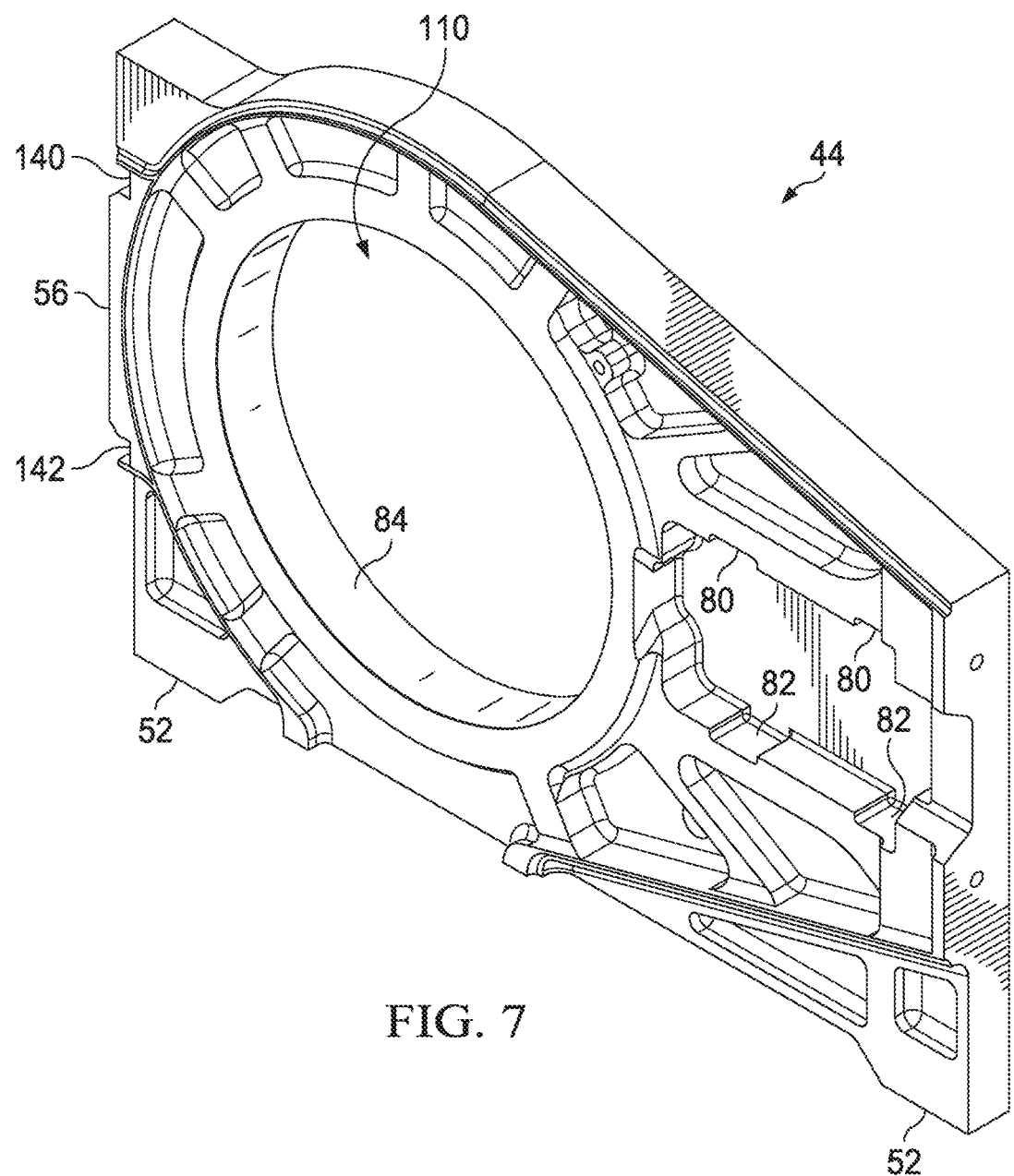
FIG. 7 is a front perspective view of an endplate segment of the frame assembly of FIGS. 2A and 2B.

Referring now to FIG. 7, the end segment 44 is illustrated. Similar to the middle segments 46, the end segment 44 includes a bearing support surface 84 and upper and lower grooves 80 and 82 configured to receive and otherwise mate with notches 104 adjacent the end surfaces 96 on the crosshead support members 86 and 88 (FIG. 6). While only end segment 44 is illustrated, it should be understood that end segment 42 contains a similar configuration for attachment to crosshead support members 86 and 88 at the opposite end surfaces 94.

Figure 40:
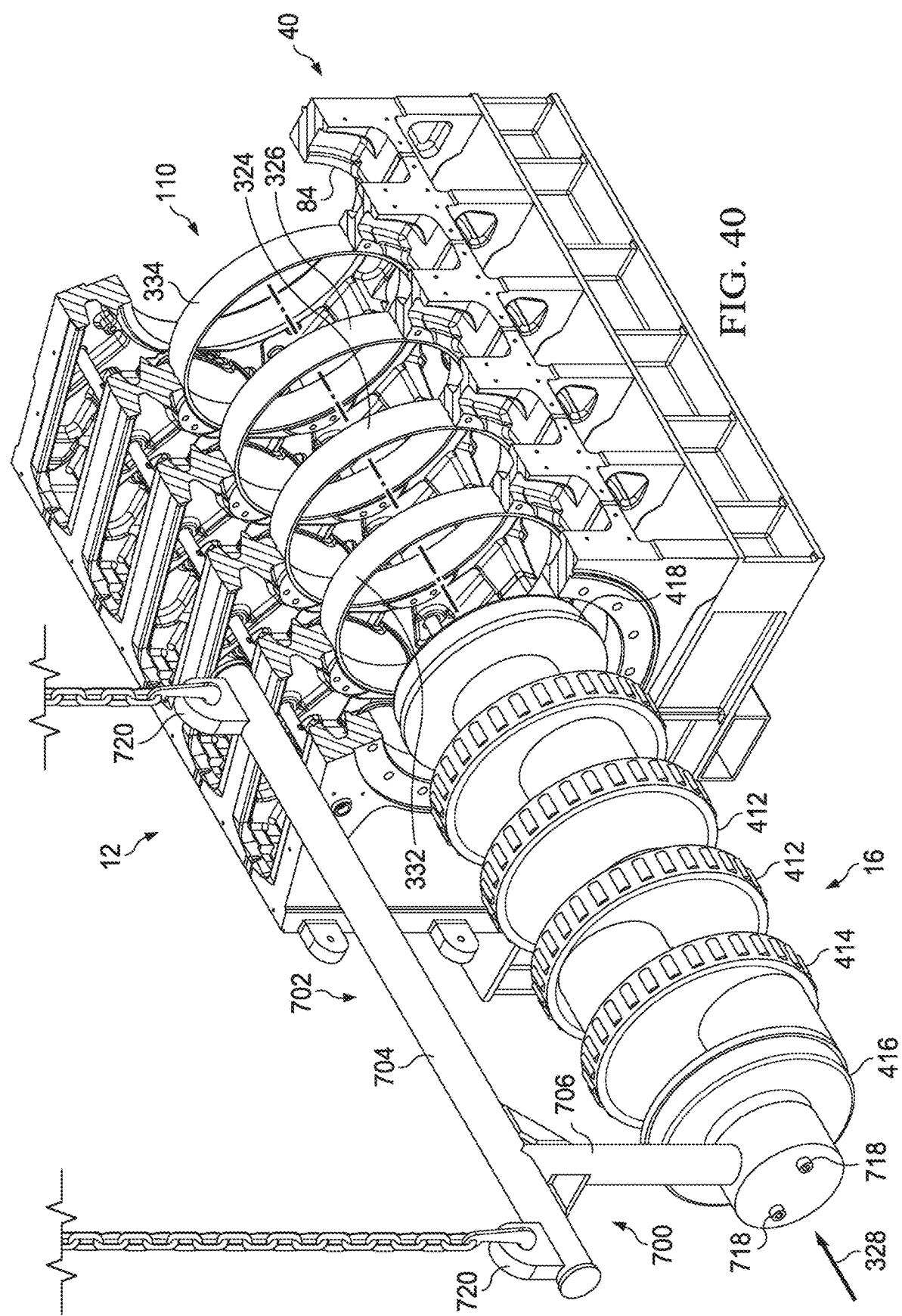
FIGS. 40-42 are illustrations of the crankshaft support member supporting the crankshaft during installation of the crankshaft onto the power end housing.
Figure 41:
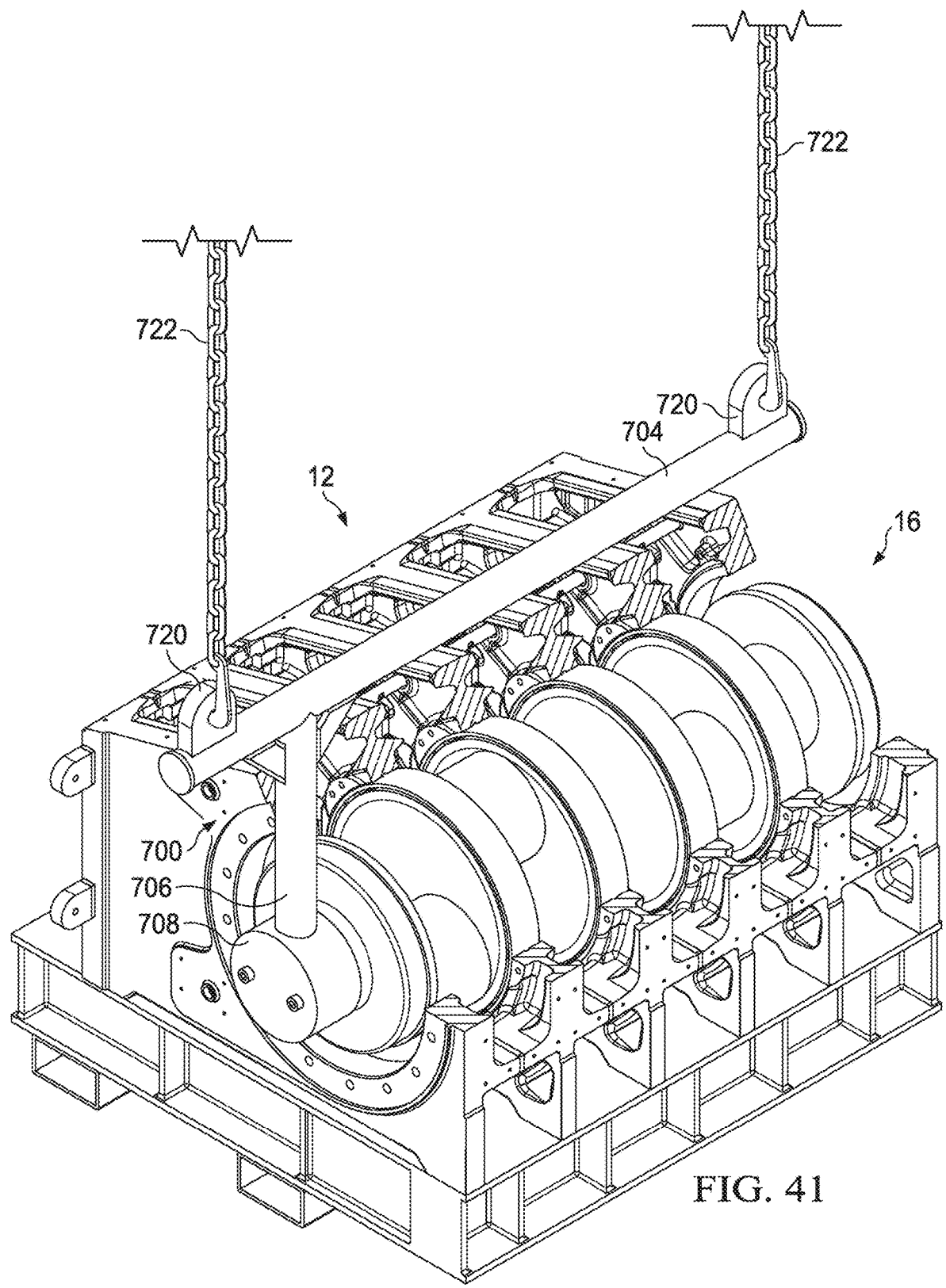
Figure 42:
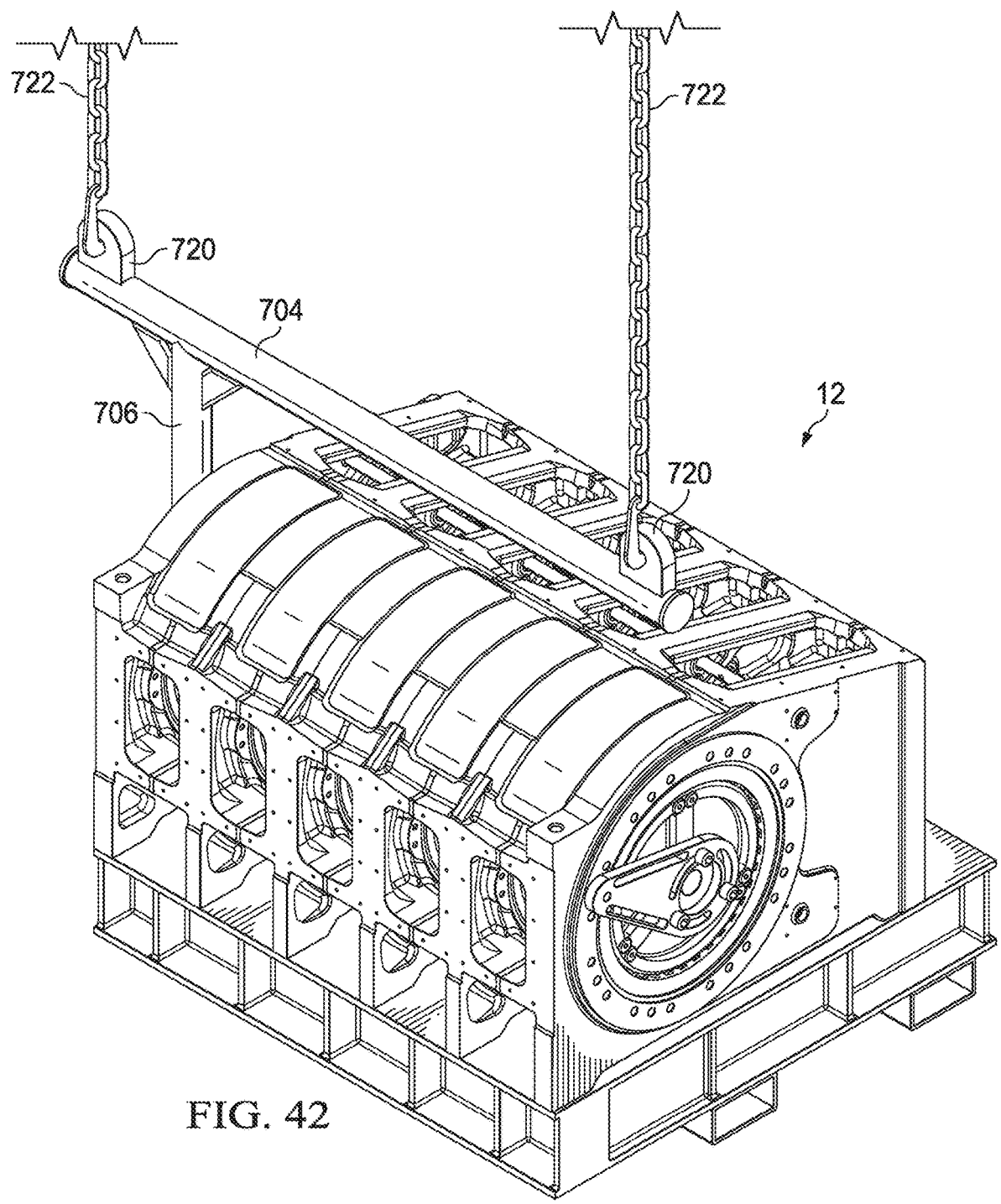

Referring specifically to FIGS. 3-5 and 7, the bearing support surfaces 84 form arcuately extending openings 110 extending through each of the end and middle segments 42, 44 and 46. As discussed in further detail below, the bearing support surfaces 84 are sized to receive a bearing assembly 290 (See FIGS. 21-38 and 40-46), which facilitate the rotational movement of the crankshaft 16 (FIG. 40). As will be discussed in greater detail below, the openings 110 formed by the bearing support surfaces 84 vary in size to facilitate the assembly of bearing assemblies 290 on respective segments 42, 44 and/or 46.

Figure 8:
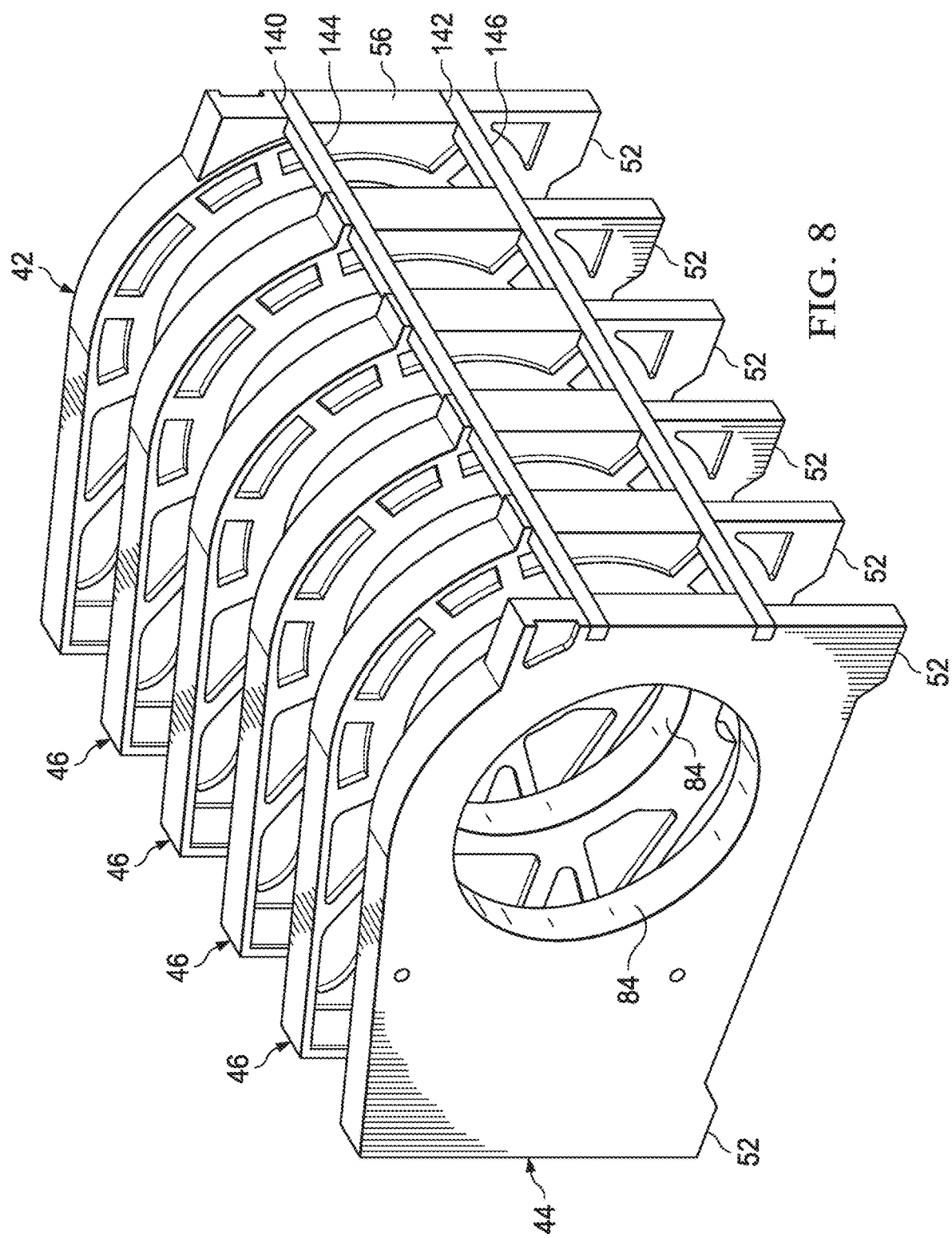
FIG. 8 is rear perspective view of a portion of the frame assembly of FIGS. 2A and 2B in which a plurality of rear support bars are secured thereto.

In FIGS. 3, 7 and 8, the rear walls 56 of the end and middle segments 42, 44 and 46 include upper and lower grooves 140 and 142. When the middle segments 46 are positioned and aligned between the end segments 42 and 44, as illustrated, for example, in FIG. 8, an upper rod member 144 and a lower rod member 146 are disposed therein to provide additional support and rigidity to frame assembly 40. In the embodiment illustrated in FIG. 8, two rod members 144 and 146 are illustrated. However, in other embodiments, a greater or fewer number of rod members 144 and 146 can be utilized. In yet other embodiments, the rod members 144 and 146 extend only a partial distance between the end segments 42 and 44. In other embodiments, the rod members 144 and 146 are configured in a position other than horizontally. For example, in some embodiments, the rod members 144 and/or 146 are angularly disposed along the rear wall 56 of the frame assembly 40. According to some embodiments, the rod members 144 and 146 each include spaced apart alignment notches configured to correspond to and otherwise engage with the rear wall 56 of the frame assembly 40. Such notches provide for ease of assembly and enable self-alignment of the segments 42, 44 and/or 46 during assembly.

Figure 10A:
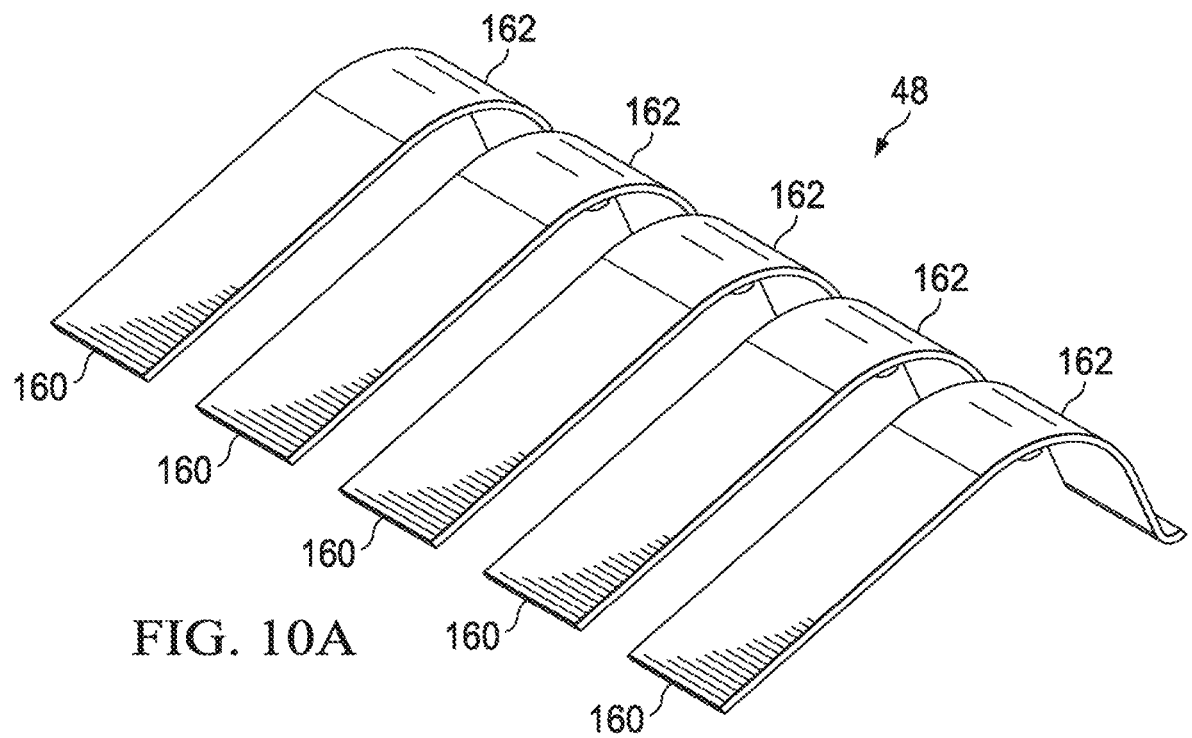
FIG. 10A is a top perspective view of a top skin assembly.

Referring to FIG. 9, once the crosshead support members 86 and 88 are secured to the frame assembly 40, and in particular, to the segments 42, 44 and 46, the crosshead tubes 100 are secured between crosshead support members 86 and 88 and are positioned generally adjacent to the front wall 54 of the frame assembly 40. Once the crosshead tubes 100 are secured thereto, the top skin assembly 48, as best illustrated in FIG. 10A, is secured to the frame assembly 40. In the embodiment illustrated in FIG. 10A, the top skin assembly 48 includes a front plate 160 and a rear curvilinear plate 162, which together are sized to cover and otherwise enclose the top portion of the power end housing 12 between the segments 42, 44 and/or 46 by extending from the front wall 54 to the rear wall 56 of the frame assembly 40. However, in alternate embodiments, the top skin assembly 48 is a single unitary plate extending between or at least partially between the front and rear walls 54 and 56. In the embodiment illustrated in FIGS. 2A and 10A, the top skin assembly 48 consists of a plurality of front and rear plates 160 and 162 that are mounted between each of the segments 42, 44 and 46 to enclose the top portion of the power end housing 12. In other embodiments, the top skin assembly 48, is formed of a single unitary sheet sized to overlay the upper or top portion of the frame assembly 40, which extends between the front wall 54, the rear wall 56 and the sidewalls 58 and 60.

Figure 10B:
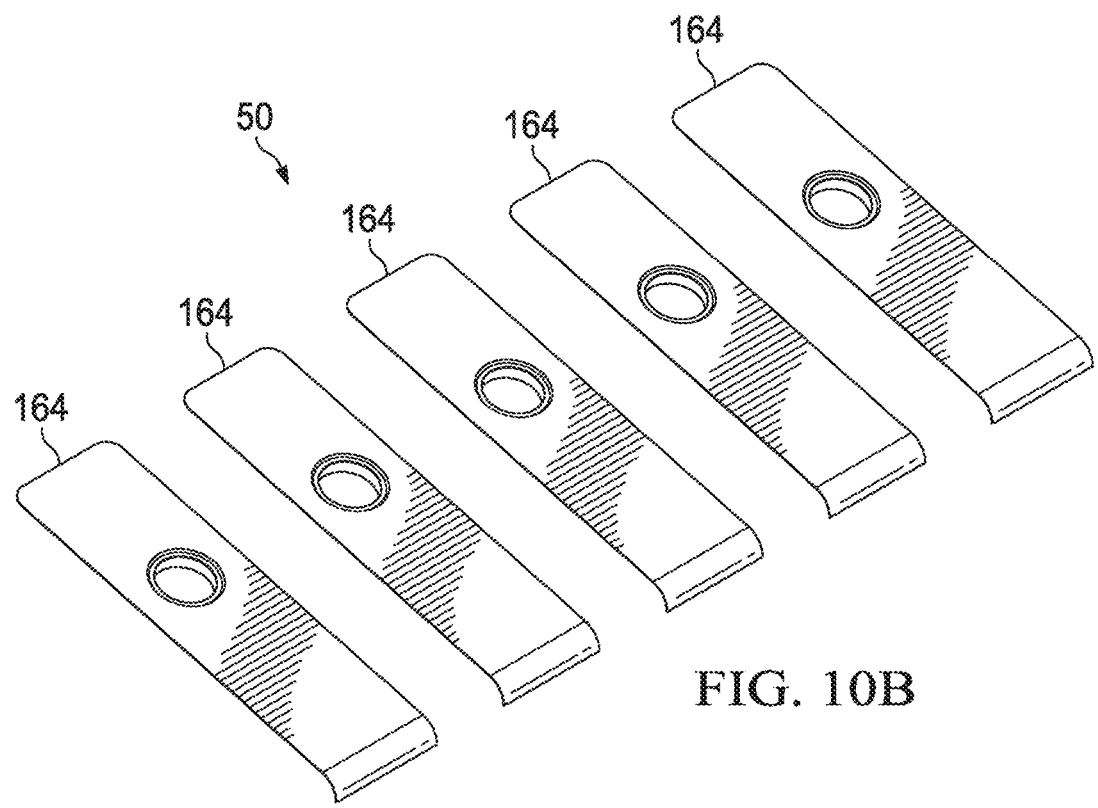
FIG. 10B is a bottom perspective view of a portion of a bottom skin assembly.
Figure 10C:
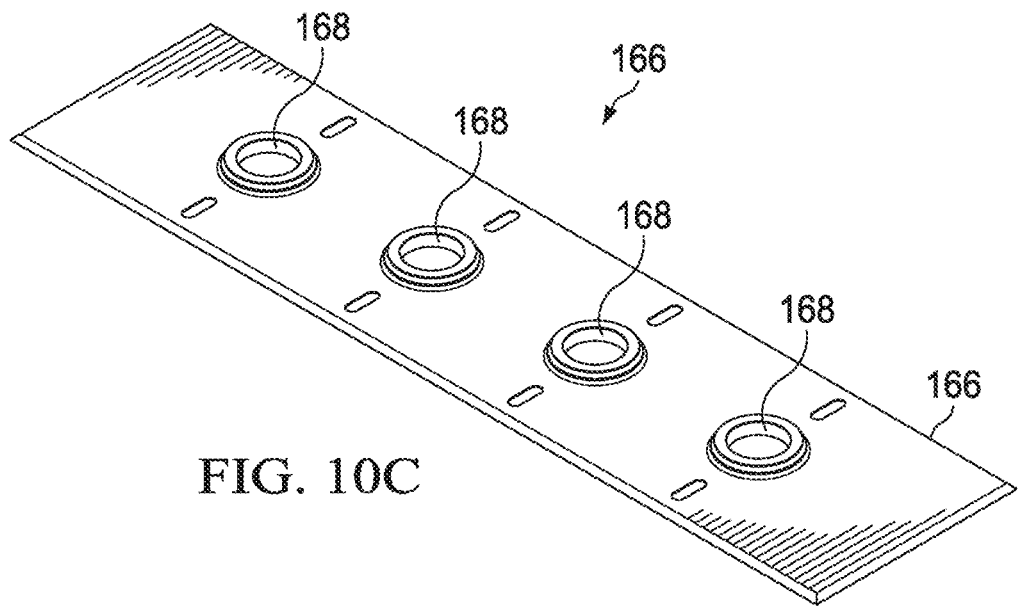
FIG. 10C is a perspective view of another portion of the bottom skin assembly.

Referring to FIGS. 2B and FIGS. 10B and 10C, the bottom skin assembly 50 is illustrated. The bottom skin assembly 50 includes a plurality of front plates 164 that are sized to fit between each of the segments 42, 44 and 46 and extending rearward from the front wall 54. The bottom skin assembly 50 further includes a drain plate 166 that extends between the end segments 42 and 44, as best illustrated in FIG. 2B. The drain plate 166 further includes a plurality of drain openings 168 aligned generally beneath the middle segments 46. In other embodiments, the bottom skin assembly 50 is formed of a single unitary sheet sized to overlay the bottom portion of the frame assembly 40, which extends between the front wall 54, the rear wall 56, and the sidewalls 58 and 60.

Figure 10D:
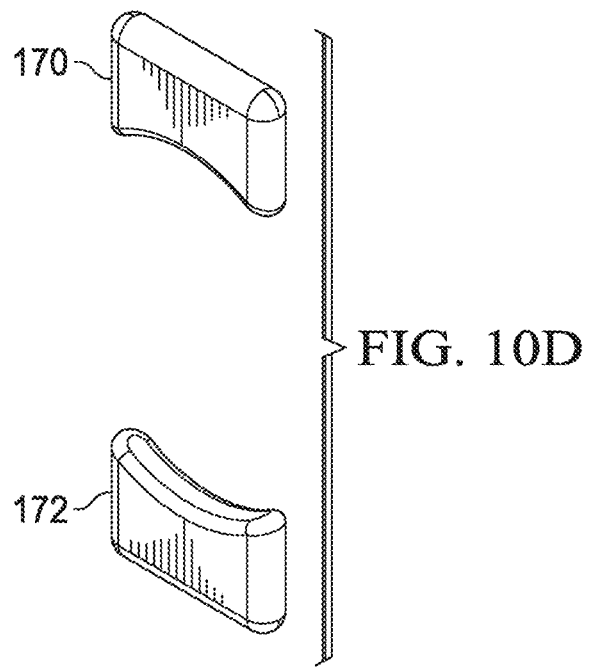
FIG. 10D is a front perspective view of upper and lower nose plates.

FIG. 10D illustrates upper and lower nose plates 170 and 172, which are secured to the frame assembly 40 to form at least a portion of the front wall 54, as best illustrated in FIG. 2A. In particular, an upper nose plate 170 is secured to the frame assembly 40, between segments 42, 44 and 46, above each crosshead tube 100. Likewise, a lower nose plate 172 is secured to the frame assembly 40, between segments 42, 44 and 46, below each crosshead tube 100.

Figure 11:
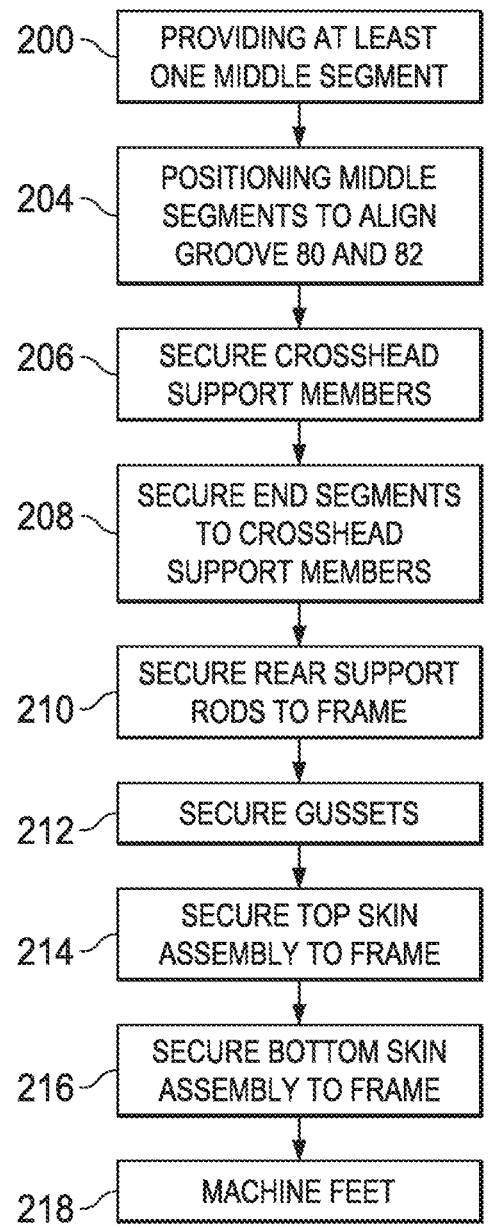
FIG. 11 is a block diagram illustrating assembly of the frame assembly of FIGS. 2A and 2B.

Referring now to FIG. 11, a method of assembling the frame assembly 40 is illustrated. The method begins at block 200 by providing at least one middle segment 46. For example, when assembling a quintuplex pump, four middle segments 46 are provided. Likewise, when assembling a triplex pump, two middle segments 46 are provided. Continuing to block 204, the middle segments 46 are positioned such that the upper and lower grooves 80 and 82 on each segment 46 are aligned. Once aligned, the crosshead support members 86 and 88 are aligned with and inserted within the upper and lower grooves 80 and 82 of each middle segment 46, as indicated at block 204. Once positioned within the grooves 80 and 82, the crosshead support members 86 and 88 are secured to the middle segments 46, as indicated at block 206. According to some embodiments, the crosshead support members 86 and 88 are tack welded to the middle segments 46; however, any other suitable means of attachment can be used. At block 208, the end segments 42 and 44 are secured to the crosshead support members 80 and 82 using similar methods of attachment.

The method continues at block 210, where at least one rear support rod 144 or 146 is positioned along the rear wall 56 of the frame assembly. In particular, a rear support rod 144 is inserted within a groove 140 disposed in each end segment 42 and 44 and each middle segment 46. In some embodiments, both an upper and lower rear support rod 144 and 146 are inserted into respective upper and lower grooves 140 and 142 on each segment 42, 44 and 46 for providing additional stability to the rear portion of the frame assembly 40. According to some embodiments, the upper and lower support rods 144 and 146 are tack welded to the middle sections 46. At block 212, the method optionally includes securing a plurality of gussets 22 (FIG. 2B) between each of the end segments 42, 44 and middle segments 46, which provide additional stability to the frame assembly 40. At blocks 214 and 216, the top skin assembly 48 and the bottom skin assembly 50 are secured to the frame assembly 40 by welding or other means of attachment. Continuing on to block 218, the feet 52 on each of the segments 42, 44 and 46 are machined such that the ends of each of the feet 52 are aligned in the same plane, so that, as discussed in greater detail below, the frame assembly 40 is securable to a skid or other support surface. While FIG. 11 illustrates one method for assembling the frame assembly 40, it should be understood that the method can occur in other orders. For example, the crosshead support members 86 and 88 are securable to the end segments 42 and 44 prior to securing the cross support members 86 and 88 to the middle segments 46. In addition, the rear support members 140 and 142 are attachable to the segments 42, 44 and 46 prior to attaching the crosshead support members 86 and 88 to the segments 42, 44 and 46. Similarly, the bearing support surfaces 84 can be formed in the segments 42, 44 and/or 46 while secured to the skid.

Figure 12:
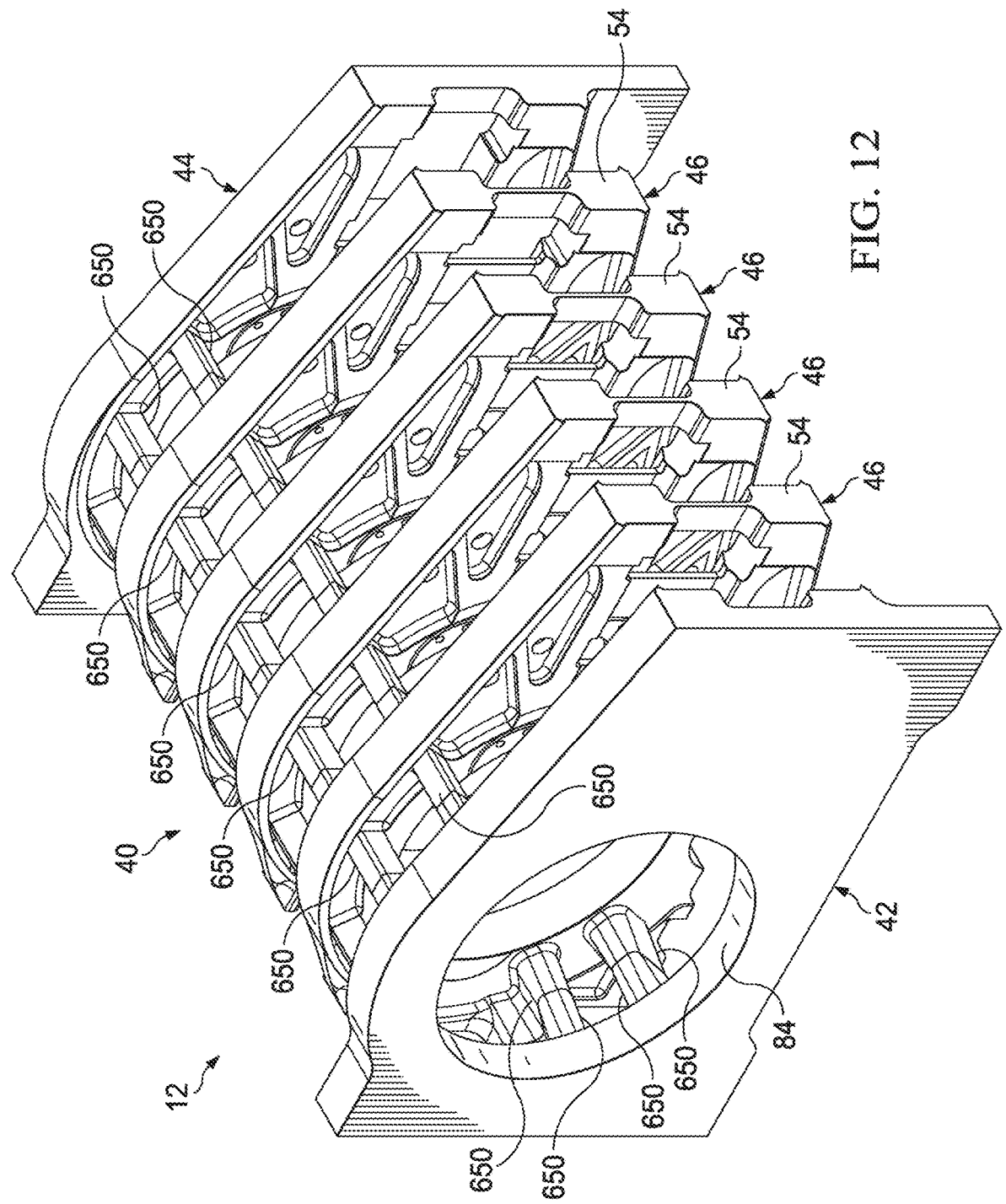
FIG. 12 is a front perspective view of another embodiment of a frame assembly in which a plurality of forged segments having extension members extending therefrom are employed to advantage.
Figure 13:
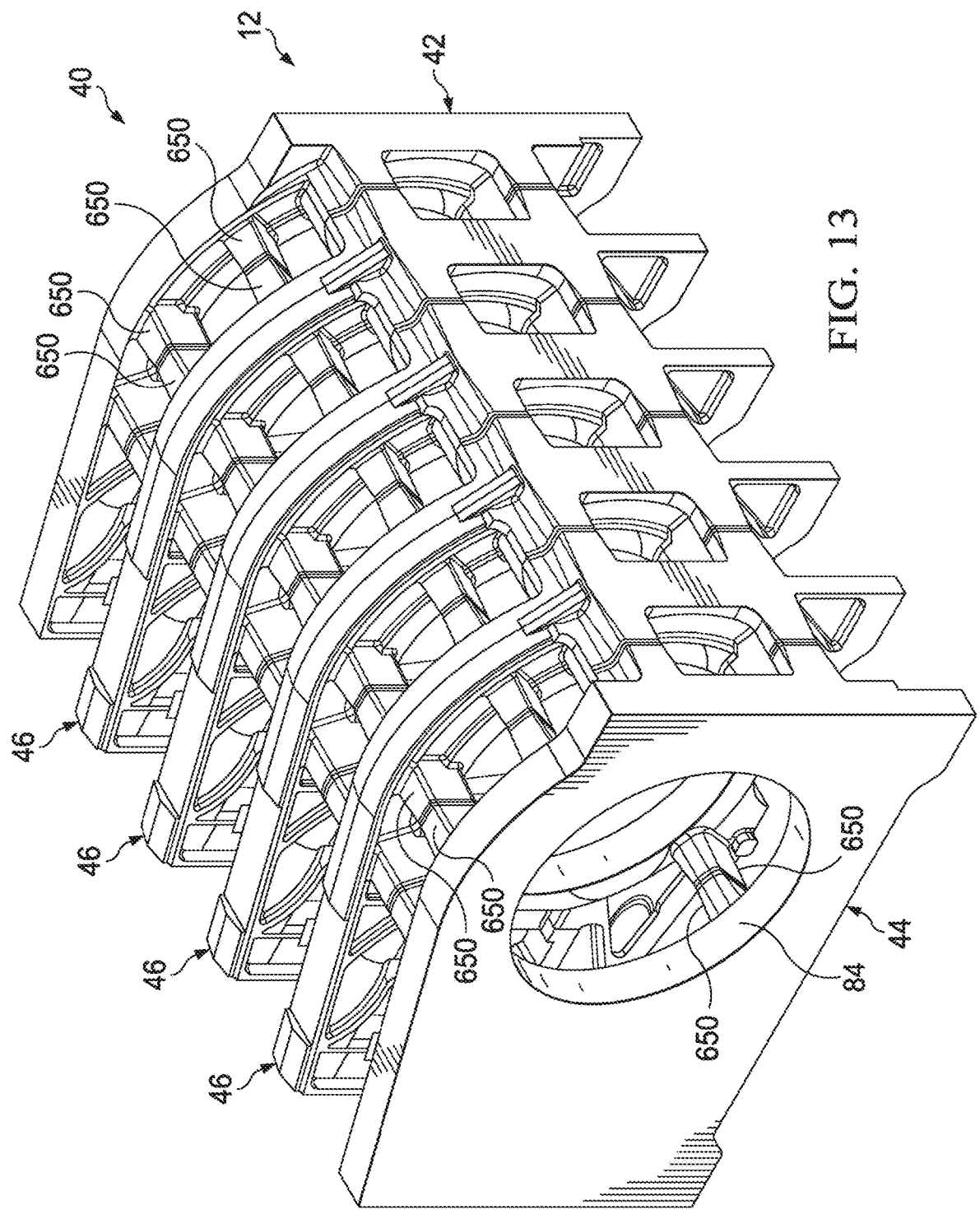
FIG. 13 is a rear view of the frame assembly of FIG. 12.
Figure 14:
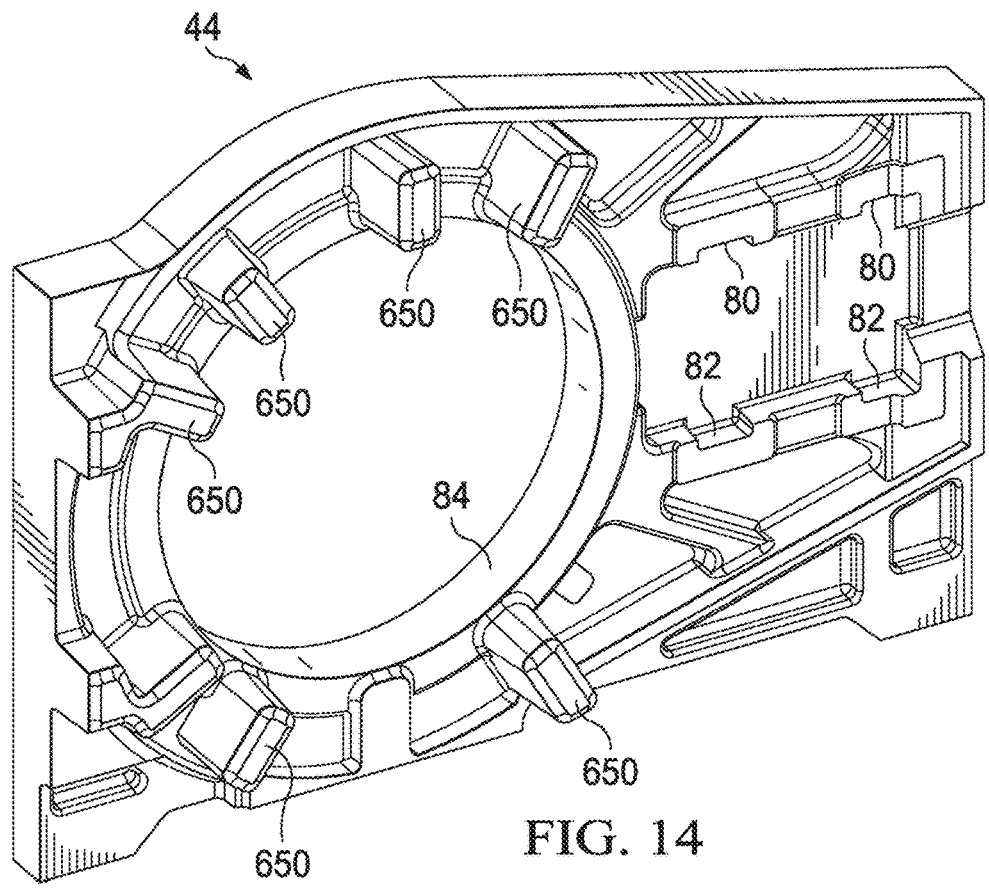
FIG. 14 is a perspective view of an end plate segment of the frame assembly of FIGS. 12 and 13.
Figure 15:
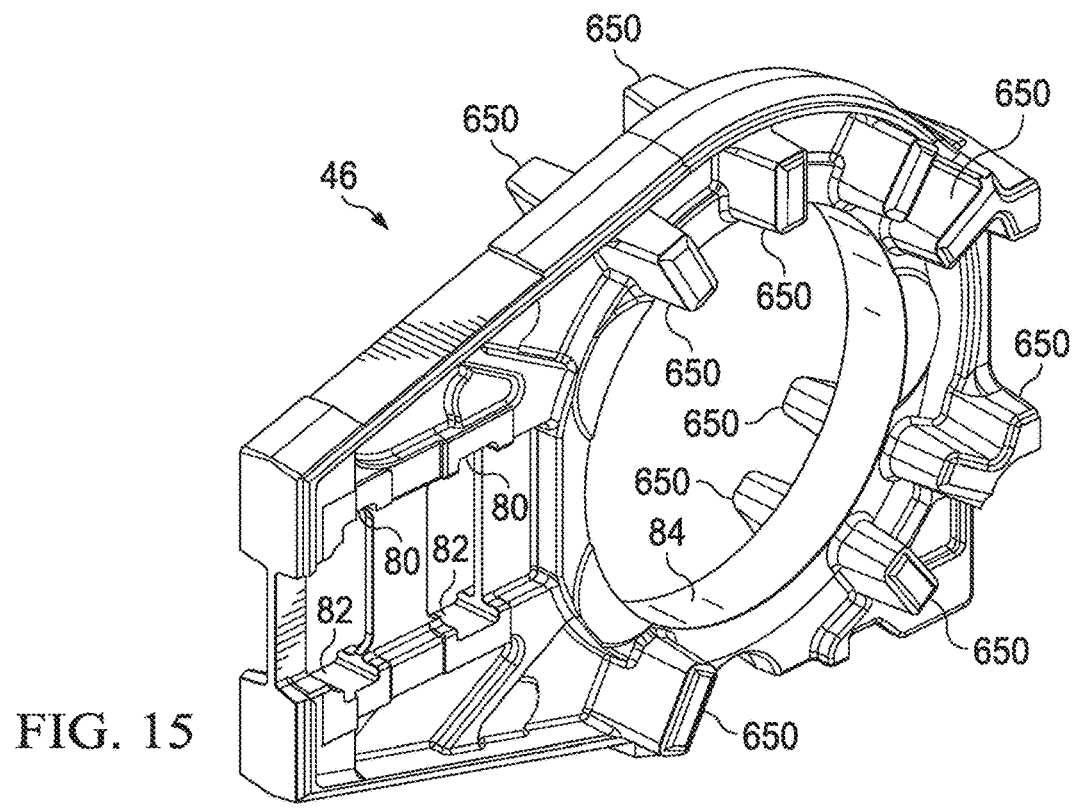
FIG. 15 is a perspective view of a middle plate segment of the frame assembly of FIGS. 12 and 13.
Figure 16:
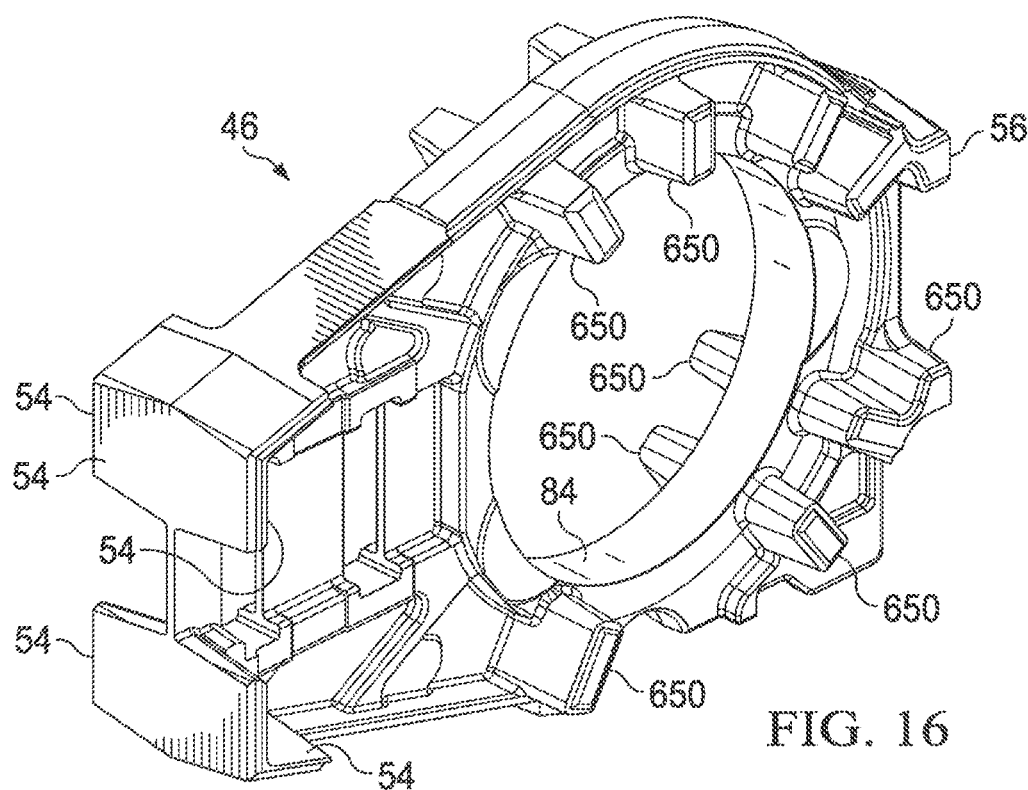
FIG. 16 is a perspective view of another embodiment of a middle plate segment.
Figure 17:
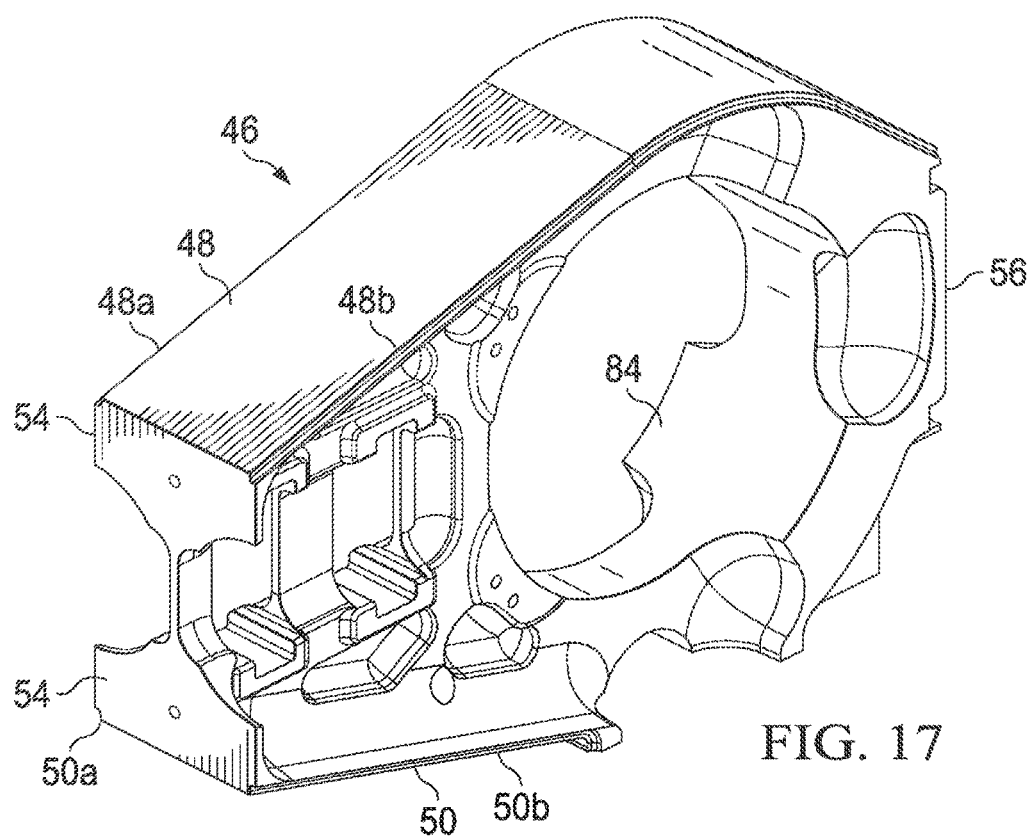
FIG. 17 is a perspective view of yet another embodiment of a middle plate segment.

Referring now to FIGS. 12-15, an additional embodiment of the frame assembly 40 of the power end housing 12 is illustrated. In the embodiment illustrated in FIGS. 12-15, the end segments 42 and 44 and middle segments 46 each include gussets or extensions 650 extending from a sidewall of and formed integral with each segment 42, 44 and 46 so as to provide additional strength and stability to the frame assembly 40. For example, referring specifically to FIGS. 14 and 15, each segment 44 and 46 includes a plurality of extensions 650 formed integral with and extending outward from a sidewall and in spaced apart relationship around the bearing support surfaces 84. As illustrated in FIGS. 12 and 13, each extension 650 on a middle segment 46 is positioned to align with and contact a corresponding extension 650 on an adjacently positioned end segment 42 or 44 or middle segment 46, as applicable. Additionally or alternatively, the front wall 54 of each segment 42, 44 and/or 46 is formed of an increased width such that the use and installation of separately attachable upper and lower nose plates 170 and 172 (FIGS. 2A and 2B) is not necessary. For example, as illustrated in FIGS. 16 and 17, the front wall 54 is formed integral with and extending from a sidewall of the segment 42, 44 and/or 46 such that when segments 42, 44 and/or 46 are adjacently positioned to form the frame assembly 40, the edges 50a and 50b of adjacently positioned frame members 42, 44 and/or 46 align and contact each other for subsequent welding and/or other forms of attachment. Similarly, each segment 42, 44 and/or 46 can optionally be formed with rear walls 56 integrally formed with an increased width extending from the sidewall such that the use and installation of separately attachable members disposed between each of the segments 42, 44 and/or 46 is avoided.

Additionally and/or alternatively, each of the segments 42, 44 and/or 46 can be formed such that, in addition to the front and rear walls 54 and 56 being formed integral with the segments 42, 44 and/or 46, the top and bottom skins 48 and 50 can be formed integral thereto, as best illustrated in FIG. 17. Thus, when segments 42, 44 and/or 46 are adjacently positioned to form the frame assembly 40, the edges 48a and 48b and 50a and 50b of the top and bottom skins 48 and 50, respectively, of adjacently positioned frame members 42, 44 and/or 46 contact each other for subsequent welding, thereby avoiding the need for separately attachable skins 48 and 50 to be welded between the segments 42, 44 and/or 46.

According to embodiments disclosed herein, one or more of the segments 42, 44 and/or 46 are forged, including extensions 650; however, other methods of manufacture are available (i.e., casting or otherwise). When segments 42, 44 and/or 46 are forged, welding time is reduced and less machining is required. As such, this results in ease of manufacture, lower costs, and higher strength. According to some embodiments, the segments 42, 44 and/or 46 are hot forged. According to some embodiments, the strength of the segments 42, 44 and/or 46 is increased by about 10-15 from a machined segment. According to embodiments disclosed herein, the end segments 42 and 44 may be forged and the middle segments may be machined. In other embodiments, only one end segment 42 or 44 may be forged and all or a some of the middle plate segments 46 may be forged and the remaining segments 42, 44 and/or 46 machined or otherwise formed.

Figure 18A:
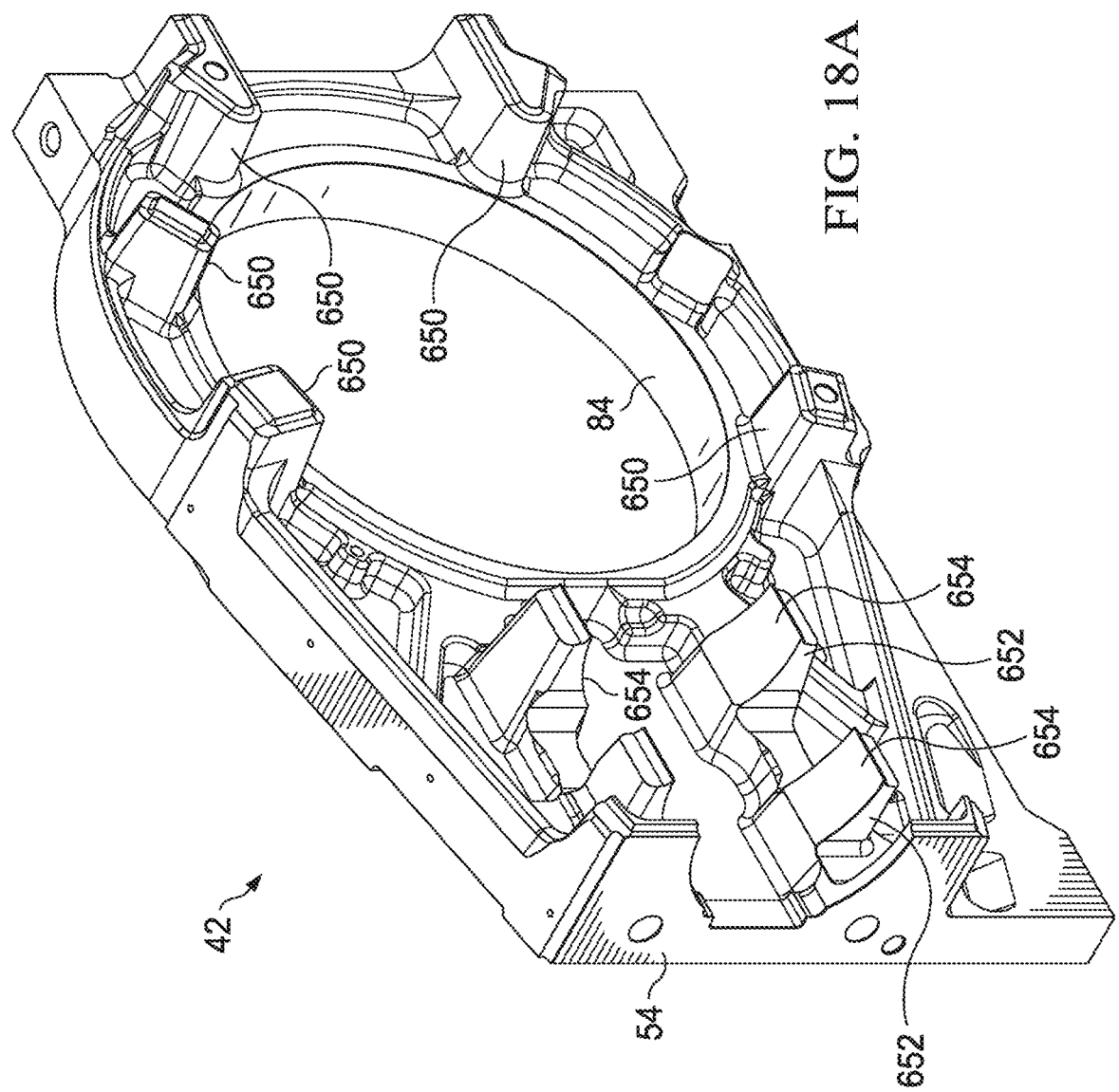
FIGS. 18A and 18B are perspective views of another embodiment of left and right end plate segments.
Figure 18B:
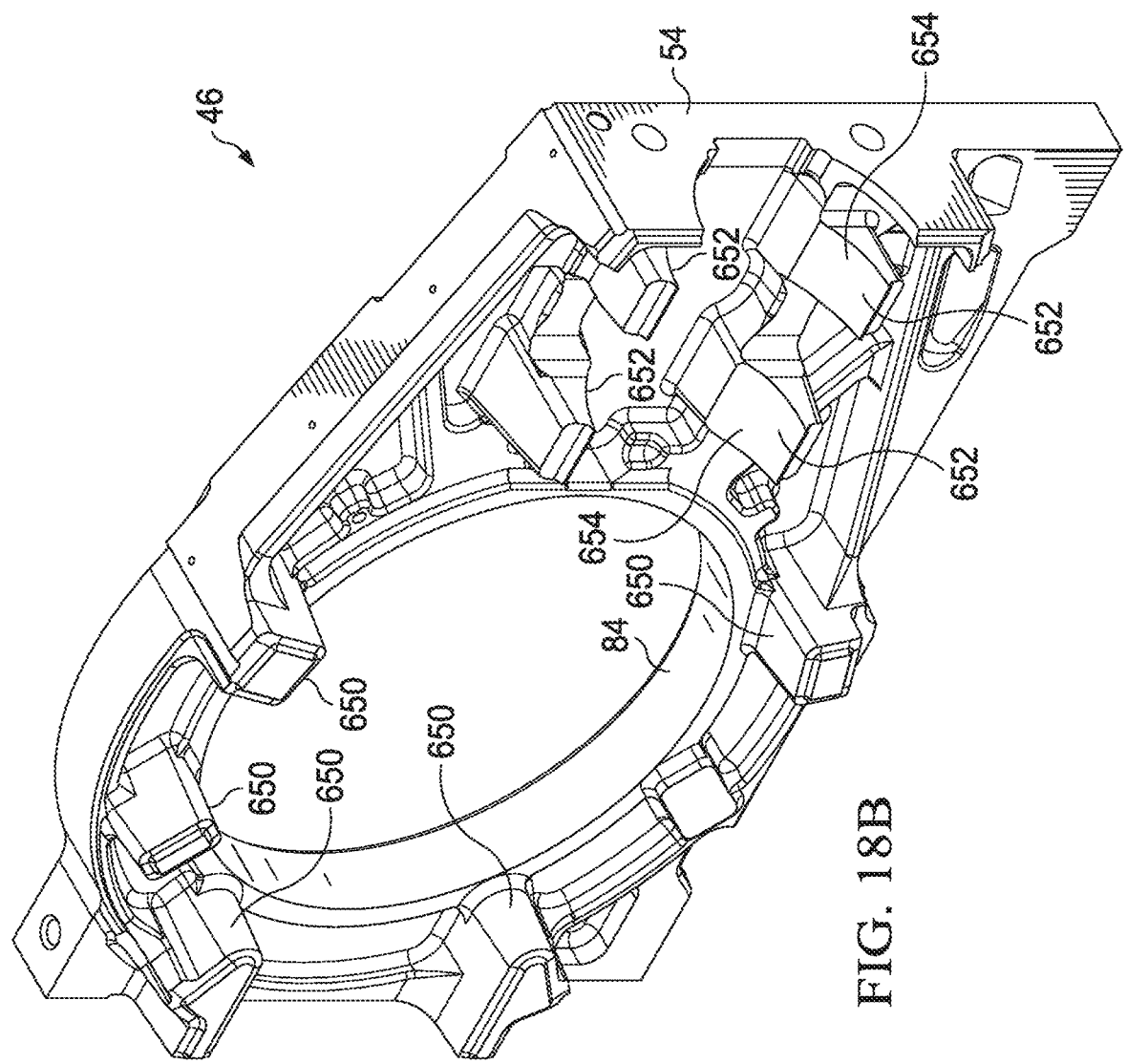
Figure 20:
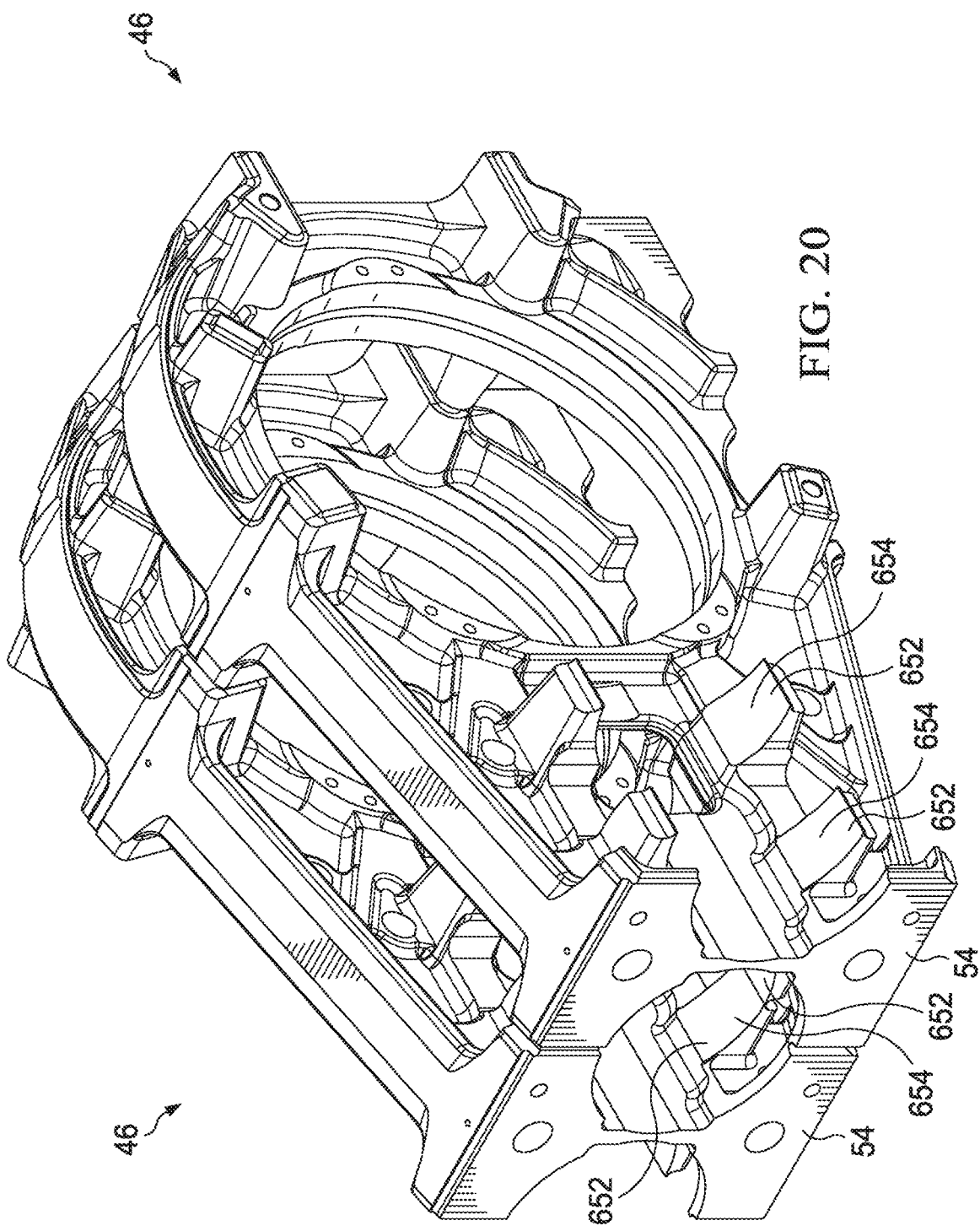
FIG. 20 is a front perspective view of two adjacently positioned middle plate segments illustrated in FIG. 19.

Referring now to FIGS. 18A-20, an additional embodiment of portions of the frame assembly 40 of the power end housing 12 is illustrated. In FIGS. 18A, 18B and 19, a plurality of extensions 650 are disposed generally adjacent to the bearing support surfaces 84 on each of the end segments 42 and 44 and the middle plate segment 46. As illustrated, five extensions 650 are spaced apart from each other and generally around the bearing support surface 84; however, it should be understood that a greater or fewer number of extensions 650 may be utilized around the bearing support surfaces 84. Additionally and as illustrated in FIGS. 18A, 18B and 19, each plate segment 42, 44 and 46 include upper and lower extensions 652 extending outwardly therefrom and disposed generally between the front wall 54 and the bearing support surfaces 84. In addition to providing additional rigidity to the frame assembly 40, the extensions 652 are used to support the crosshead tubes 100 (FIG. 9). When the extensions 652 are utilized, as illustrated in FIGS. 18A-20, crosshead tube support members 86 and 88 (FIG. 4) are no longer necessary since the extensions 652 act to align and sufficiently space apart the segments 42, 44 and/or 46 while at the same time providing support to the crosshead tubes 100. In particular, each extension 652 includes a curvilinear portion 654 sized to receive the cylindrical crosshead tubes 100. As such, the amount of welds can be substantially reduced (i.e., no need to weld the crosshead tube support members 86 and 88 to the frame assembly 40) because the only welding required is at the point of contact between adjacently positioned extension members 652. In FIGS. 18A-20, in addition to extensions 650 and 652 being used to align and secure the segments 42, 44 and/or 46 together, the front wall 54 of each segment 42, 44 and/or 46 are sized and position to function in this fashion.

A method of assembling the frame assembly 40 illustrated in FIGS. 18A-20 is hereinafter described. During assembly, at least one middle segment 46 is provided. For example, when assembling a quintuplex pump, four middle segments 46 are provided. Likewise, when assembling a triplex pump, two middle segments 46 are provided. The end segments 42 and 44 and the desired number of middle segments 46 are aligned such that the ends of each extension 650, and edges of the front walls 54, rear walls 56 and top and bottom walls 58 and 60, as applicable, are aligned and otherwise adjacent to each other for attachment by welding or otherwise. In the embodiment illustrated herein, the end of each extension 650 includes a planar surface having chamfered corners to facilitate welding attachment. By including extensions 650 that are integral with segments 42, 44 and/or 46, only a single weld is necessary to connect the extensions 650 together, and thus adjacent segments 42, 44 and/or 46, rather than employing a single gusset 22 that must be welded to both adjacent segments 42, 44 and/or 46.

FIGS. 21-46 illustrate an embodiment of a graduated frame assembly in which the frame assembly 40 includes bearing support surfaces 84 of varying diameters to facilitate ease of installation of bearing assemblies 290 (FIG. 28), as more fully described below. Referring specifically to FIG.

Figure 21:
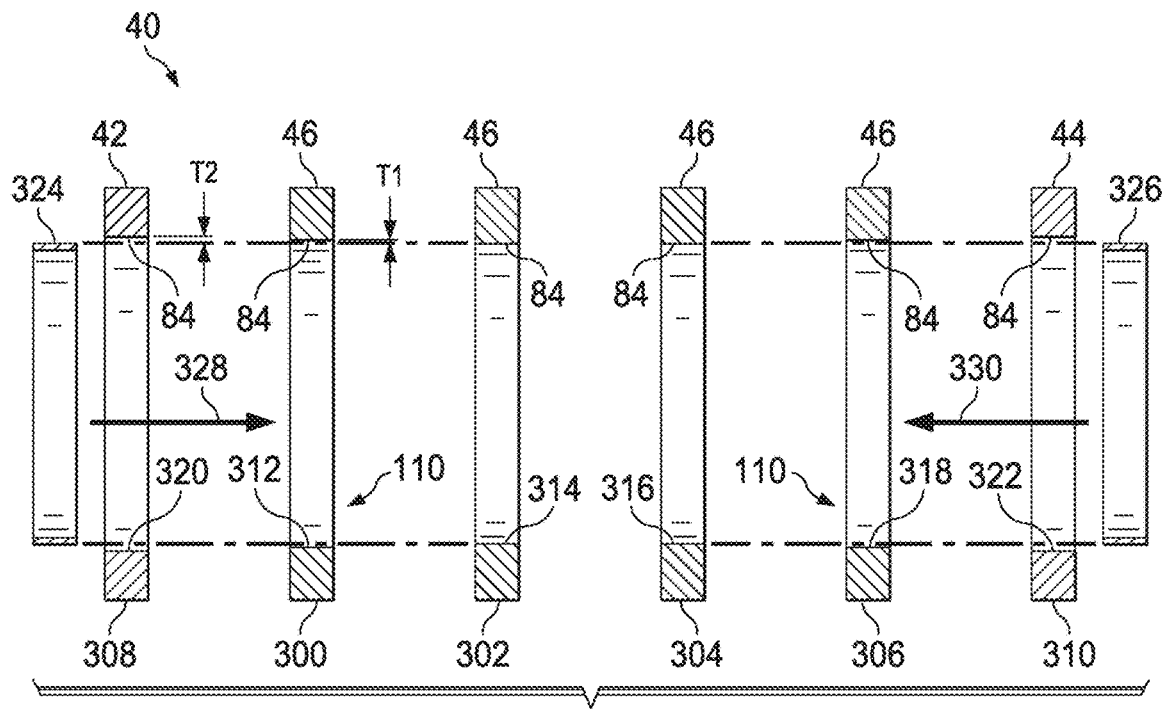
FIGS. 21-23 are simplified section views of the frame assembly of FIG. 29 taken along the line 21-21.
Figure 22:
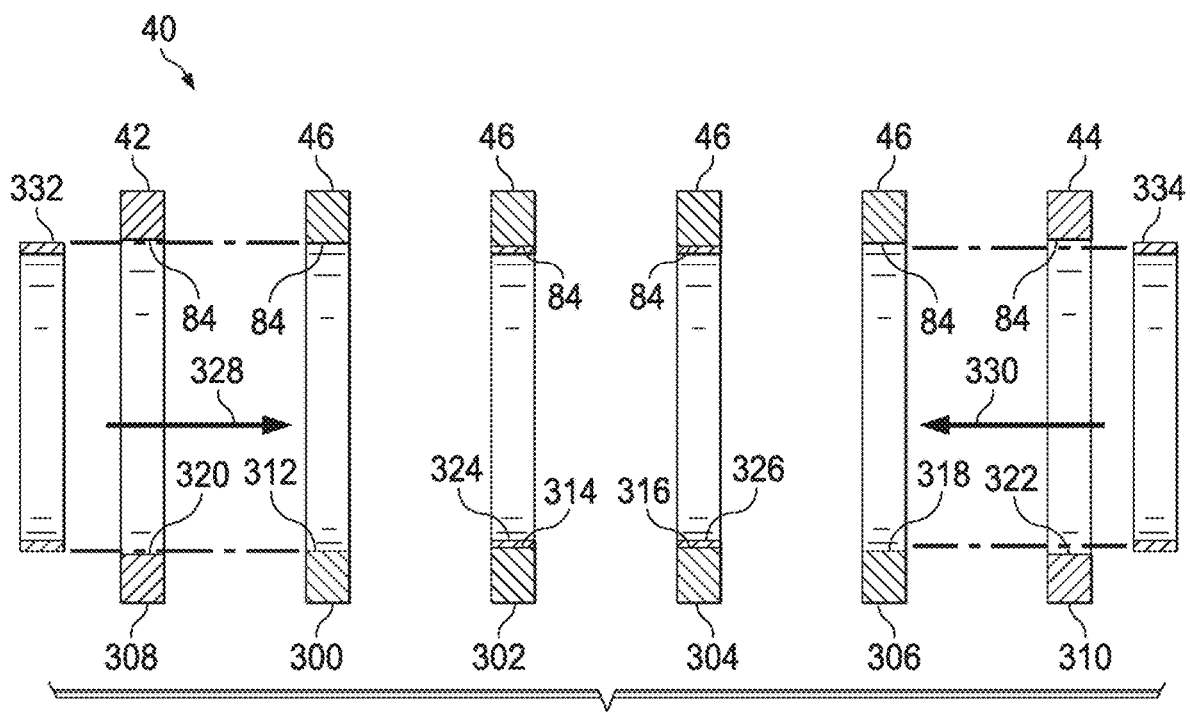
Figure 28:
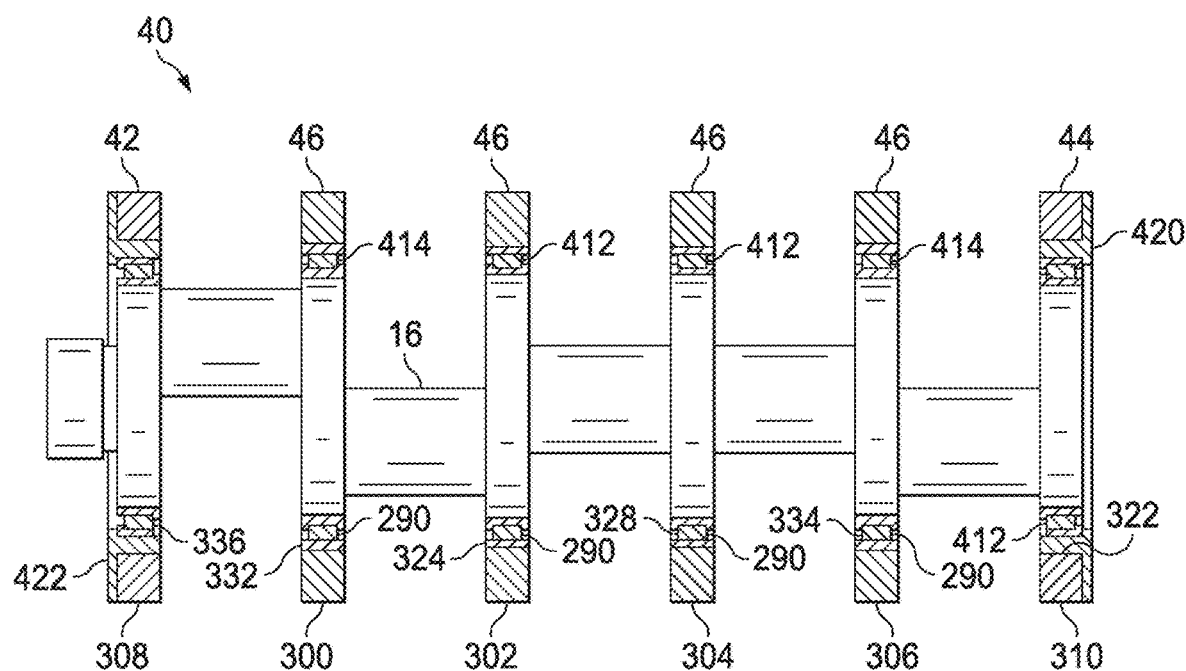
Figure 29:
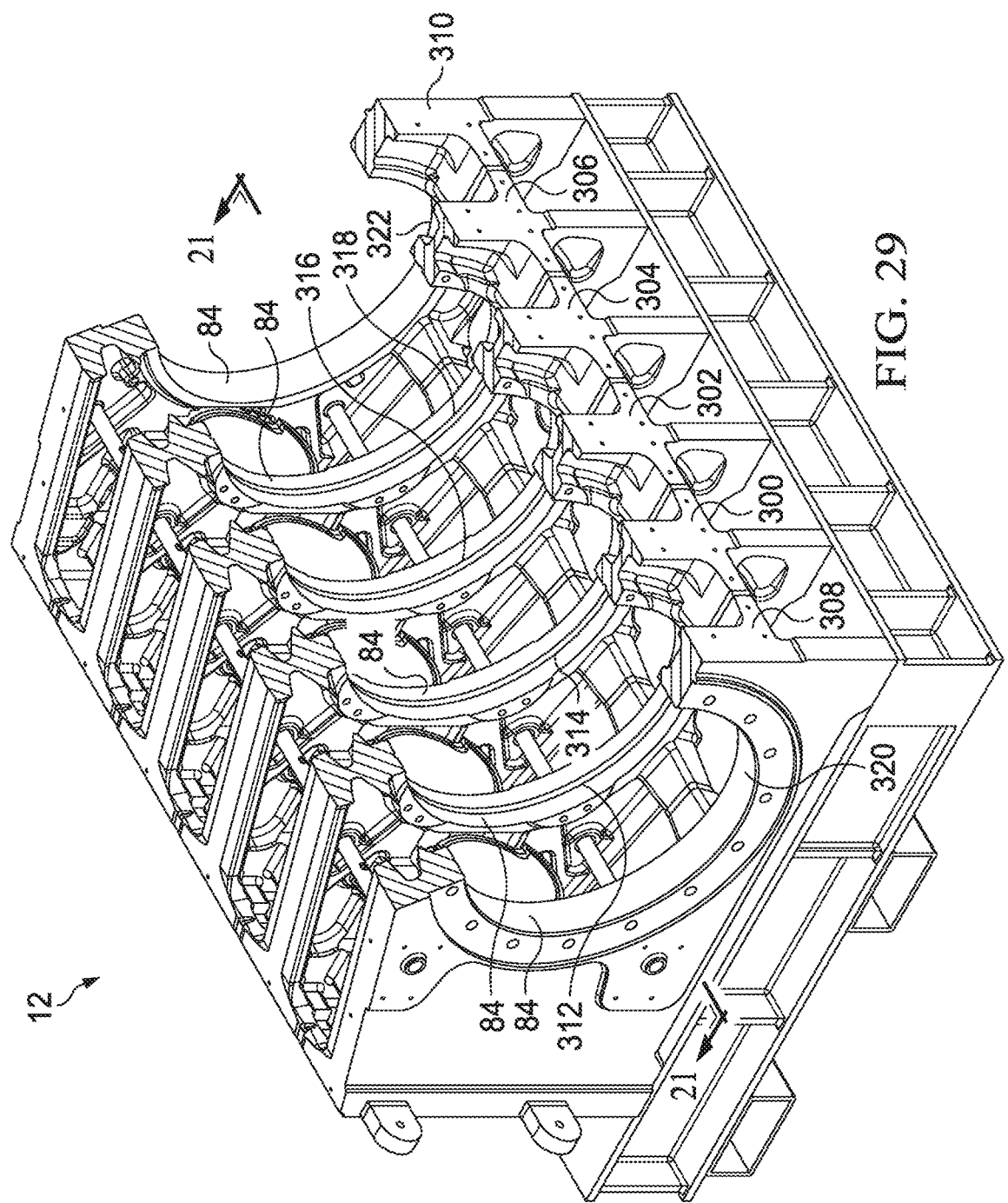
FIG. 29 is a rear perspective view of another embodiment of a frame assembly in which the end plate segments and middle plate segments are partially cut-away.
Figure 30:
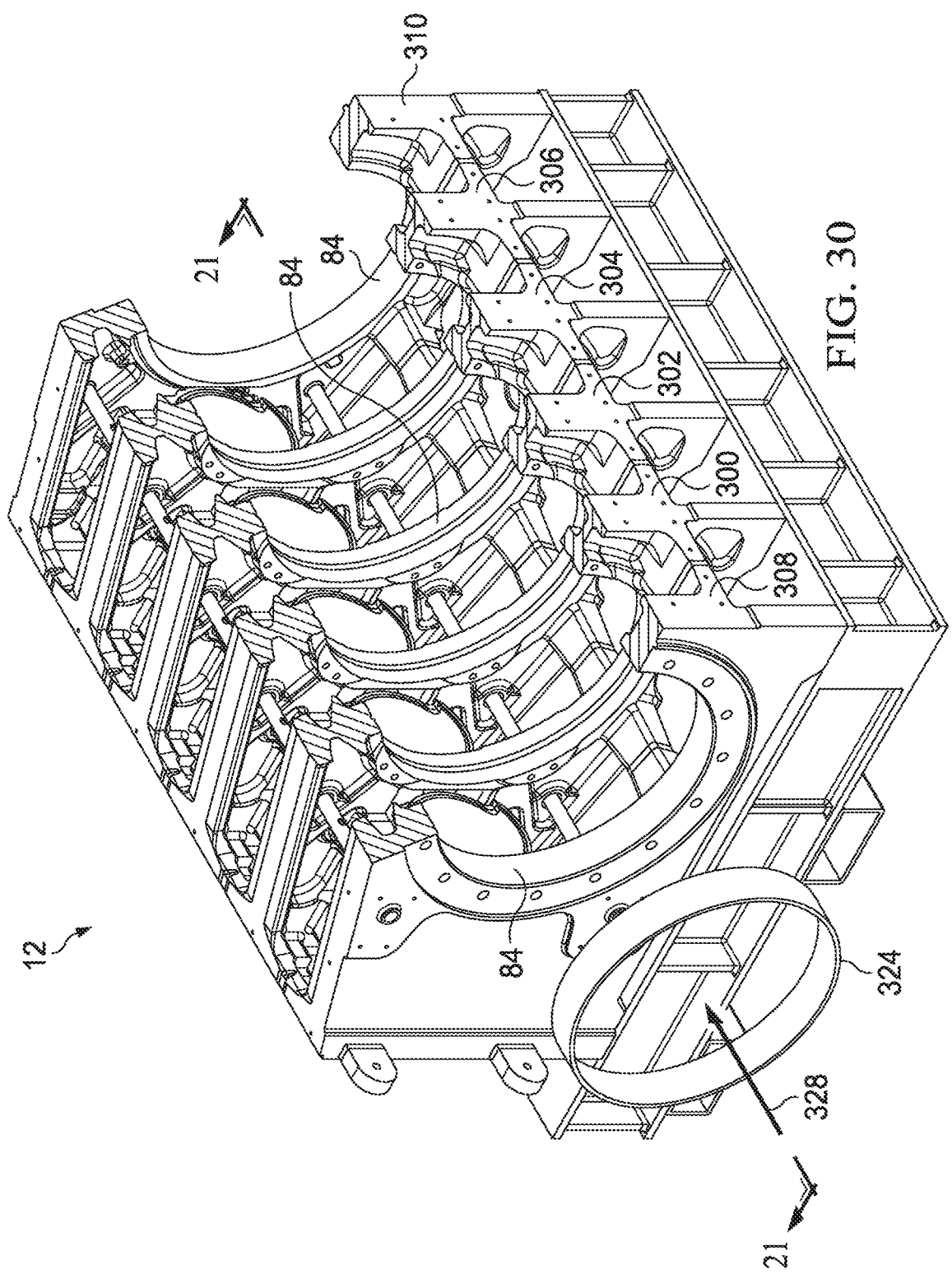
FIGS. 30-38 are illustrations of the frame assembly of FIG. 29 showing the bearing races being installed onto the bearing support surfaces.
Figure 31:
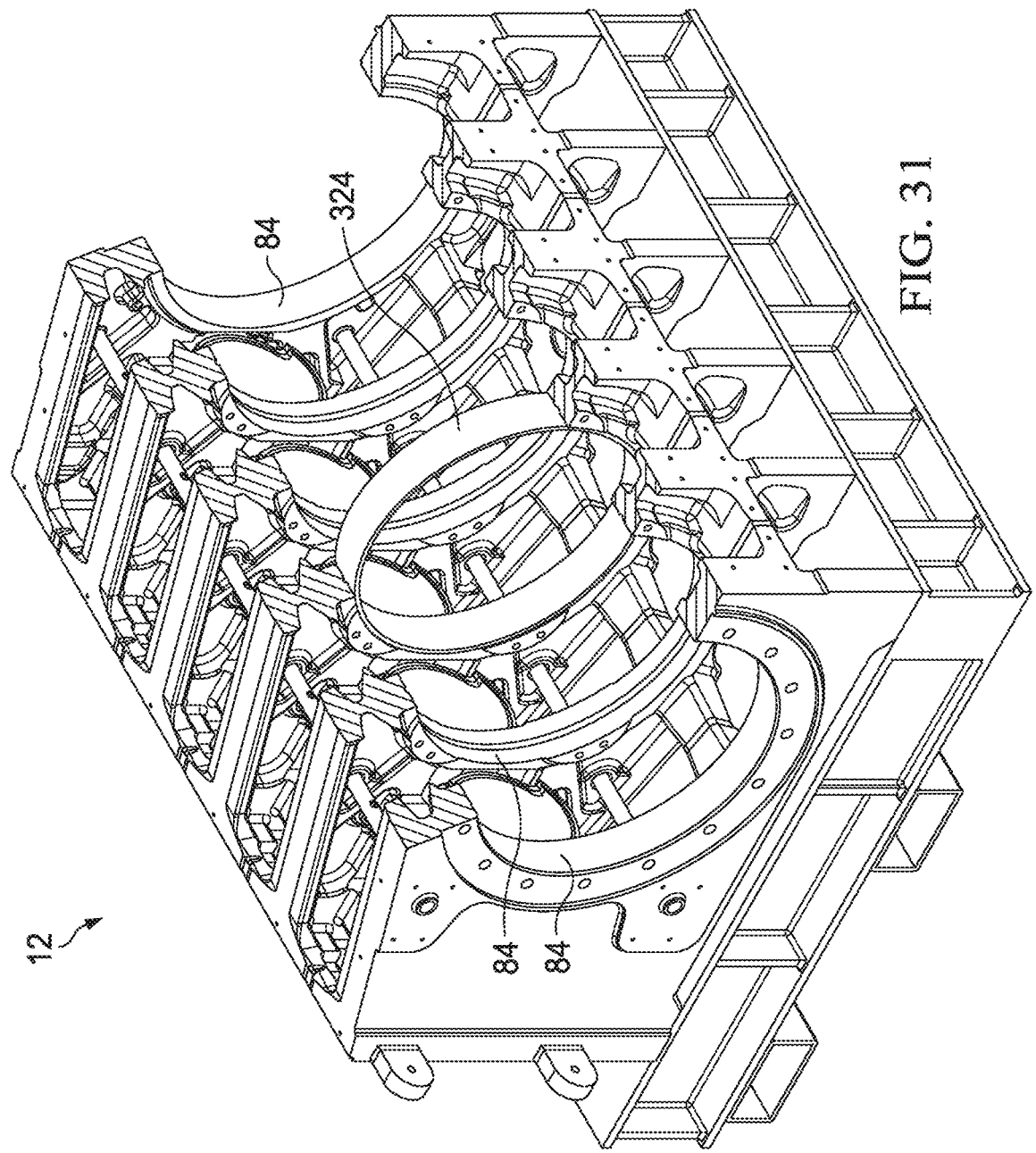
Figure 32:
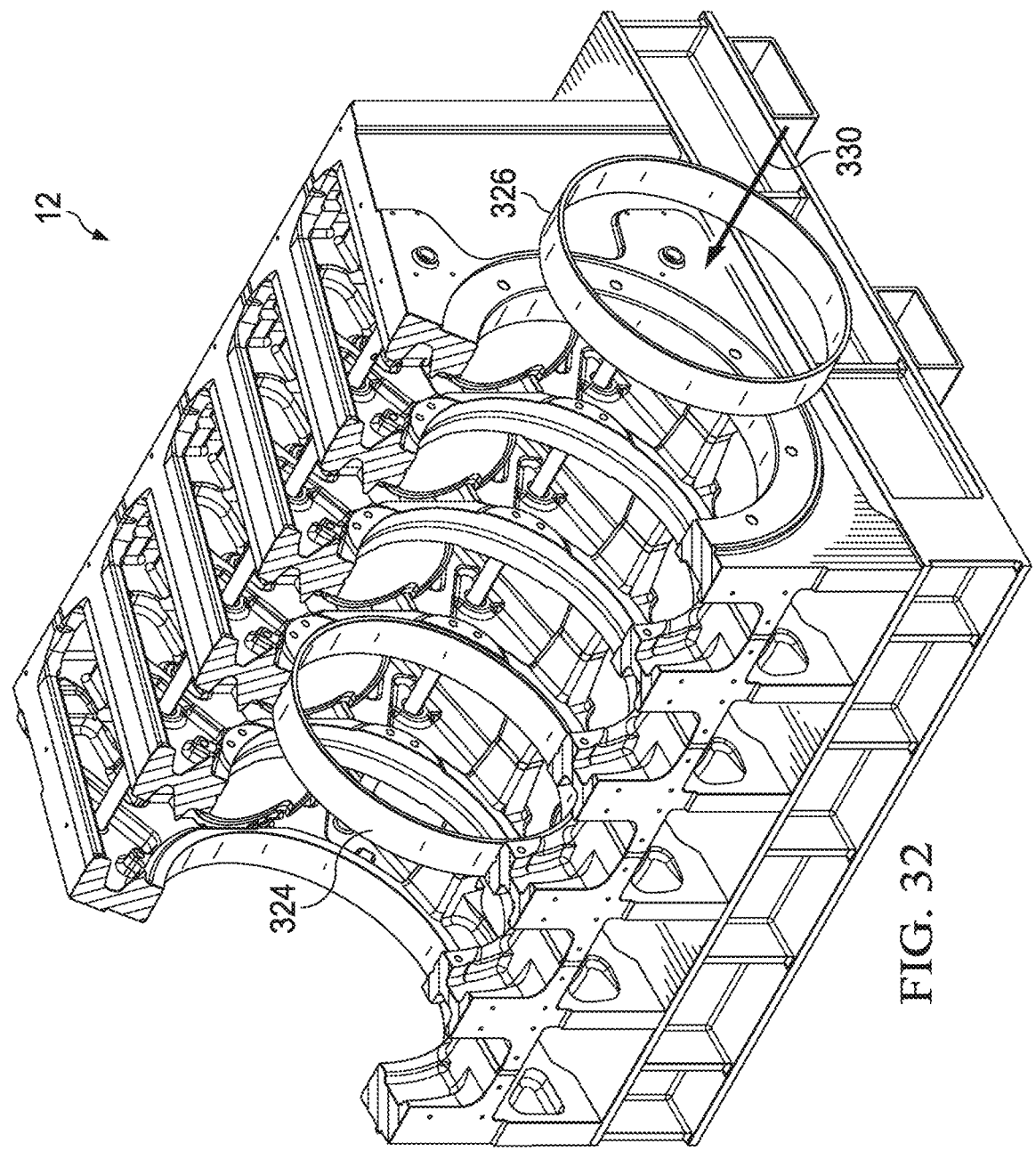
Figure 33:
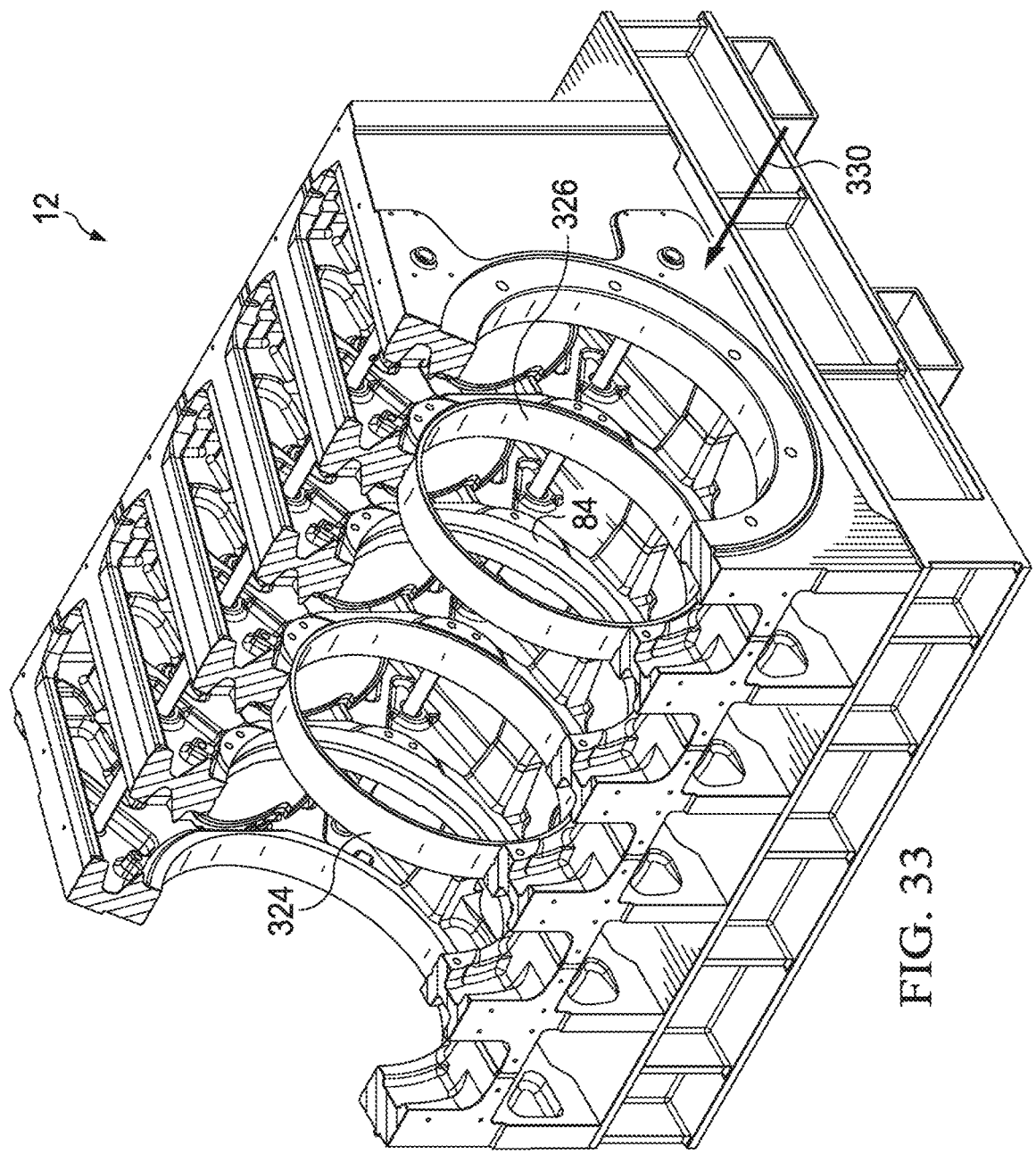
Figure 34:
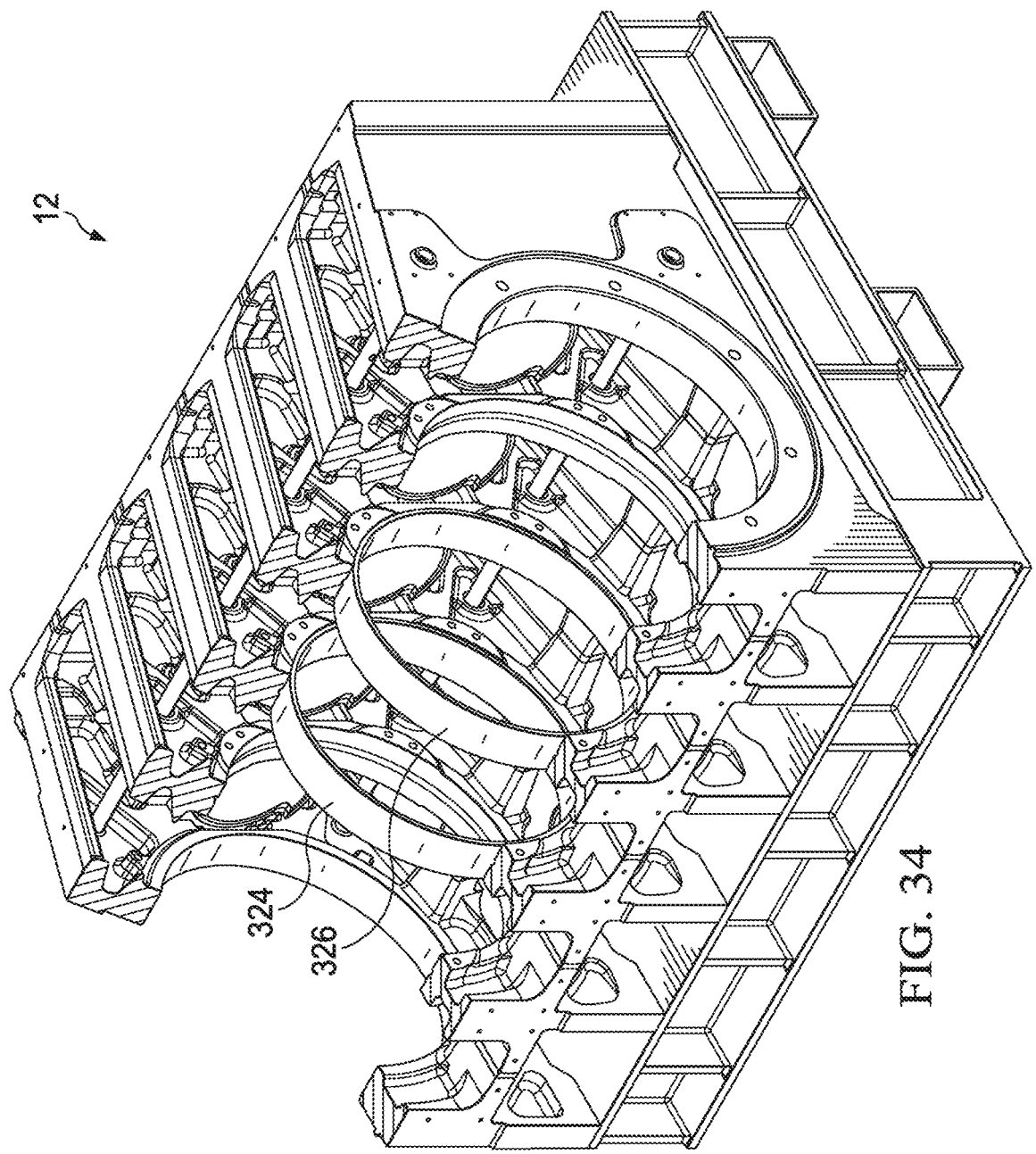
Figure 35:
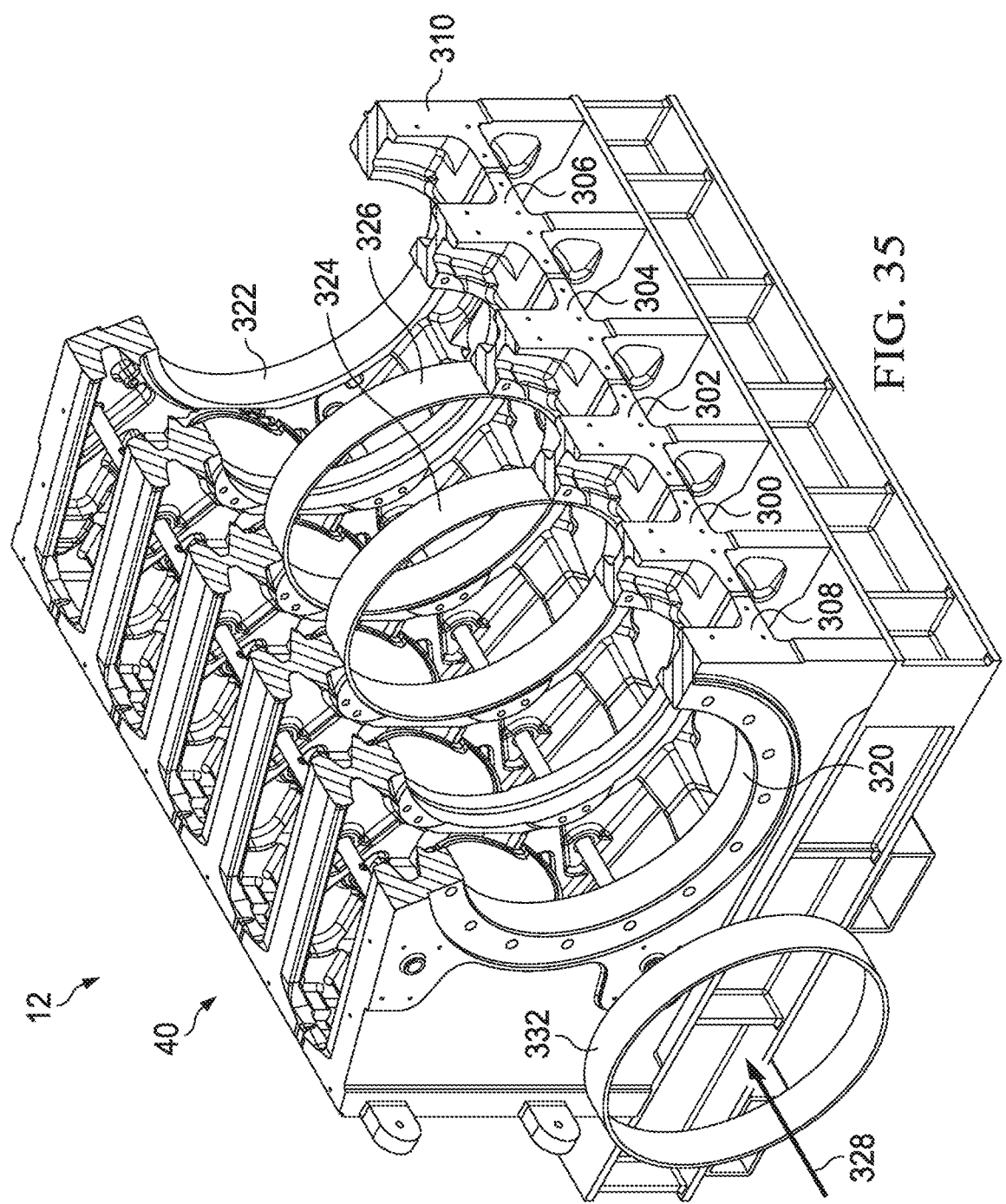
Figure 36:
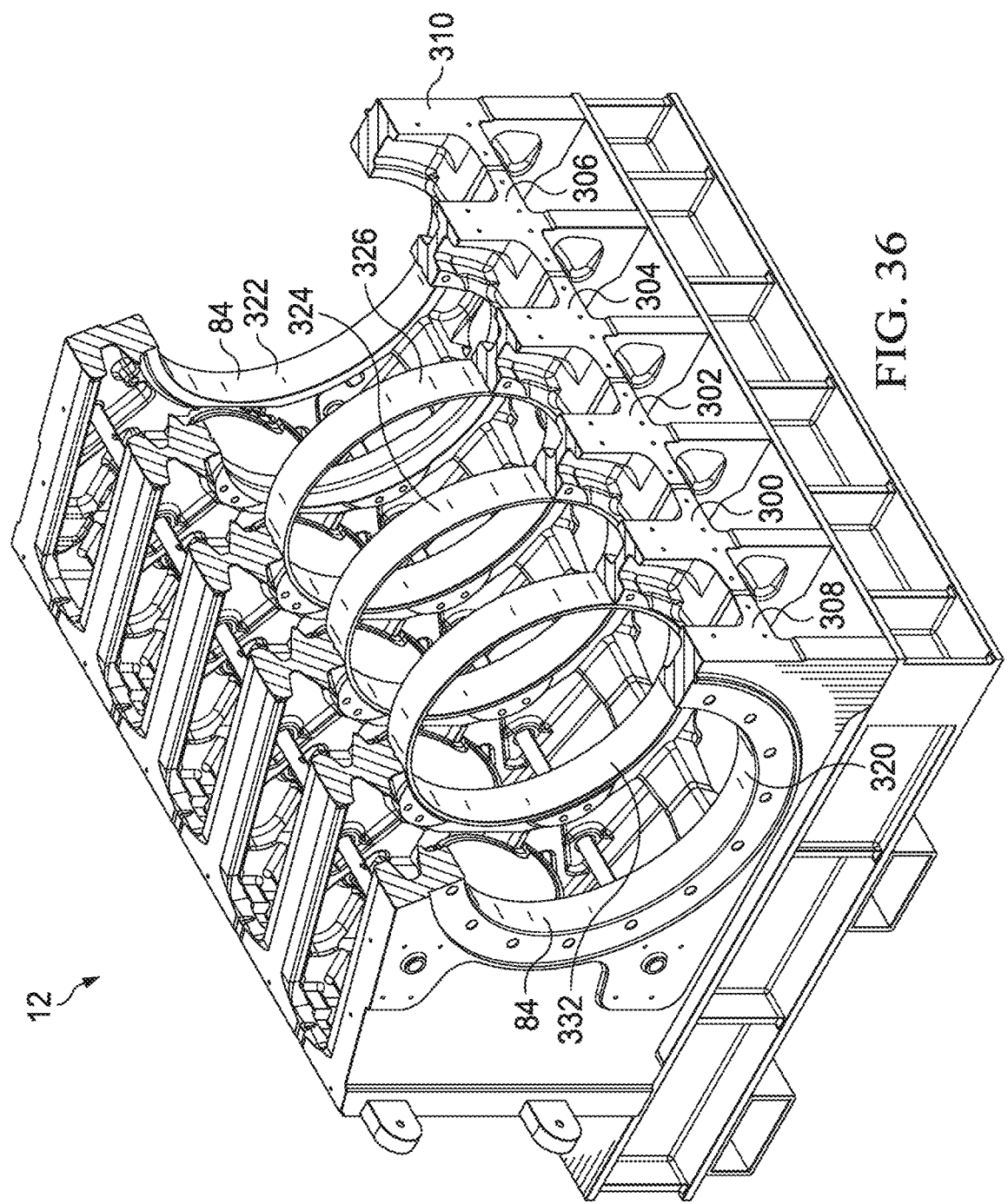
Figure 37:
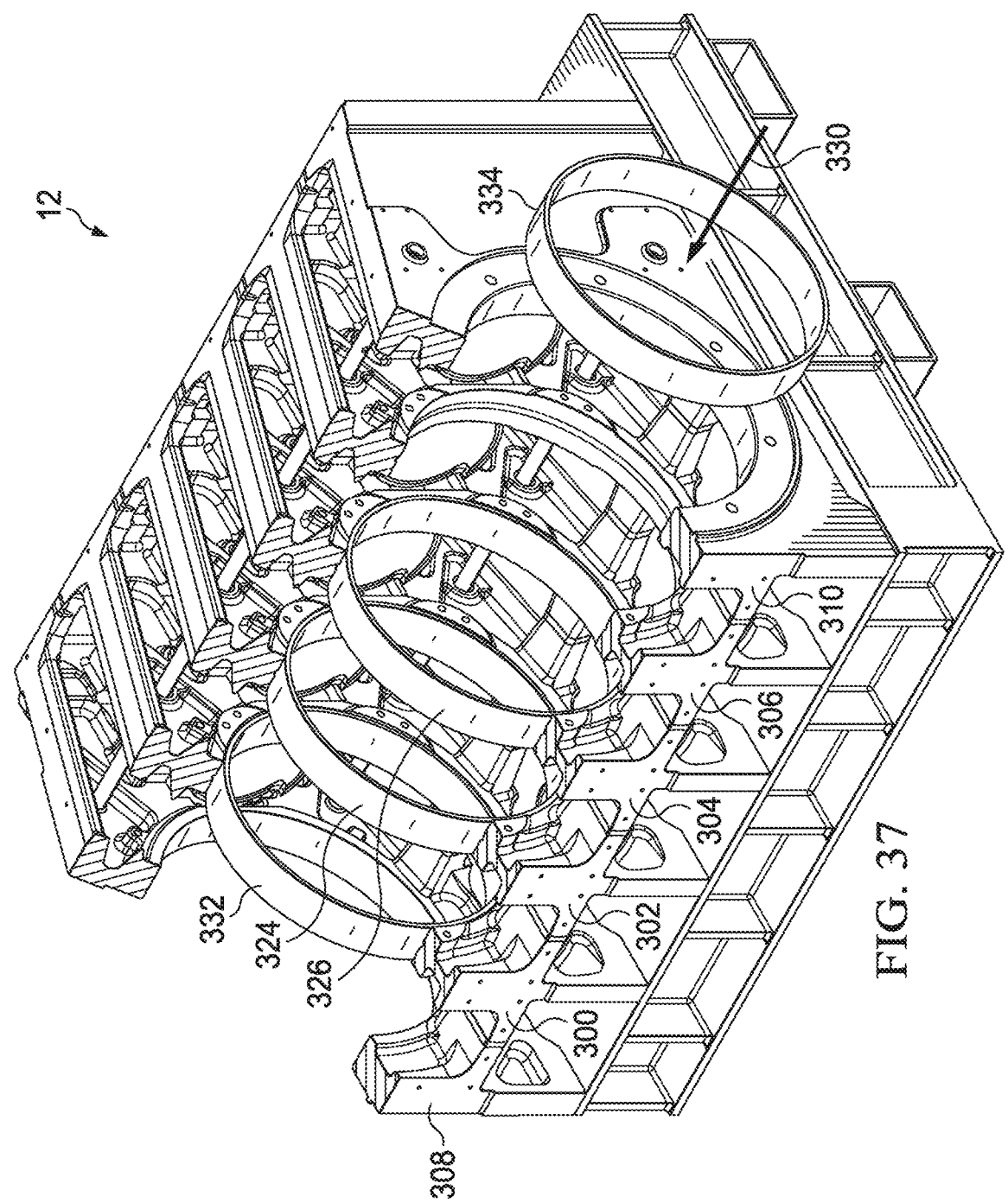
Figure 38:
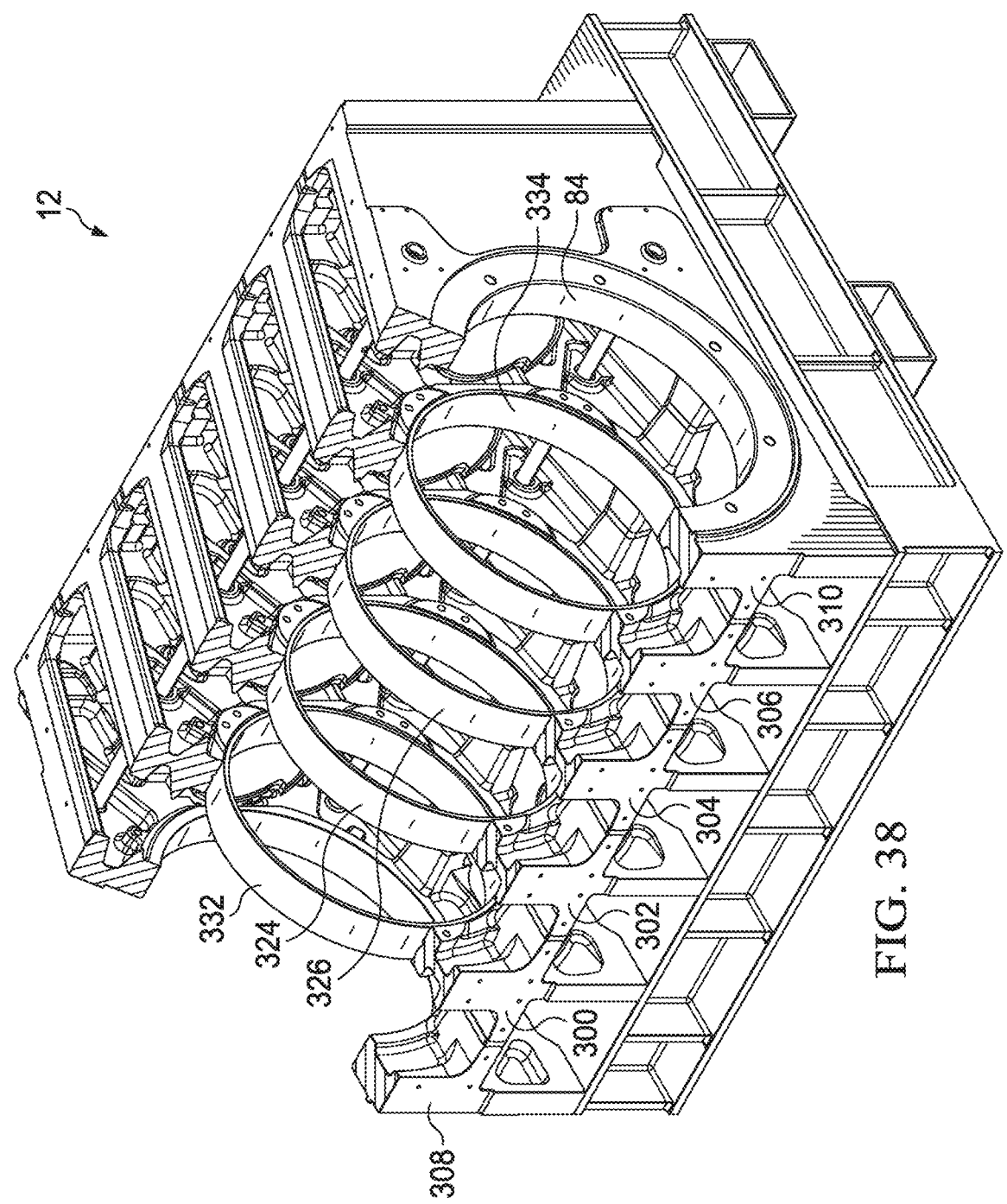

21, which is a cross-section of the frame assembly 40 taken along the line 21-21 of FIG. 29, each bearing support surface 84 is configured to receive and otherwise support the bearing assembly 290 (FIG. 28) to rotatably support the crankshaft 16 thereon. As illustrated in FIG. 21, the diameter of each of the bearing support surfaces 84 increases from the innermost middle segments 46 outward to the end segments 42 and 44. For example, in the embodiment illustrated in FIGS. 21 and 29, the frame assembly 40 includes four middle segments 300, 302, 304 and 306 and end segments 308 and 310. Each segment 300-310 includes a respective bearing support surface 312, 314, 316, 318, 320 and 322 for supporting a respective bearing assembly 290 (FIG. 28). As illustrated in FIGS. 21 and 29, the innermost bearing support surfaces 314 and 316 on segments 302 and 304 are formed having inner diameters smaller than the inner diameters of adjacently positioned bearing support surfaces 312 and 318 on segments 300 and 306, respectively, as represented by an amount of twice the distance T1 (FIG. 21). Similarly, the bearing support surfaces 312 and 318 on segments 300 and 306, respectively, are formed having diameters smaller than the inner diameters of adjacently positioned bearing support surfaces 320 and 322 on end segments 308 and 310, respectively, as represented, for example, by an amount of twice the distance of T2 (FIG. 21). According to some embodiments, the diameter of bearing support surfaces 314 and 316 is about 25 inches, the diameter of bearing support surfaces 312 and 318 is about 25.25 inches, and the diameter of bearing support surfaces 320 and 322 is about 25.5 inches. It should be understood, however, that the diameters can vary depending on the size of the frame assembly 40. For example, in some embodiments, the diameters can range between 2 inches to 35 inches or even larger amounts. Regardless of the size of the frame assembly 40, and as explained in greater detail below, this configuration of varying or "graduated" diameters of the bearing support surfaces 84 enables installation of the bearing assemblies 290 to be unimpeded and simplified.

With continued reference to FIGS. 21 and 29-34, installation of the outer bearing races 324 and 326 onto the bearing support surfaces 314 and 316 is described. As illustrated, the inner diameters of bearing support surfaces 312, 318, 320 and 322 are larger than the outer diameter of the outer bearing races 324 and 326. For example, in one embodiment, the outer diameter of the bearing races 324 and 326 is about 25 inches. Thus, as the outer bearing races 324 and 326 are moved in the direction of arrows 328 and 330 and through the openings 110 formed by bearing support surfaces 312, 318, 320 and 322, the relative size differences of about 0.5 inches between the outer bearing races 324 and 326 and the diameter of bearing support surfaces 320 and 322, and the relative size differences of about 0.25 inches between the outer bearing races 324 and 326 and the diameter of bearing support surfaces 312 and 318, enable unimpeded movement of the bearing races 324 and 326 therethrough. In another embodiment, the inner diameters of at least one bearing support surface 312, 318, 320 and 322 is larger than the outer diameter of at least one of the outer bearing races 324 and 326. Thus, when installing the bearing races 324 and 326 on bearing support surfaces 314 and 316, the bearing races 324 and 326 are inserted into the frame assembly 40 in the direction of arrows 328 and 330, respectively, toward middle segments 302 and 304 and through bearing support surfaces 312, 318, 320 and 322 with adequate clearance to minimize and/or substantially reduce the likelihood of the outer bearing races 324 and/or 326 contacting the bearing support surfaces 312, 318, 320 and 322 thereby "trapping" a bearing race 324 and/or 326 in the wrong position and/or otherwise damaging the bearing races 324 or 326 and/or the bearing support surfaces 312, 318, 320 and 322. In some embodiments, the outer bearing races 324 and 326 are substantially cooled to cause the races 324 and 326 to shrink, thereby increasing the gaps between the races 324 and 326 and the support surfaces 312, 318, 320 and 322. Once positioned on the bearing support surfaces 314 and 316, the temperature of the races 324 and 326 increases allowing the bearing races 324 and 326 to thermally expand to create an interference fit with the bearing support surfaces 314 and 316.

Once the outer bearing races 324 and 326 are installed on the bearing support surfaces 314 and 316 (FIGS. 22 and 34), the outer bearing races 332 and 334 are then inserted into the frame assembly 40 in the direction of arrows 328 and 330, as best illustrated in FIGS. 22 and 35-38. Similar to the outer bearing races 324 and 326, the outer diameter of bearing races 332 and 334 is smaller than inner diameter of bearing support surfaces 320 and 322 to facilitate unimpeded movement of the bearing races 332 and 334 for positioning onto support surfaces 312 and 318, respectively. According to some embodiments, the outer diameter of the bearing races 332 and 334 is about 0.25 inches smaller than the inner diameters of the bearing support surfaces 320 and 322. It should be understood, however, that the outer diameter of the bearing races 332 and 334 may vary. For example, in one embodiment, the outer diameter of the bearing races 332 and 334 may range between 30/1000 of an inch to 300/1000 of an inch smaller than the inner diameters of the bearing support surfaces 320 and 322. In other embodiments, the outer diameter of at least one of the bearing races 332 and 334 is equal to or smaller than 0.30 inches, 0.25 inches, 0.20 inches, 0.15 inches, or 0.10 inches smaller than the inner diameters of the bearing support surfaces 320 and 322. In some embodiments, similar variations in diameters can be seen between outer diameters of the bearing races 324 and 326 compared with the outer diameters of bearing races 332 and 334.

Figure 23:
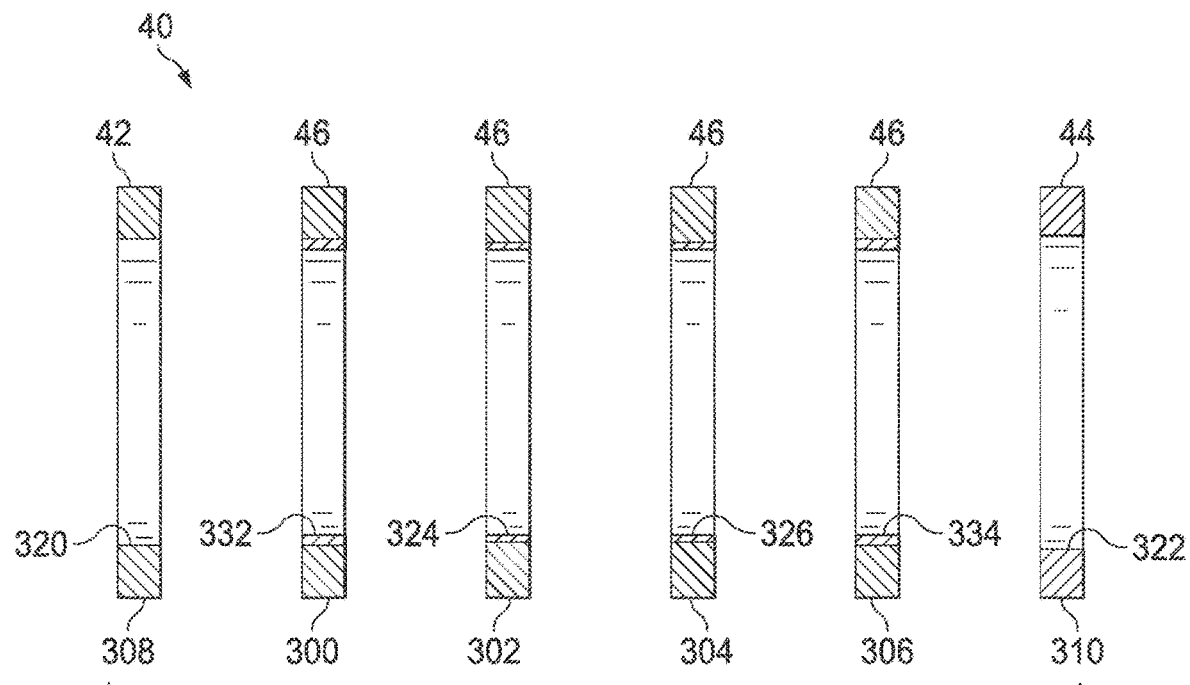

Referring to FIG. 23, after the bearing races 324, 326, 332 and 334 are installed on the frame assembly 40. As discussed in greater detail below, the bearing races 324, 326, 332 and 334 are used to support the crankshaft 16 on the frame assembly 40, as illustrated, for example, in FIGS. 28 and 41.

Figure 24:
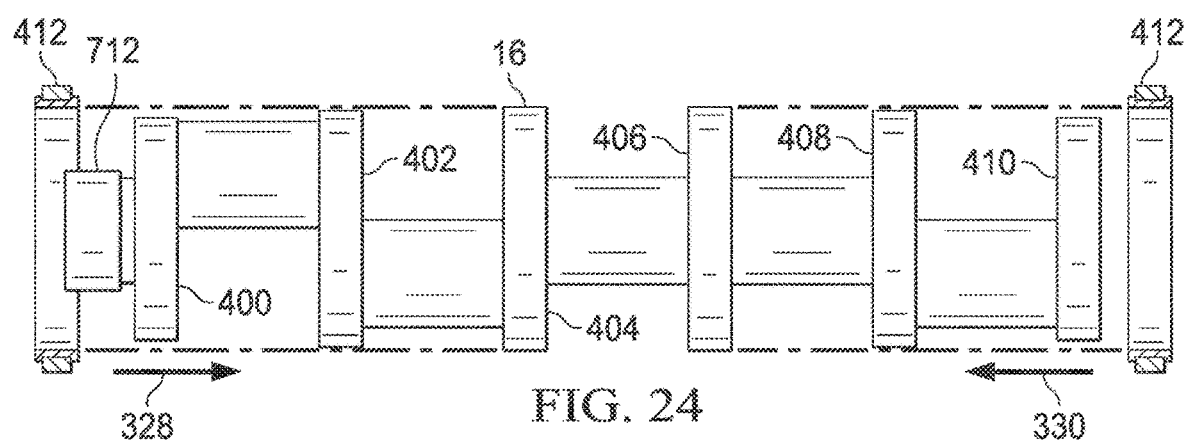
FIGS. 24-26 are simplified section views of a crankshaft illustrating bearing races being installed onto the crankshaft.
Figure 25:
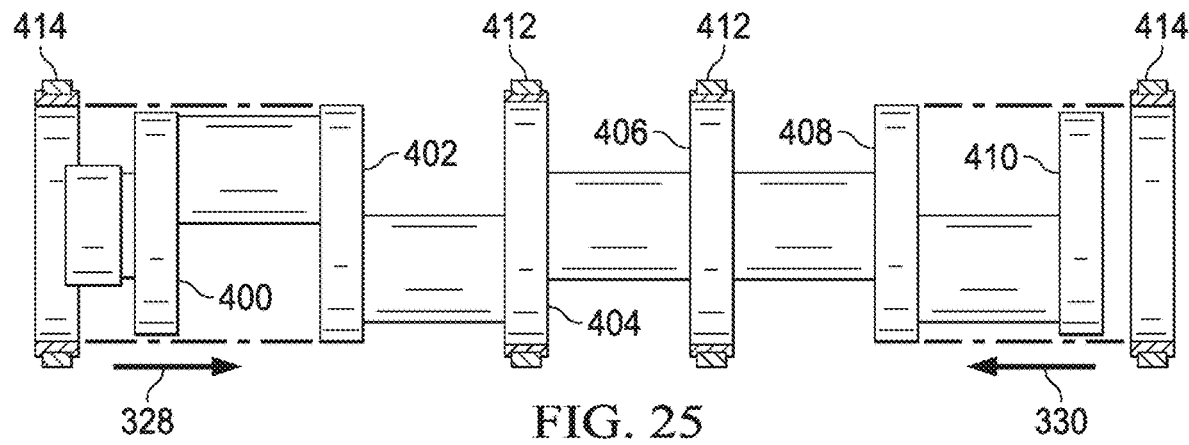
Figure 26:
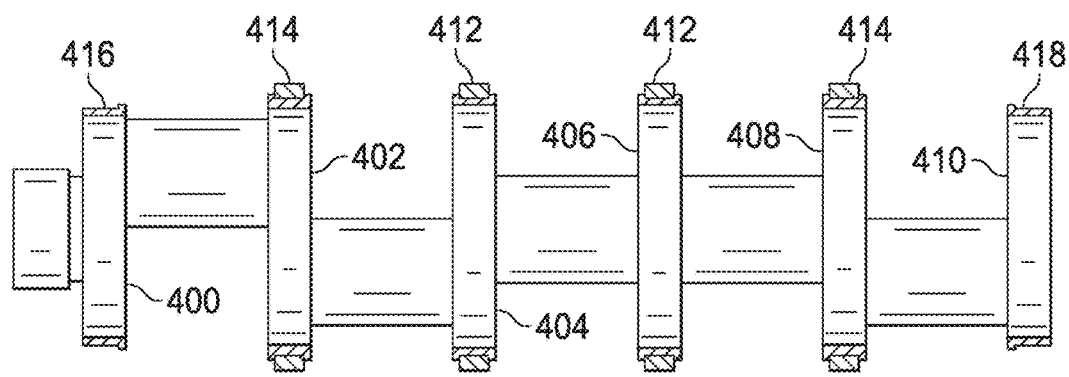
Figure 27:
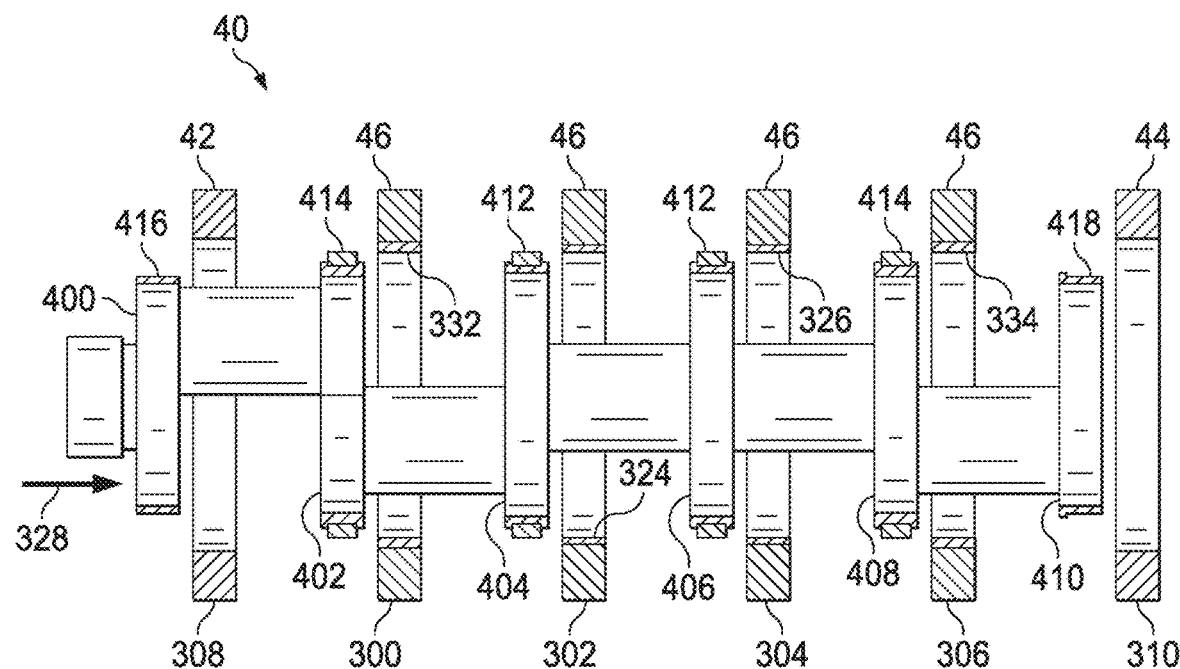
FIGS. 27 and 28 are simplified section views of the crankshaft being inserted into the frame assembly of FIGS. 40 and 41.

Referring now to FIGS. 24-26, assembly of the crankshaft 16 and inner bearing races 412 and 414 thereon is illustrated. In the embodiment illustrated in FIG. 24, for example, the crankshaft 16 includes a plurality of journals 400, 402, 404, 406, 408 and 410 that are configured to receive a plurality of bearing races 412 and 414 thereon. As illustrated in FIG. 24, journals 404 and 406 are formed having a diameter that is larger than the diameters of journals 402 and 408. Likewise, journals 402 and 408 are formed having a diameter that is larger than the diameter of journals 400 and 410. According to one exemplary embodiment, the diameters of journals 402 and 408 are between about 0.030 and 0.062 inches smaller than the diameter of the journals 404 and 406, although it should be understood that the relative lengths may be either larger or smaller. In addition and according to another exemplary embodiment, the diameter of the journals 400 and 410 are between about 0.062 and 0.124 inches smaller than the diameter of the journals 404 and 406, although it should be understood that the relative lengths may be either larger or smaller. Regardless of the diameter size of journals 400, 402, 404, 406, 408 and 410, the varying sized diameters provide ease of installation and/or removal of crankshaft bearings from the crankshaft 16.

For example, when assembling the bearing assemblies 412-418 onto the crankshaft 16, the inner bearing races 412 are first installed followed by the inner bearing races 414. As illustrated in FIGS. 24 and 25, for example, an inner diameter of the inner bearing races 412 is larger than the outer diameters of journal surfaces 400, 402, 408 and 410, which facilitates unimpeded installation of the bearing races 412 onto the crankshaft 16, and in particular, journals 404 and 406. In particular, the inner bearing races 412 are positioned adjacent to each end of the crankshaft 16 and moved in the direction of arrows 328 and 330 toward journals 404 and 406. Once the innermost bearing assemblies 412 are secured onto the surfaces 404 and 406, a pair of inner bearing races 414 are then positioned onto journals 402 and 408, as illustrated in FIG. 26. The inner diameter of the inner bearing races 414 is larger than the diameter of journals 400 and 410 to facilitate unimpeded movement in the direction of arrows 328 and 330 across the journals 400 and 410. Once the inner bearing races 412 and 414 are secured onto the crankshaft 16, the outer bearing components, which include bearing races 416 and 418, are then installed onto and around the journals 400 and 410, as best illustrated in FIG. 26.

According to some embodiments disclosed herein, in addition to sizing the components to have different non-interfering diameters, the crankshaft 16 is optionally cooled to a predetermined temperature in order to effectuate thermal cooling thereby causing the crankshaft to contract in size. When cooled and in the contracted state, the inner bearing races 412, 414, 416 and 418 are positionable on the crankshaft 16. As the temperature of the crankshaft 16 increases, the bearing races 412, 414, 416 and 418 are secured to the crankshaft 16 by an interference fit. According to other embodiments disclosed herein, inner bearing races 412, 414, 416 and 418 can be heated (e.g., such as by induction heating) to a predetermined temperature thereby causing the inner bearing races 412, 414, 416 and 418 to increase in size. Inner bearings races 412, 414, 416 and 418 can then be positioned on crankshaft 16 and secured thereto by an interference fit.

After the bearing races 412, 414, 416 and 418 are installed onto the crankshaft 16 (FIGS. 26 and 40), the crankshaft 16 is secured inside the frame assembly 40. Referring specifically to FIGS. 27, 28, 40 and 41, for example, the crankshaft 16 is moved in the direction of arrow 328 such that the inner bearing races 412 are aligned with and otherwise engage outer bearing races 324 and 326, the inner bearing races 414 are aligned with and otherwise engage the outer bearing races 332 and 334, and the bearing race 418 is aligned with the opening 110 on the end segment 44. According to some embodiments, the crankshaft 16 can be installed on the opposite side of the frame assembly 40 such that when moved in the direction opposite of arrow 328, the crankshaft 16 is inserted within the frame assembly 40.

Referring now to FIGS. 39-43, a crankshaft support device 700 is employed for supporting the crankshaft 16 during installation and removal thereof. In use, the crankshaft support device 700 is configured to support the crankshaft 16 in a generally horizontal position as illustrated, for example, in FIG. 40, so as to facilitate alignment of the crankshaft 16 with the bearing support surfaces 84. As explained above, once aligned with the bearing support surfaces 84, the crankshaft 16 is movable along a horizontal axis (lifted and supported via a crane or otherwise) in the direction of arrow 328 for insertion within the openings 110 formed by the bearing support surfaces 84. Once oriented in the desired position, the support device 700 is detached from the crankshaft 16.

Figure 39:
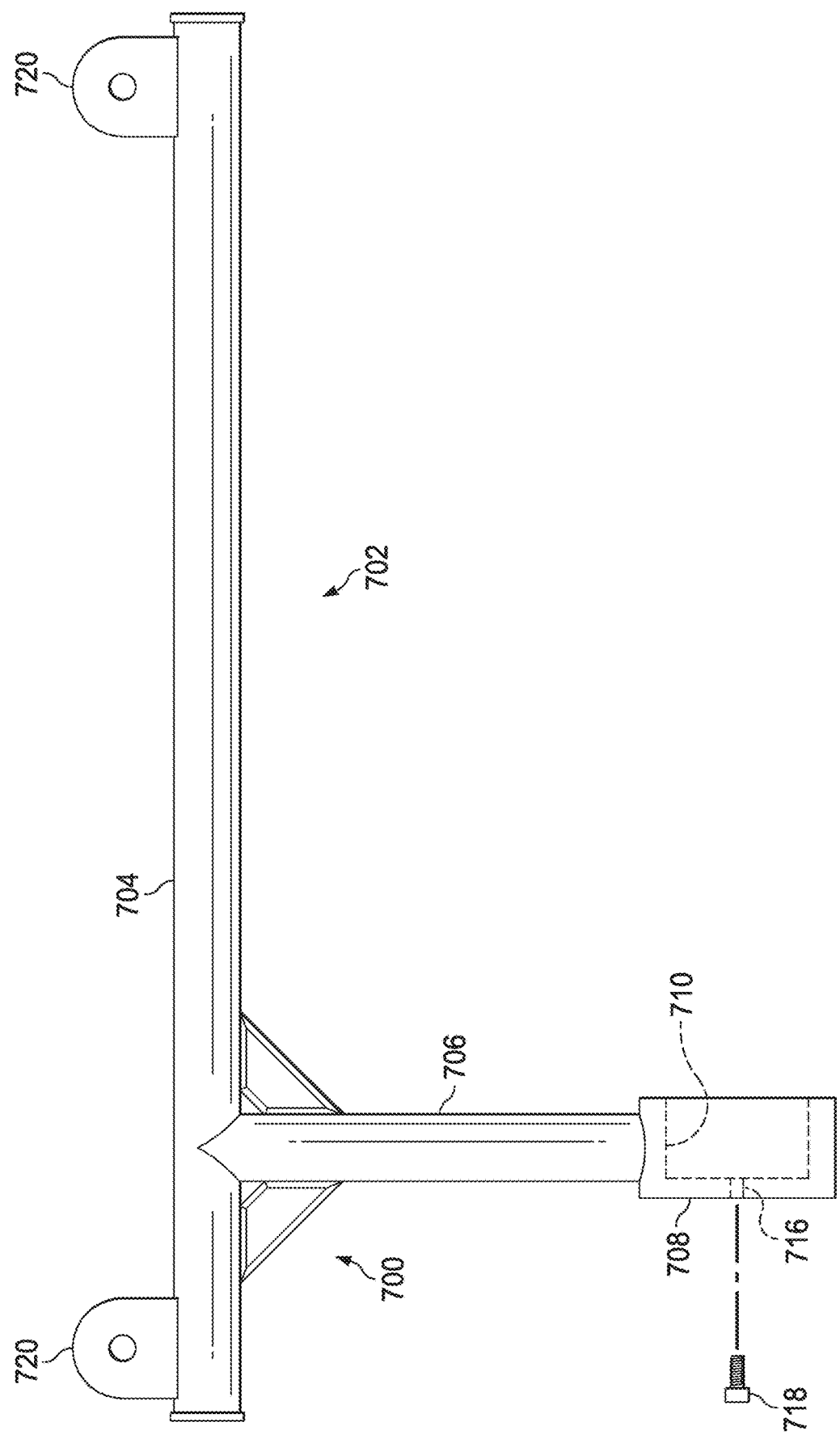
FIG. 39 is an illustration of a crankshaft support member for lifting and supporting a crankshaft during installation onto and removal from the power end housing.

Referring specifically to FIG. 39, the support device 700 includes a frame assembly 702 having a first segment 704 oriented to extend substantially along the length of the crankshaft 16 and a second portion 706 extending from the first portion 704. The frame assembly further includes a base section 708, which as described in further detail below, is used to secure the crankshaft 16 to the support device 700. As illustrated, the second portion 706 extends a predetermined distance from the first portion 704 so as to enable the crankshaft 16 to be spaced apart from the first portion 704 such that when inserting the crankshaft inside the bearing support surfaces 84, the first portion 704 does not contact any portion of the power end housing 12.

Figure 43:
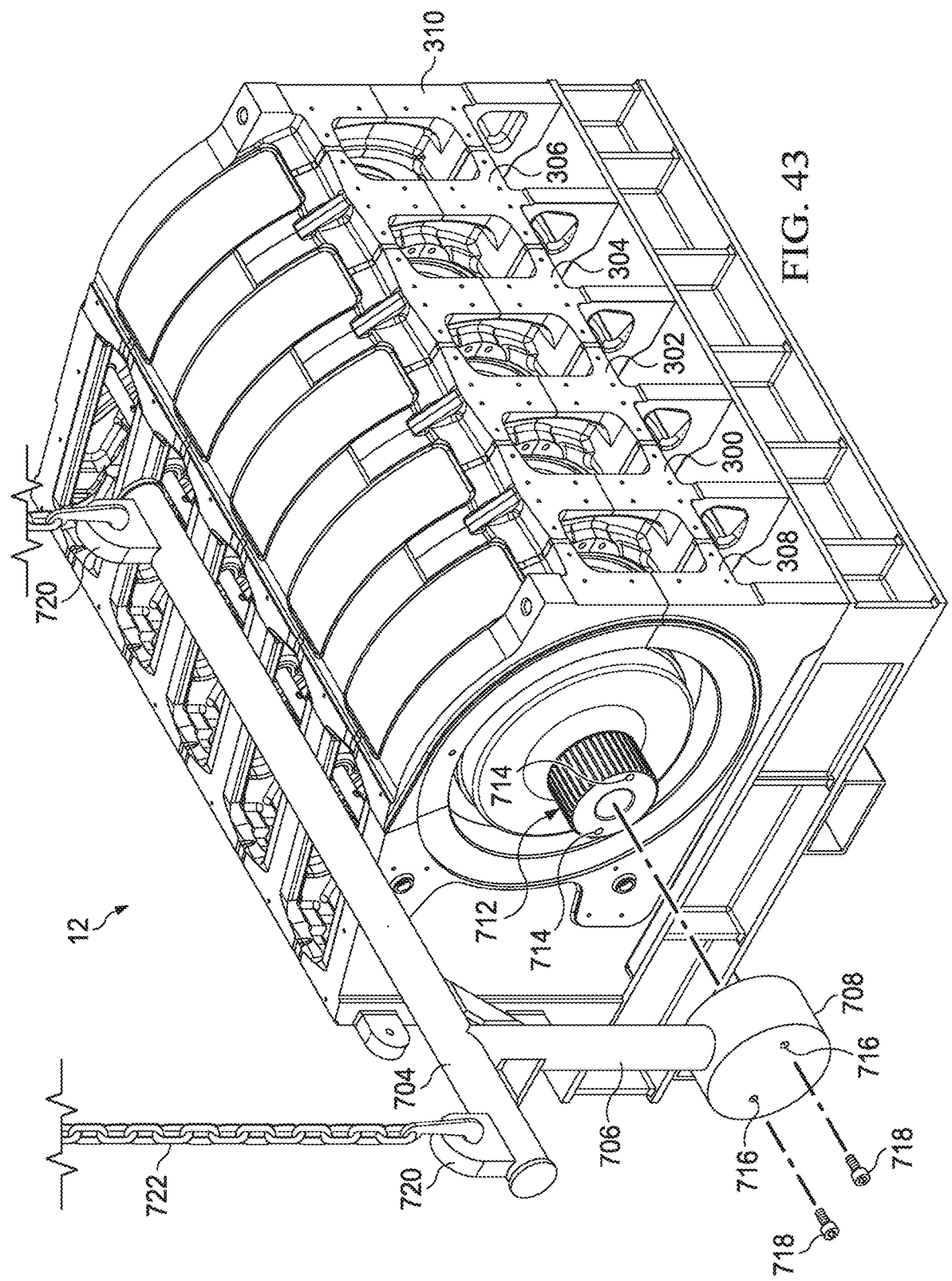
FIG. 43 is an illustration of the crankshaft support member detached from the crankshaft after installation of the crankshaft onto the power end housing.
Figure 44:
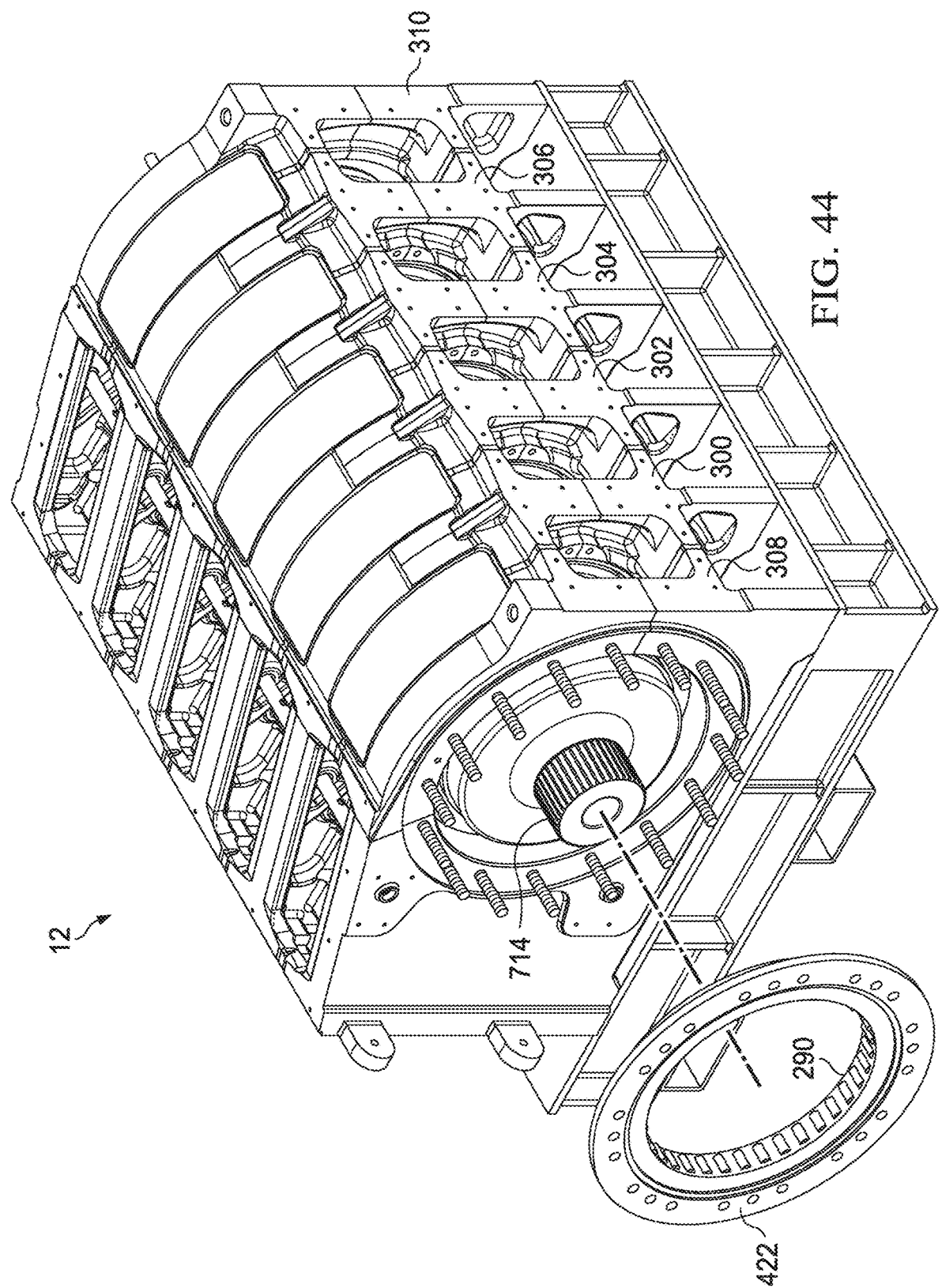
FIGS. 44-47 illustrate the installation of the outer bearing assemblies to support the crankshaft on the power end housing.
Figure 45:
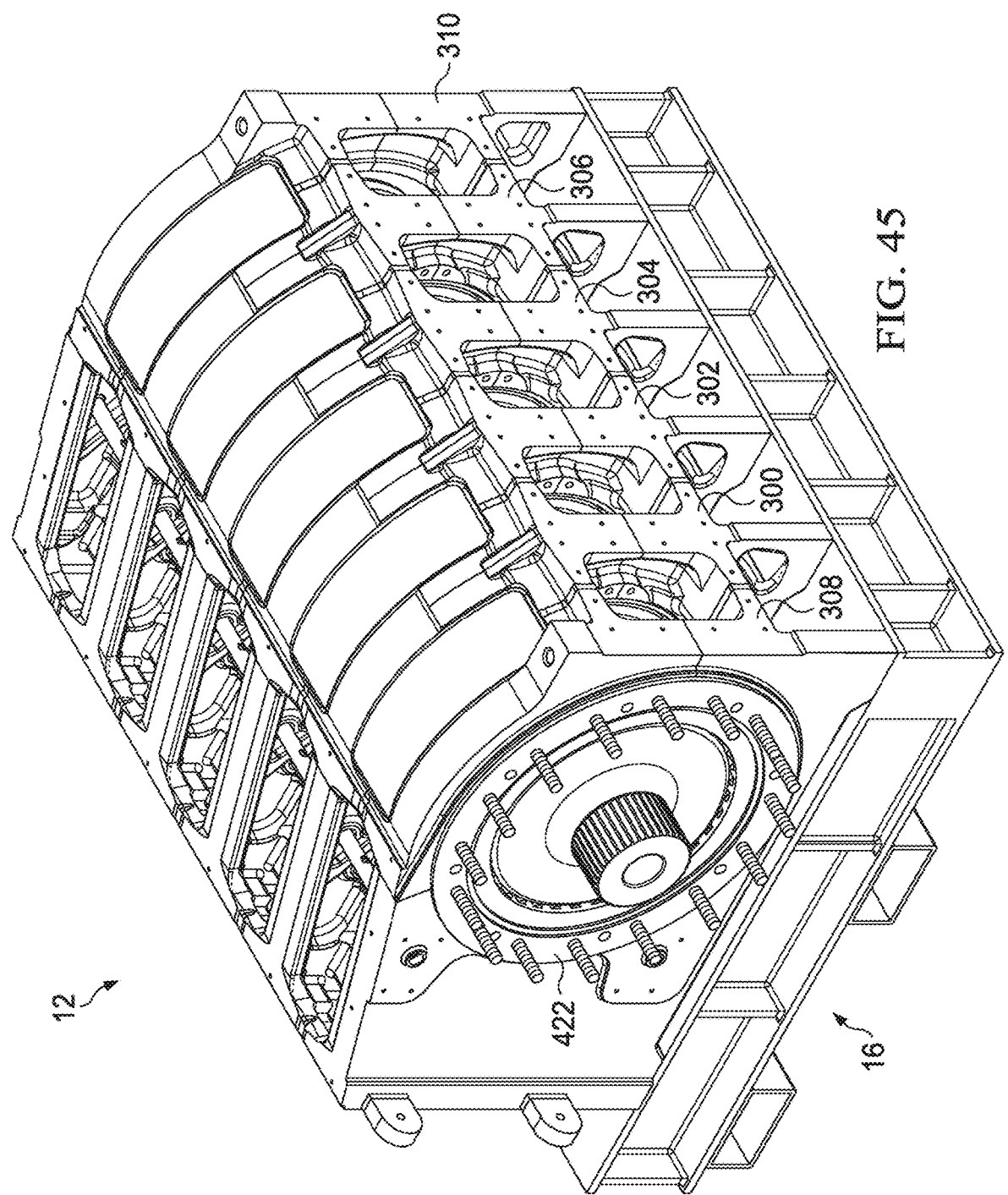
Figure 46:
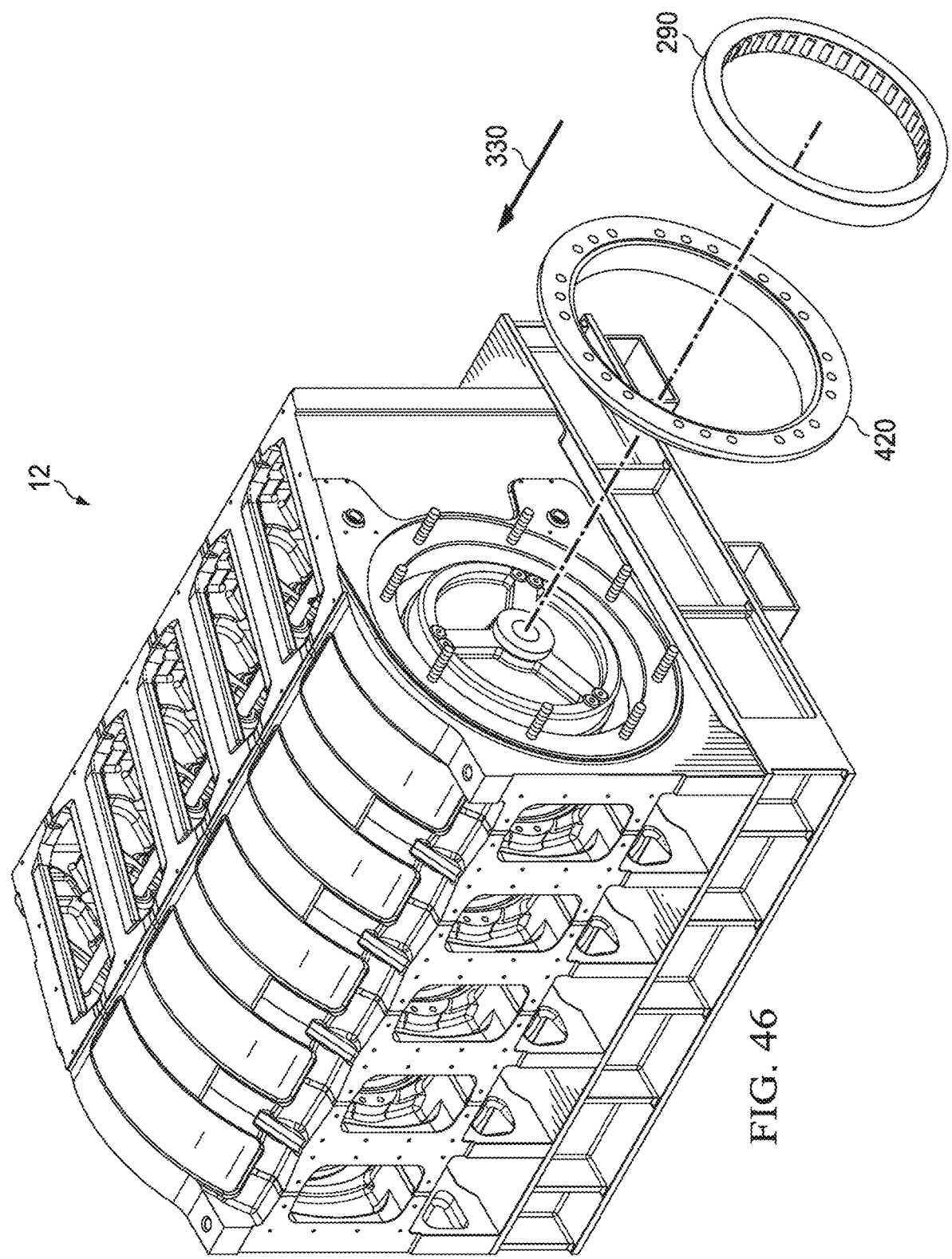
Figure 47:
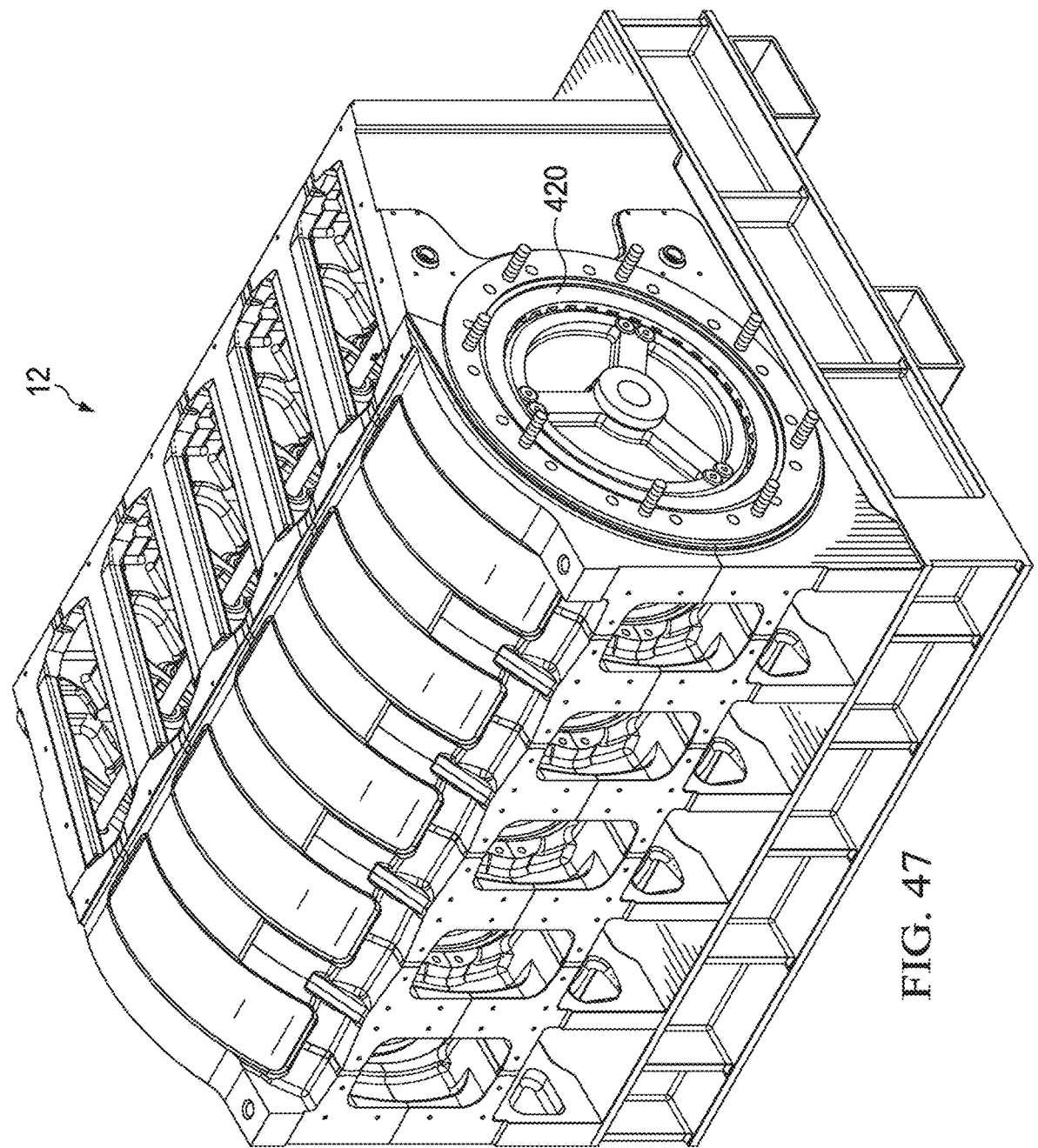

Referring to FIGS. 39 and 43, the base section 708 includes a cavity 710 sized to correspond to and receive an end of the crankshaft 16 therein. As illustrated in FIGS. 43-44, the crankshaft end includes threaded openings corresponding to openings 716 in the base section 708. When securing the support device 700 to the crankshaft 16, the openings 716 are aligned with corresponding openings in the end of the crankshaft 16 and a pair of threaded screws 718 are inserted therethrough to securely fasten the crankshaft 16 to the support device 700.

In the embodiment illustrated in FIGS. 39-43, the first section 704 includes a pair of eyelets 720 for receiving and engaging with a hanging structure, such as a chain 722, that extends from a crane or other lifting structure (not illustrated). The eyelets 720 are positioned on the first section 704 and the length of the chains 722 are sized so that the crankshaft 16, when secured to the support device 700, remains generally horizontal and/or otherwise parallel with an axis extending through the center of the openings 110 formed by the bearing support surfaces 84. According to some embodiments, the eyelets 720 have lifting shackles (not illustrated) inserted therein to secure the support device 700 to the chains. One lifting shackle attaches to a single length chain and the second shackle attaches to an adjustable chain to provide tiling freedom during installation. For example, the eyelet 720 that is farthest from second portion 706 can be engaged with an adjustable hanging structure, such as chain 722, such that crankshaft 16 can be balanced substantially horizontally (e.g., to facilitate alignment of the crankshaft 16 with the bearing support surfaces 84) by adjusting the adjustable hanging structure.

It should be understood that support structure 700 may be otherwise configured. For example, the first section 704 may extend a distance longer or shorter than the overall length of the crankshaft 16. Likewise, the length of the second section 706 may otherwise vary (i.e., may be longer or shorter than that depicted in FIGS. 39-43) and may extend in any direction other than perpendicularly from the first section 704. According to some embodiments, the support structure 700 is formed of metal, wherein the first section 704, the second section 706 and the base section are welded together. It should be understood, however, that the support structure 700 may be otherwise formed from a non-metallic material and be, for example, a single contiguous structure formed without welding.

According to some embodiments and as best illustrated in FIGS. 28 and 43-47, once the crankshaft 16 is installed in the power end 12, a pair of carrier members 420 and 422, which support bearing races 290 thereon, are installed onto the end segments 310 and 308, respectively, for supporting the crankshaft 16 for rotatable movement thereof.

Figure 48:
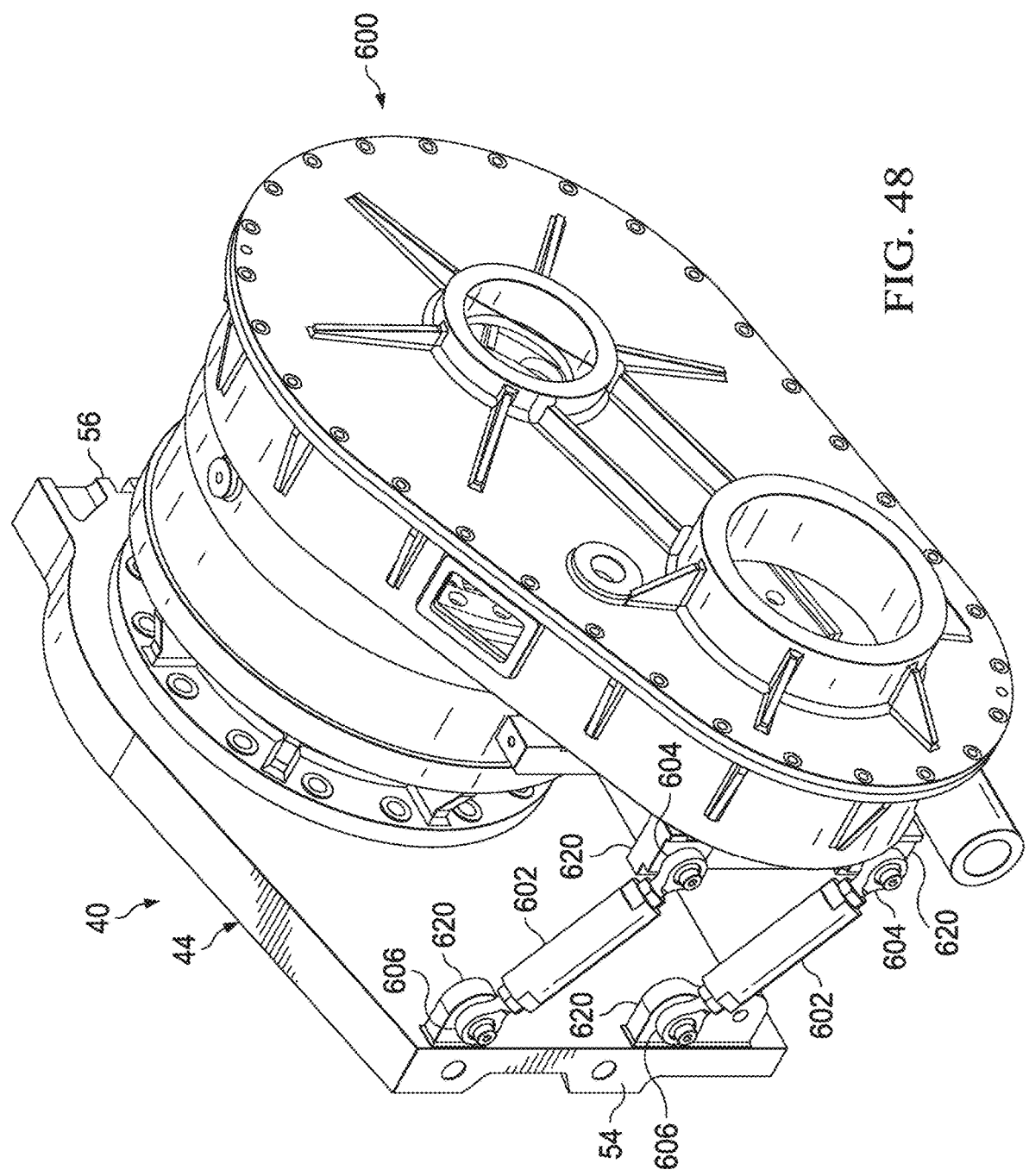
FIG. 48 is a front perspective view of a portion of a gearbox coupled to an end plate segment of a frame assembly.
Figure 49:
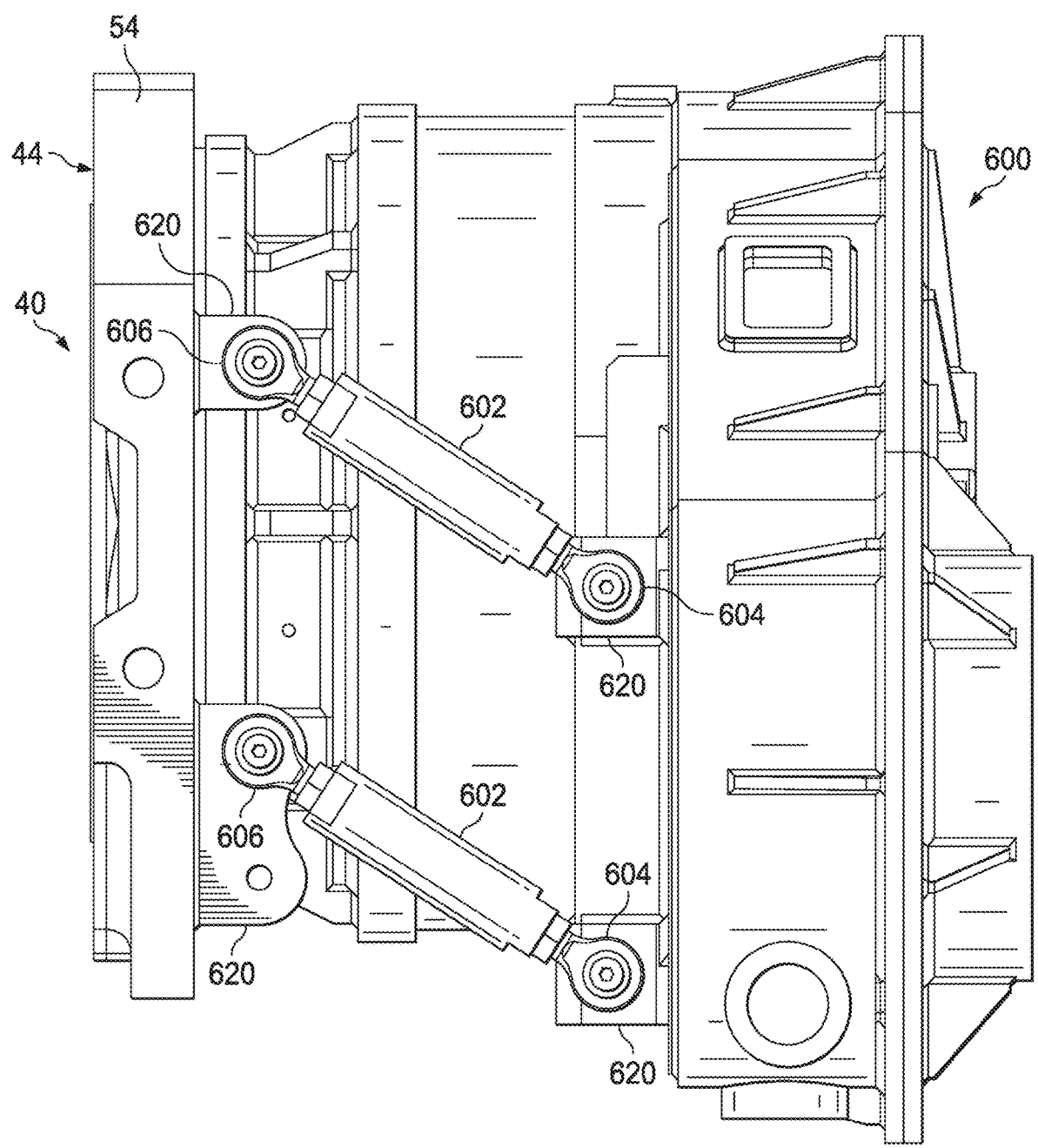
FIG. 49 is a front view of the gearbox and end plate segment of FIG. 48.
Figure 50:
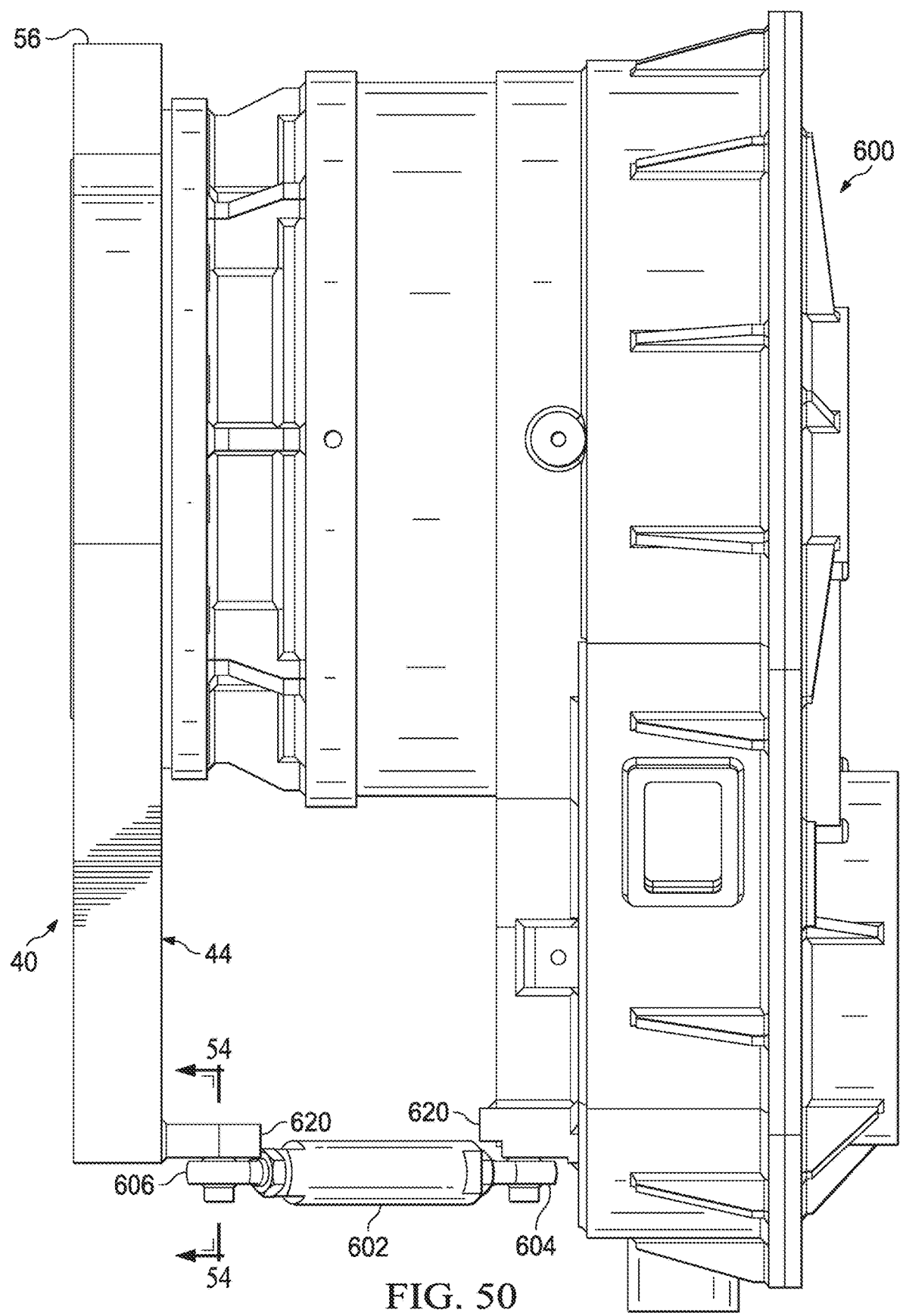
FIG. 50 is a top view of the gearbox and end plate segment of FIGS. 48 and 49.
Figure 51:
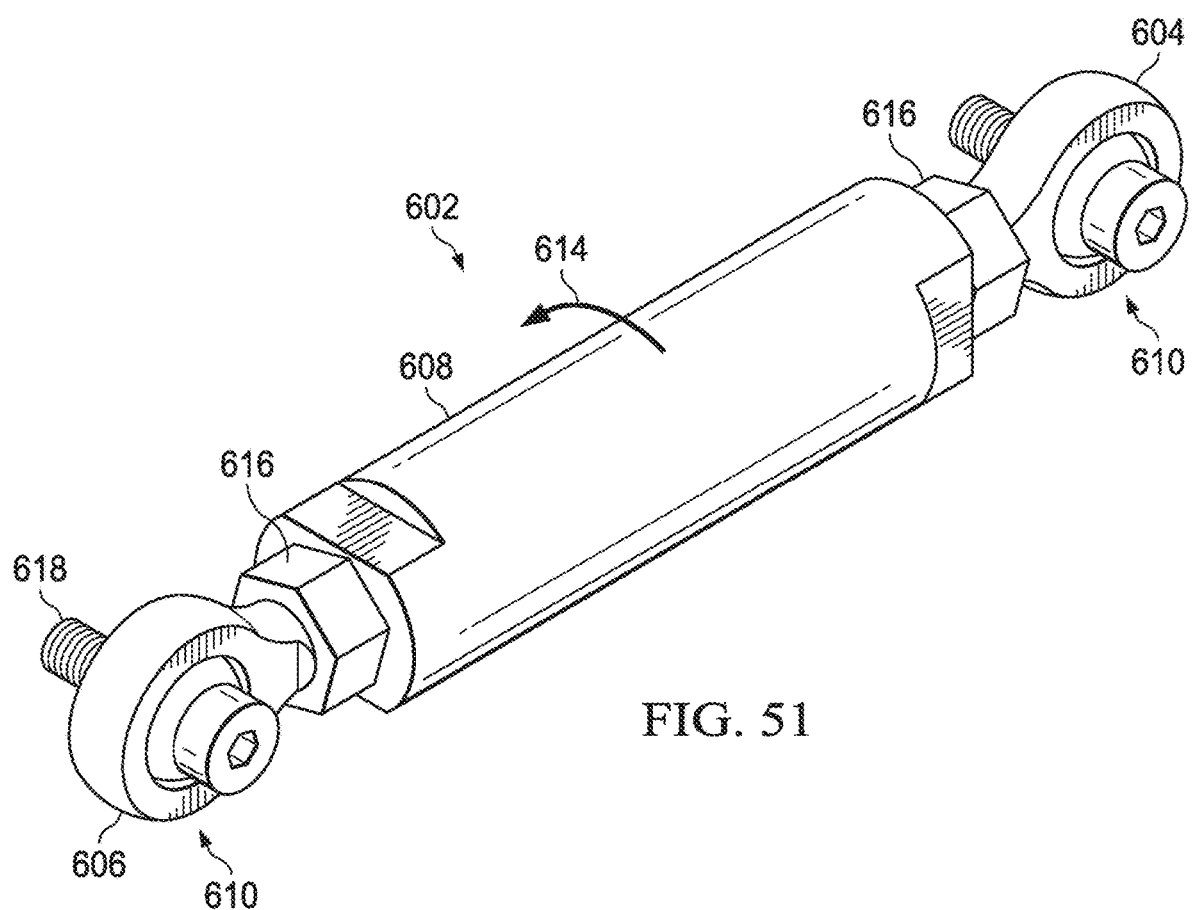
FIG. 51 is a perspective view of an arm member illustrated in FIGS. 48-50.

Referring now to FIGS. 48-50, a gearbox 600 is secured to the end plate 44 of the frame assembly 40 via a pair arm members 602 to resist movement of the gearbox 600 relative to the frame assembly 40. In FIGS. 48-50, for example, two arm members 602 are illustrated; however, in other embodiments, a greater or fewer number of arm members 602 may be employed. For example, according to some embodiments, three or more arm members 602 are secured between the end plate 44 and the gearbox 600 to resist relative movement between the end plate 44 and the gearbox 600. In operation, the position of the arm members 602 are optimized in order to resist rotational and axial movement to prevent and/or otherwise eliminate damage to the frame 40 and/or gearbox 600, including the outer housing and thus, the components therein.

In FIGS. 48-50, the first and second ends 604 and 606 of the arm members 602 are secured to the end plate of gearbox 600 (e.g., at gusset 620) and end plate 44 of frame assembly 40 (e.g., at gusset 620), respectively, such that the arm members 602 extend in a parallel configuration and in the same plane (FIG. 50). In the embodiment illustrated in FIG. 48, the arm members 602 generally extend and are otherwise disposed in a vertical plane that is near and/or otherwise adjacent to the front wall 54 of the frame assembly 40. However, in other embodiments, the arm members 602 may be otherwise configured to accommodate a different size and/or center of gravity of the gearbox 600, which varies depending on the size of the reciprocating pump assembly 10. For example, the arm members 602 may be secured in a non-parallel fashion and/or extend in different planes. Furthermore, the arm members 602, instead of being positioned and secured near or adjacent to the front wall 54 of the frame assembly 40, may be secured at other positions, such as, for example, at any position between the front wall 54 and the rear wall 56 of the frame assembly 40. Likewise, the arm members 602 are secured at any position along the gearbox 600 to resist rotational and/or axial movement of the gearbox 600 relative to the frame assembly 40.

Referring to FIGS. 51-54, the arm member 602 includes an elongate body 608 and ball joints 610 at the first and second ends 604 and 606 to facilitate pivotable movement, as discussed further below, during installation of and attachment of the arm members 602 to the gearbox 600 and the frame assembly 40. Furthermore, in some embodiments, each arm member 602 is adjustable in length to accommodate different sized configurations of the reciprocating pump assembly 10. Referring to FIG. 53, for example, each ball joint 610 is movable relative to the elongate body 608 via a pair of threaded adjustment bolts 612, such that, when it is desired to extend the length of the arm member 602, the elongate body 608 is rotated relative to the bolts 612 on each end 604 and 606. Thus, for example, in the event it is desired to extend the length of an arm member 602, the body member 608 is rotated in the direction of arrow 614 (FIG. 51), which in turn causes rotational movement of the body member 608 with respect to the bolts 612 (FIG. 53) to extend the length of the arm member 602. Similarly, in the event it is desired to shorten the length of an arm member 602, the body member is rotated in the direction opposite of arrow 614 to cause movement of the body member 608 with respect to the bolts 612 to reduce the length of the arm member 602. Once the arm member 602 is at the desired length, a pair of nuts 616 are tightened so that they abut against the body 608 to prevent relative movement of the adjustment bolts 612 relative to the elongate body 608.

While embodiments of the arm member 602 illustrated having adjustable bolts 612 on both sides of the elongate body 608, it should be understood that the arm member 602 may be otherwise configured. For example, in some embodiments, the arm member 602 is of a fixed length without the ability to be adjusted in length. In other embodiments, the arm member 602 includes only one end 604 or 606 that is adjustable in length. Thus, for example, the arm member 602 includes only a single threaded bolt 612 being adjustable to lengthen or shorten the arm member 602. In yet other embodiments, the arm member 602 includes telescoping portions (not illustrated) that slide and otherwise move in a telescoping relationship to adjust the length thereof. A cotter pin or any other locking device is usable to secure the telescoping segments to prevent separation and/or relative movement between the members during operation of the pump assembly 10.

In the embodiment illustrated in FIGS. 51-54, the arm members 602 are secured to the pump assembly 10 and the gearbox 600 via a shoulder bolt 618 disposed in each end 604 and 606. The shoulder bolts 618 secure the ends of the support members 602 to respective gussets 620 on the power end housing 12 and the gearbox 600 (FIG. 49).

Figure 54:
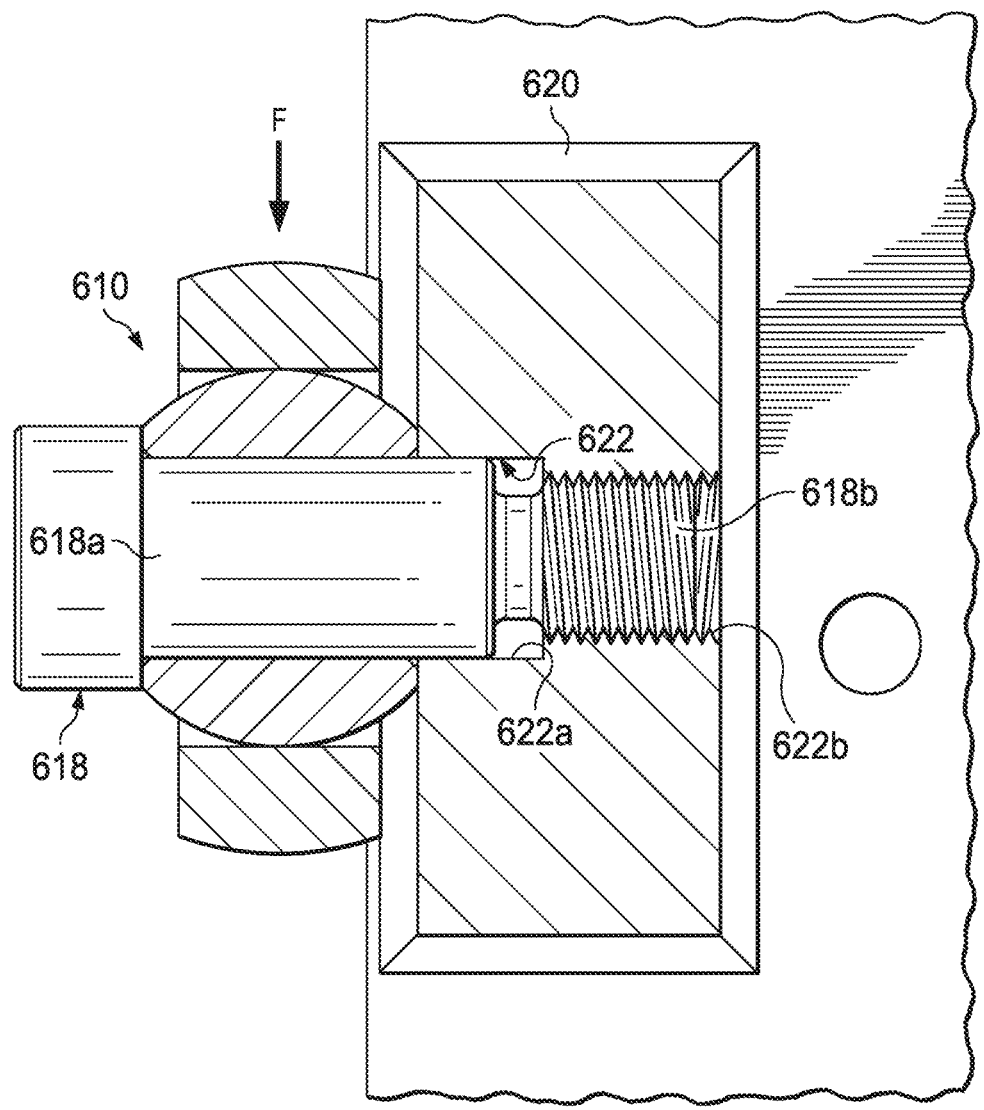
FIG. 54 is a section view of a portion of the frame assembly of FIG. 48-5 taken along the line of 54-54 of FIG. 24.

Referring specifically to FIG. 54, each shoulder bolt 618 is sized to fit within a corresponding counterbore 622 formed in each gusset 620. As illustrated in FIG. 54, each counterbore includes a first section 622a having a first diameter and a second section 622b having a second diameter. In FIG. 54, the first diameter is larger than the second diameter so as to, as discussed in further detail below, receive corresponding portions of the shoulder bolt 618 therein to reduce failure of the shoulder bolt 618, which oftentimes occurs in response to shear stresses generated during operation of the reciprocating pump assembly 10.

In the embodiment illustrated in FIG. 54, the shoulder bolt 618 includes a first portion 618a having a first diameter and a second portion 618b having a second diameter, the diameters of the first and second portions 618a and 618b corresponding to the diameters of portions 622a and 622b of the counterbore 622. The shoulder bolt 618 is secured within the counterbore 622 via a threaded connection between portions 618b and 622b of the shoulder bolt 618 and the counterbore 622, respectively. According to some embodiments, the first portion 622a of the counterbore 622 is precision machined to have a clearance between the first portion 618a of the shoulder bolt 618 and the first portion 622a of the counterbore 622 of about 0.002 inches. Accordingly, when a shear force F acts on the shoulder bolt 618, a significant portion of the shear is absorbed or otherwise countered by the first portion 618a of the shoulder bolt 618 rather than the threaded second portion 618b of the shoulder bolt 618. It should be understood that the clearance between the first portion 618a of the shoulder bolt 618 and the first portion 622a of the counterbore 622 may vary (i.e., the clearance therebetween may be greater or less than 0.002 inches). By having a larger diameter first section 618a larger than the second section 618b, the shear stresses acting on the threaded section 618b are reduced thereby reducing the likelihood of failure of the connection between the arm member 602 and the frame assembly 40 and the gearbox 600.

During assembly of the reciprocating pump assembly 10, the gearbox 600 is secured to the power end housing 12. Once secured, at least one arm member 602 is provided for attachment between the end segment 44 and the gearbox 600 to resist relative movement, including relative axial and rotational movement, between the gearbox 600 and the power end housing 12. According to some embodiments, the length of the arm member 602 is first adjusted to the necessary length so as to connect to both the power end housing 12 and the gearbox 600. Once positioned to the desired length, the ends 604 and 606 of the arm member 602 are aligned with the counterbores 622 on the respective power end housing 12 and the gearbox 600. The shoulder bolts 618 are then inserted through ball joints 610 on respective ends 604 and 606 and then into the counterbores 622. Each shoulder bolt 618 is tightened within the counterbores 622 to prevent separation of the shoulder bolts 618 from the counterbores 622.

Alternatively, either end 604 or 606 is first secured to either the power end housing 12 or the gearbox 600 as previously described. Once secured thereto, the unsecured or free end 604 or 606 is pivoted via the ball joint 610 so that the ball joint 610 on the unsecured end of the arm member 602 is otherwise aligned with the counterbore 622 on the power end housing 12 or the gearbox 600, whichever is unattached to the arm member 602. Once aligned, a shoulder bolt 618 is used to secure the second end 604 or 606 to the corresponding counterbore 622. If, however, prior to securing the second end 604 or 604, the ball joint 610 cannot be aligned with the counterbore 622, the length of the arm member 602 is adjusted, as previously discussed, so that the ball joint 610 aligns with the counterbore 622 to enable the shoulder bolt 618 to secure the arm member 602 thereto.

Figure 55:
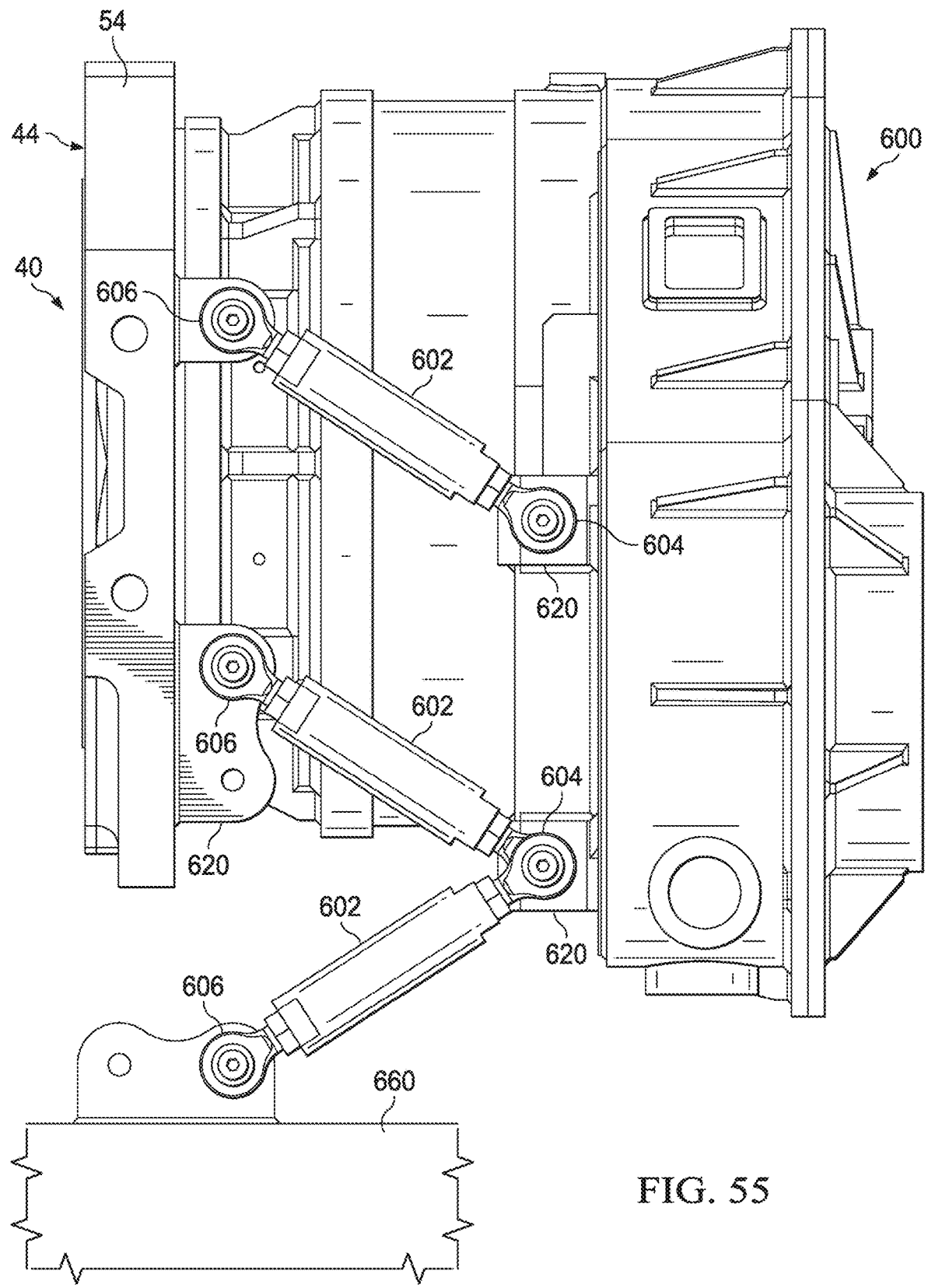
FIG. 55 is a front view of a gearbox and end plate segment of FIG. 48 illustrating an arm member secured to a trailer/skid.

It should be understood that while the arm members 602 are secured between the gearbox 600 and the power end housing 12, the arm members 602 may be otherwise utilized. For example, referring to FIG. 55, one arm member 602 is secured between the power end housing 12 and a second arm 602 is secured between the gearbox 600 and either a skid or a trailer 660. Alternatively, the arm members 602 may both extend from the gearbox 600 and the power end housing 12 directly to the skid and/or trailer 660.

Figure 56:
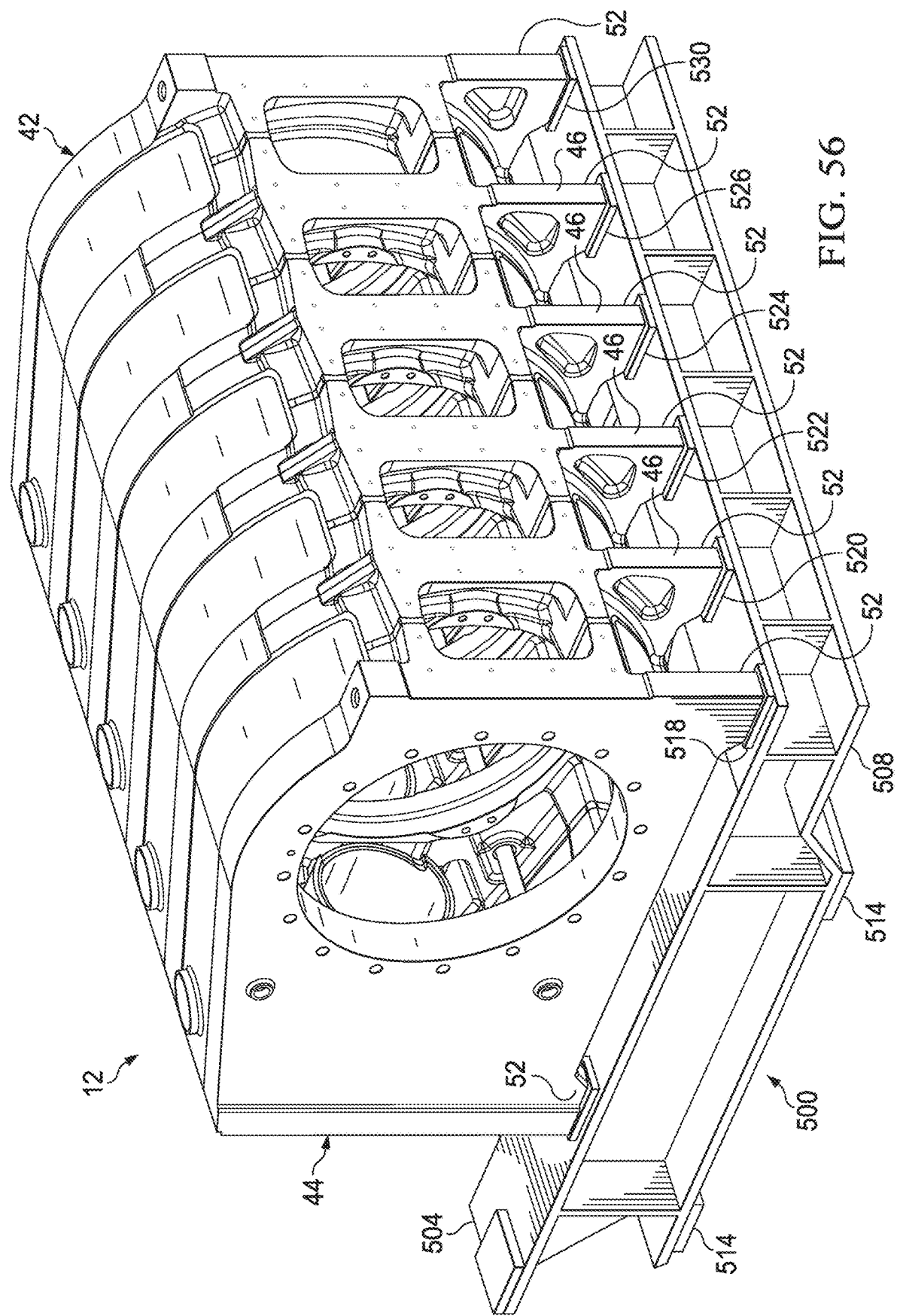
FIG. 56 is an illustration of the power end housing of FIG. 1 secured to a skid.
Figure 57:
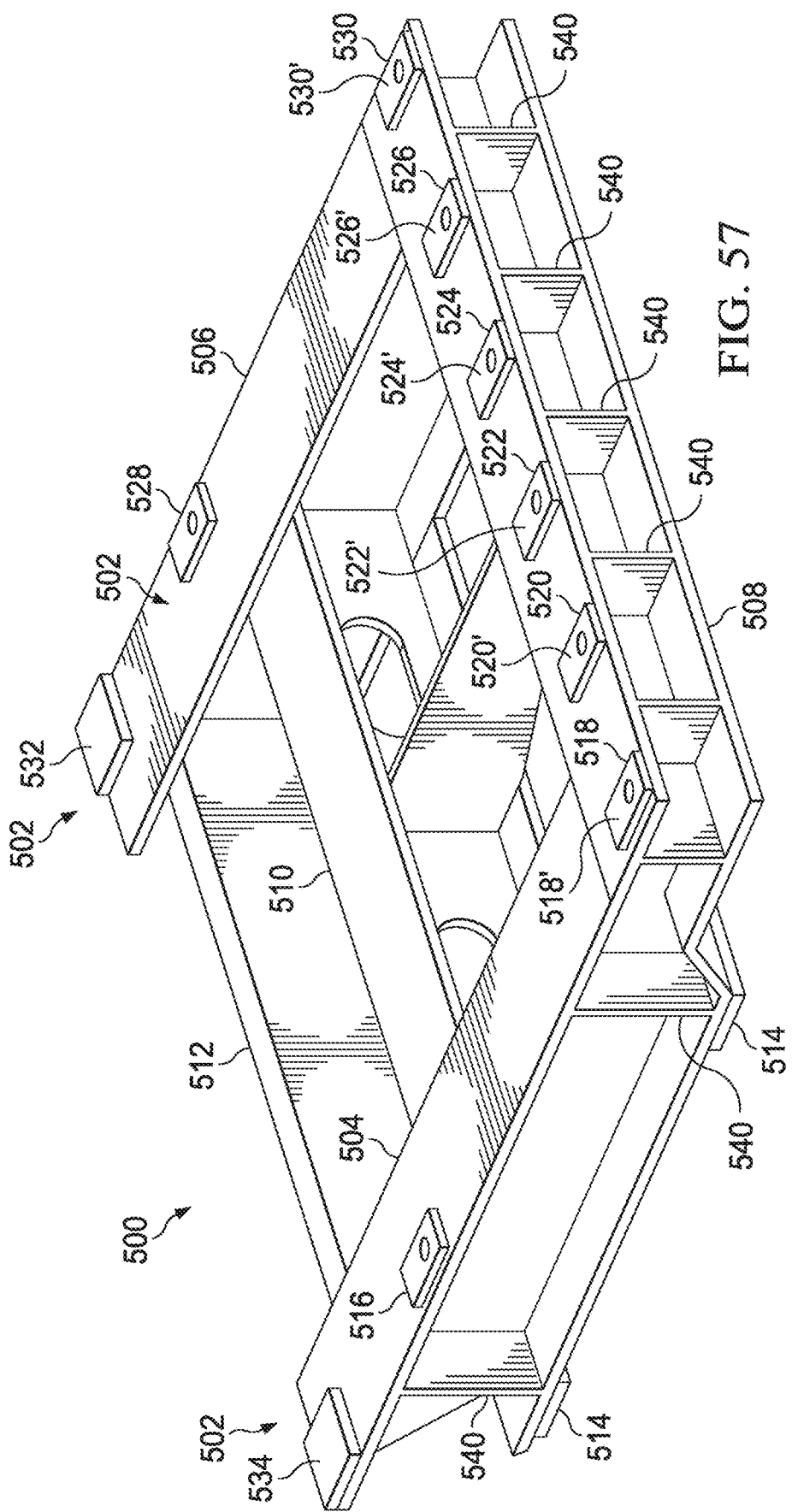
FIG. 57 is a top perspective view of the skid illustrated in FIG. 55.

Referring now to FIGS. 56 and 57, the power end housing 12 is supported on a skid 500. Referring specifically to FIG. 56, the skid 500 includes a base member 502, the base member having a pair of side segments 504 and 506, transverse segments 508, 510, and 512 extending between and connecting the side segments 504 and 506, and feet 514 for supporting the skid 500 on a support surface. In the embodiment illustrated in FIG. 56, the skid 500 includes a plurality of pads 516, 518, 520, 522, 524, 526, 528 and 530 that correspond to feet 52 on the frame assembly 40. For example, referring specifically to FIG. 55, pads 520, 522, 524 and 526 correspond to and are positioned to align with the feet 52 on the middle segments 46. Similarly, pads 516, 518, 528 and 530 correspond to and are positioned to align with feet 52 on the end segments 42 and 44. The skid 500 further includes a pair of pads 532 and 534 to support at least a portion of the fluid end housing 14 (FIG. 1). Referring specifically to FIG. 57, the side segments 504, 506 and transverse segment 508 each include a plurality of gussets 540 secured thereto to increase the stiffness of the skid 500 to resist bending and torsional loading. In FIG. 57, each side segment 504 and 506 include two spaced apart gussets 540 and the transverse segment 508 includes five spaced apart gussets 540, disposed between the pads 518, 520, 522, 524, 526, and 530. It should be understood, however, that a greater or fewer number of gussets 540 may be utilized on the skid 500 to increase the stiffness thereof.

According to some embodiments, the pads 520, 522, 524 and 526 have a thickness that is different from the thickness of pads 516, 518, 528 and 530. For example, in the embodiment illustrated in FIG. 56, the pads 520, 522, 524 and 526 have a thickness that is less than the thickness of pads 516, 518, 528 and 530. The varying thickness provides a gap between the feet 52 and the pads 520, 522, 524 and 526 to enable the frame assembly 40 to be shimmed in order to reduce "rocking", vibration, deformation and other unwanted movement.

During manufacture of the frame assembly 40, according to one embodiment, the feet 52 on segments 42, 44 and 46 are machined so as to lie on the same plane such that when frame assembly is supported on the pads 516, 518, 520, 522, 524, 526, 528 and 530, feet 52 on end segments 42 and 44 are in contact with pads 516, 518, 528 and 530 and feet 52 on middle segments 46 are aligned with but otherwise spaced apart from pads 520, 522, 524 and 526 to provide a gap to receive a shim or other spacer element. During assembly of the power end housing 12 to the skid 500, the desired shim or other spacer elements can be inserted in the gaps formed between the feet 52 and the pads 520, 522, 524 and 526 to reduce and or otherwise eliminate rocking or other unwanted movement of the power end housing 12 relative to the skid 500. In other embodiments, the feet 52 on middle segments 46 are formed to extend onto a different plane than the plane containing the feet 52 on the end segments 42 and 44 and the pads 520, 522, 524 and 526 have a lesser thickness than the pads 516, 518, 528 and 530. In other embodiments, each pad 516-528 is the same thickness and shims are used to fill any gap between the foot 52 and the pads 516-528.

According to other embodiments, the pads have a differing thickness to accommodate bends in the skid 500. For example, in the event the transverse segment 508 is bent (i.e. the section 508 of the segment near the pad 530 is lower than the section of the segment 508 near pad 518), the pads 518, 520, 522, 524, 526, and/or 530 are machined, as needed, such that a top surface of the pads 518', 520', 522', 524, 526', and/or 530' rest in the same plane. Accordingly, if the section 508 of the segment near the pad 530 is lower than the section of the segment 508 near pads 518, the thickness of pad 530 will be greater than the thickness of the pad 518, because a greater portion of the pad 518 must be removed in order for surfaces 518' and 530' to lie in the same plane.

Figure 58:
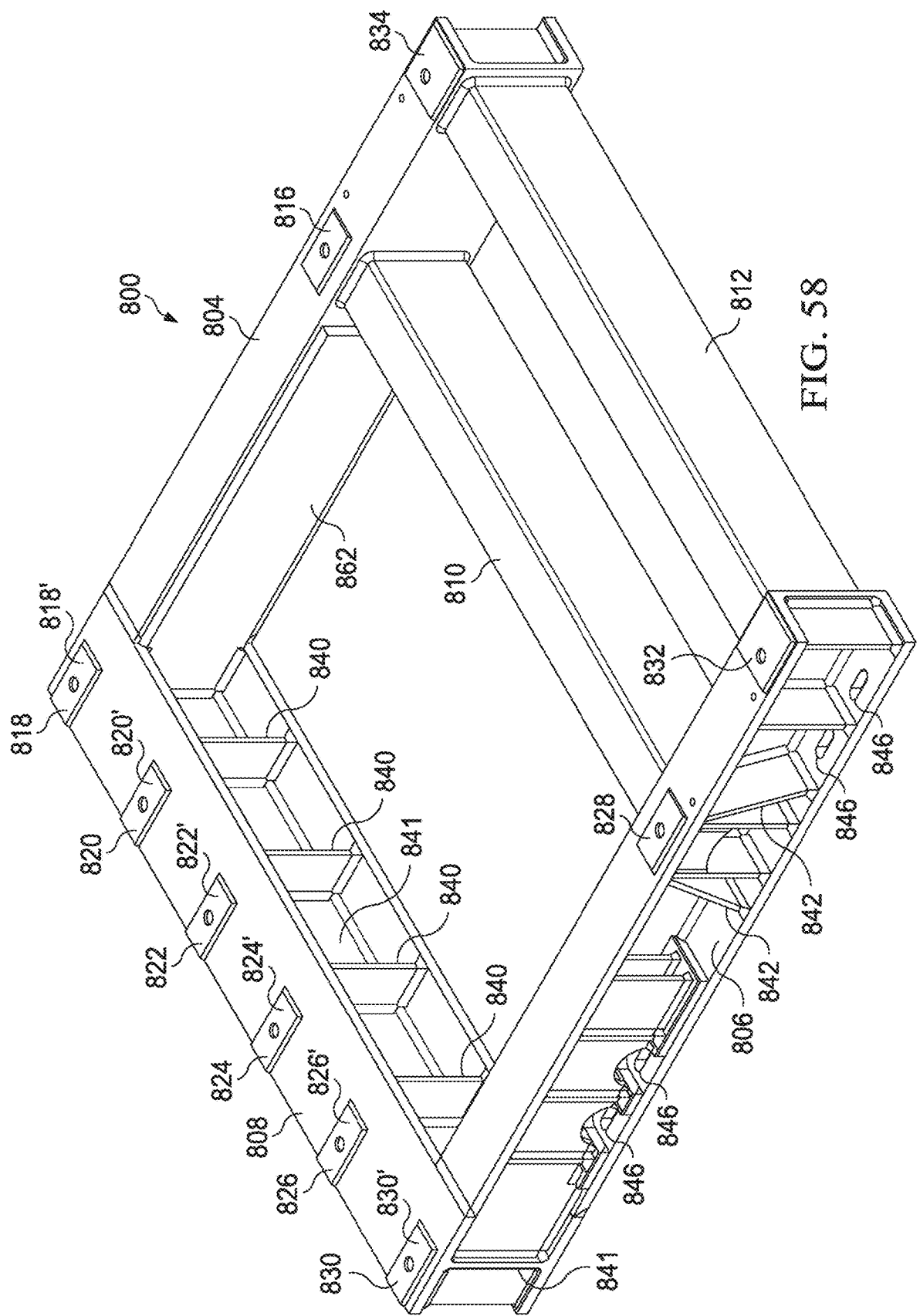
FIGS. 58 and 59 are illustrations of an alternate skid arrangement.
Figure 59:
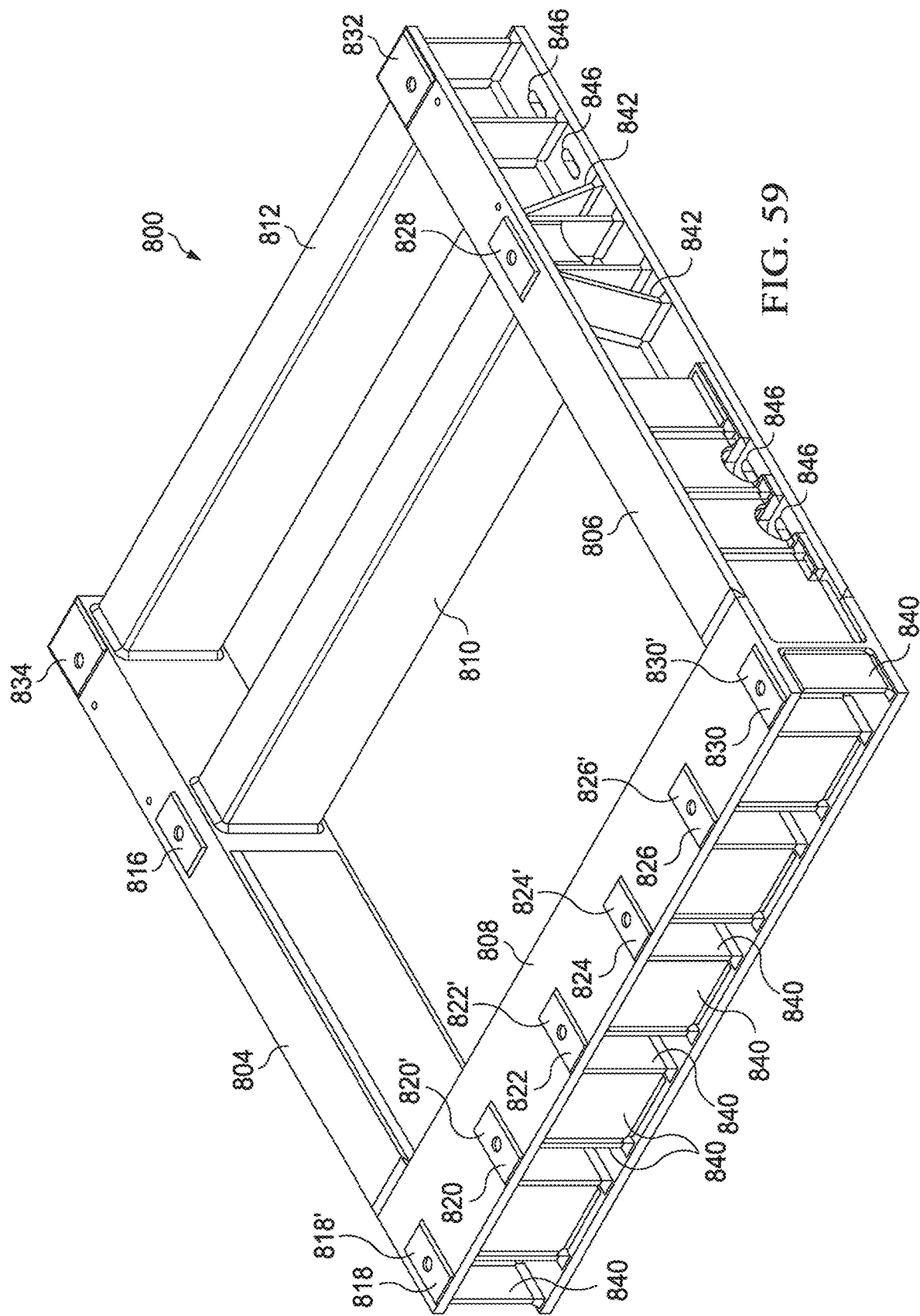
Figure 60:
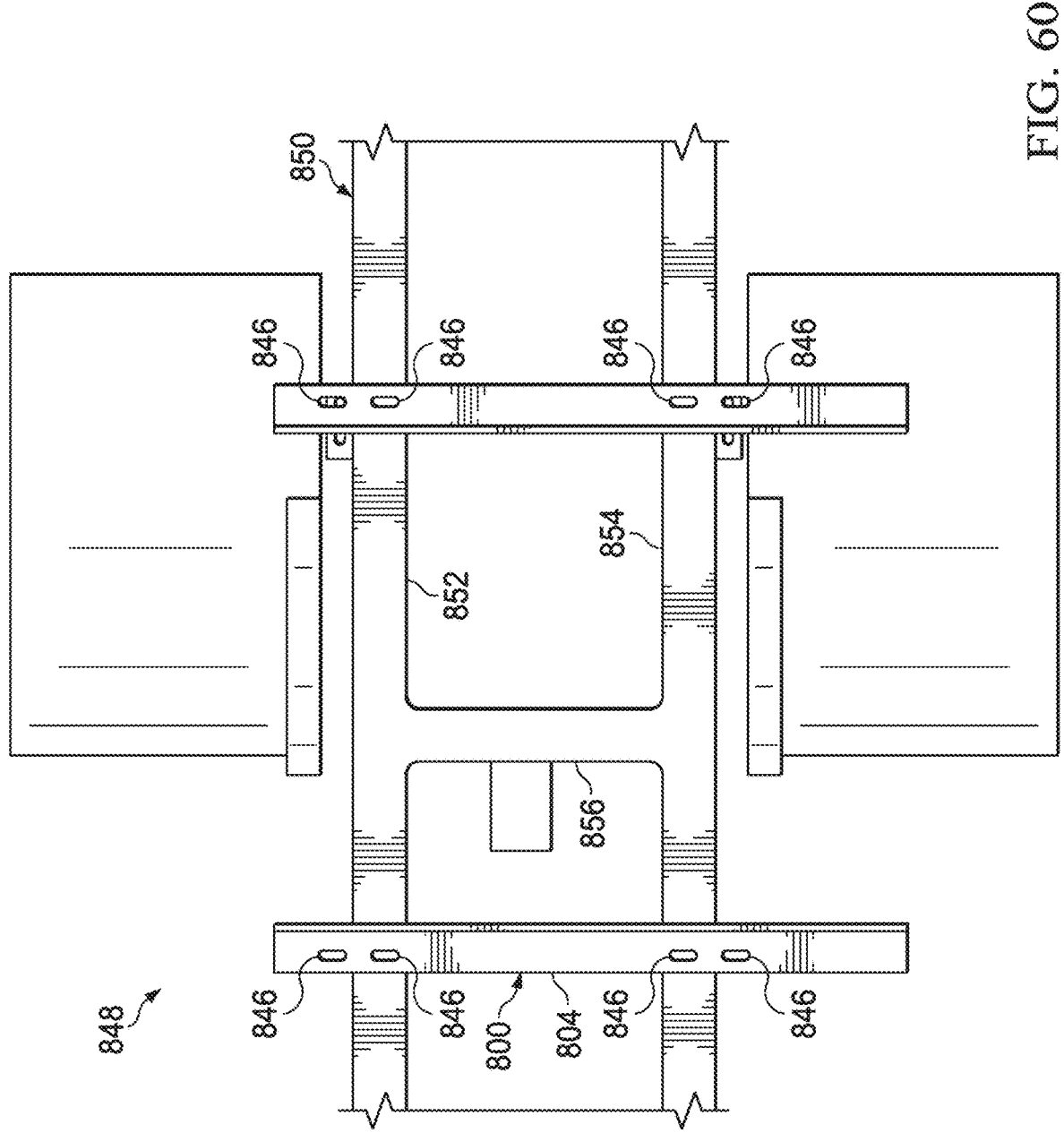
FIG. 60 is a simplified illustration of the skid of FIGS. 58 and 59 secured to a trailer.

Referring now to FIGS. 58-60, an alternate skid configuration 800 is illustrated. In FIGS. 58 and 59, the skid 800 includes transverse support members 808, 810 and 812 extending between and connecting the side segments 804 and 806. The transverse support members 810 and 812 are formed having a hollow interior and provide additional rigidity and support for the areas around the pads 816, 828, 832 and 834. In the embodiment illustrated in FIGS. 58 and 59, for example, the transverse segment 808 is shaped as an I-beam and includes a plurality of vertical gussets 840 disposed on each side of a web member 841; however, it should be understood that the transverse segment may be shapes other than an I-beam shape. The skid 800 further includes a plurality of vertical gussets 840 disposed on the side segments 804 and 806. In the embodiment illustrated in FIG. 59, the side segments 804 and 806 are formed having a "C" shaped channel in which the gussets 840 are disposed therein; however, it should be understood that the side segments 804 and 806 can be formed other than "C" shaped. Furthermore, the side segments 804 and 806 each include a plurality angularly disposed gussets 842 disposed within the "C" shaped channel. Gussets 840 and 842 provide additional support and rigidity to the skid 800.

Referring specifically to FIGS. 58 and 59, the transverse segment 80 includes a plurality of gussets 840 disposed around pads 818, 820, 822, 824, 826 and 830 and on both sides of the web 841 to provide additional support when the power end housing 12 is secured to the skid 800. In the embodiment illustrated in FIG. 59, the gussets 840 are positioned so as to form a channel to provide access to mounting bolts (not illustrated) to enable tighten mounting bolts to secure the feet 52 to the skid 800. According to some embodiments, each side segment 804 and 806 optionally includes a reinforcing plate secured thereto to provide additional rigidity to the skid 800. In FIG. 58, for example, the reinforcing plate extends substantially between the transverse support members 808 and 810. Although the reinforcing plates may extend for lesser distances and/or be formed of multiple sections.

It should be understood that skids 500 and 800 may be otherwise configured. For example, a greater or fewer number of transverse segments may be utilized. Likewise, additional side segments may be positioned parallel to side segments 504, 506 and 804, 806. In other embodiments, additional segments may be angularly disposed between the side segments, the transverse segments or any combinations thereof.

Referring specifically to FIGS. 58-60, the skid 800 further includes a plurality mounting openings 846 disposed on the side segments 804 and 806, the openings 846 spaced apart and positioned to enable the skid 800 to be secured to a trailer 848 (FIG. 60). In the embodiment illustrated in FIG. 60, the trailer 848 includes a chassis 850 having longitudinal frame segments 852 and 854 and a transverse segment 856 extending between the longitudinal frame segments 852 and 854. The longitudinal segments 852 and 854 include slots positioned to align with the slots 846 on the skid 800 to enable the skid 800 to be secured to the chassis 850 via a plurality of bolts or any other suitable attachment means. As illustrated in FIGS. 58 and 59, the slots 846 are elongated so as to accommodate differing sized chassis 850 (i.e., the longitudinal frame segments 852 and 854 being spaced farther apart or closer together). Referring to FIG. 60, a bracket is optionally attachable to and cantilevers from the chassis 850 so as to provide additional support to the skid 800 when the power end housing 12 is secured thereto.

Referring now to FIGS. 61 and 62, the bottom skin 164 is welded to the middle plate segment 46. In FIGS. 61 and 62, the bottom skin 164 is formed having a generally "J" shaped groove 920 on each edge to be joined with the corresponding segment 46 (or end plate segment 42 or 44, as applicable) at its weld joint edge near the outer surface. The segment 46 has a generally reverse "J" shaped groove 905 and a backing step 910. The backing step 910 supports the root surface 919 of the bottom skin 164 on a backing surface 915. The backing surface 915 transitions to the "J" groove 905 with a mating surface 913, which abuts the mating end 917 of the bottom skin 164. The mating surface 913 prevents lateral movement of the bottom skin 164.

In one embodiment, mating surface 913 has a depth about 0.06 inches and the backing surface 915 is extended for about 0.13 inches from the mating surface 913. The mating end 917 is about 0.06 inches thick and can thus evenly join the "J" groove 920 with the "J" groove 905, as further described below.

The "J" groove 920 of the bottom skin 164 is joined with the "J" groove 905 of the segment 46 to form a "U" groove for receiving weld metal to enable formation of a complete penetration weld, without requiring a separate a backing plate. For example, a molten weld metal 930 is provided to the "U" groove formed from the two "J" grooves 905 and 920. In one embodiment, the weld metal 930 may be the same or materially similar to the base metal of the segment 46 and the bottom skin 164.

Welding fusion occurs between the weld metal 930, the bottom skin 164 and the segment 46 and forms a fused region 935 though the thickness of the segment 46, thus unifying the three pieces (i.e., the segment 46, the weld material 930, and the bottom skin 164) into one. For example, the fused region may have a thickness of about 0.06" to 0.13", depending on welding power and material. The solidified weld metal 930 may not necessarily be planed as illustrated but a proximate plane surface can be achieved with proper control of the amount of the weld metal 930. Various welding methods may be used, such as flux-cored arc welding, gas metal arc welding, submerged arc welding, or other appropriate method. In some embodiments, the segment 46, the weld metal 930, and the bottom skin 164 may be submerged in a solution for welding.

It should be understood that the above-mentioned welding process can be used to secure both the top and bottom skin assemblies 162 and 164 to the end and middle plate segments 42, 44 and/or 46.

The various embodiments and aspects described herein provide multiple advantages such as, for example, providing a power end housing frame assembly 40 having components that can self-align, enable bearing assemblies to be inserted with minimal risk that the bearing assemblies will be trapped on the bearing support surfaces, can be more easily assembled, require less welding, can be manufactured at a reduced weight, and have increased strength thereby operating with less deflection and/or deformation to increase the operating life and integrity of the frame assembly 40 while at the same time reducing manufacturing costs.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A reciprocating pump comprising:
a fluid end; and
a power end frame assembly configured to be supported on a support surface to reciprocatingly drive a plurality of plunger assemblies in a longitudinal direction toward and away from the fluid end, the power end frame assembly comprising:
a first and second end plate segment; and
at least one middle plate segment disposed between the first and second end plate segments;
wherein the first end plate segment and the second end plate segment and the at least one middle plate segment each include a top wall, an opposed bottom wall, a front wall, a rear wall, and a pair of sidewalls, and
wherein the first and second end plate segments and the at least one middle plate segment are spaced apart and oriented in the longitudinal direction to support the plurality of plunger assemblies there between such that a first plunger assembly is disposed in the longitudinal direction between the at least one middle plate segment and the first end plate segment and a second plunger assembly is disposed in the longitudinal direction between the at least one middle plate segment and the second end plate segment so as to reciprocate at least partially within the fluid end, at least one foot extends from the bottom wall on at least one of the first end plate segment and the second end plate segment in a direction away from the plurality of plunger assemblies, and at least one foot extends from the bottom wall on the at least one middle plate segment in a direction away from the plurality of plunger assemblies, each foot configured to directly support the power end frame assembly on the support surface.

2. The reciprocating pump of claim 1, wherein each foot is integrally formed with the bottom wall.

3. The reciprocating pump of claim 1, wherein the at least one middle plate segment includes only one foot that extends from the middle plate bottom wall.

4. The reciprocating pump of claim 1, wherein the first and second end plate segments and the at least one middle plate segment each include an opening extending therethrough to support a crankshaft bearing assembly.

5. The reciprocating pump of claim 1, further comprising a plurality of extensions extending from the sidewall of at least one end plate segment of the first and second end plate segments, toward the at least one middle plate segment, the plurality of extensions integrally formed with the at least one end plate segment.

6. The reciprocating pump of claim 5, further comprising the plurality of extensions integrally formed with and extending from the at least one middle plate segment toward a corresponding extension on the at least one end plate segment.

7. The reciprocating pump of claim 1, wherein the first and second end plate segments each include a pair of support feet.

8. A reciprocating pump comprising a power end frame assembly configured to rotatably support a crankshaft to reciprocatingly drive a plurality of plunger assemblies toward and away from an adjacently positioned fluid end, the power end frame assembly configured to be supported on a support surface, the power end frame assembly comprising:
first and second end plate segments and at least one middle plate segment disposed between and spaced apart from the first and second end plate segments, wherein each of the end plate segments and the at least one middle plate segment include a top wall and an opposed bottom wall, wherein the first and second end plate segments and the at least one middle plate segment are each spaced apart and oriented in a longitudinal direction to support the crankshaft to reciprocate the plurality of plunger assemblies in the longitudinal direction at least partially within the adjacently positioned fluid end; and
at least one foot extending from each of the end plate segments and the at least one middle plate segment for supporting the power end frame assembly on the support surface, the at least one foot extending in a direction away from the plurality of plunger assemblies toward the support surface configured to support the power end frame assembly on the support surface.

9. The reciprocating pump of claim 8, wherein the at least one foot on each of the end plate segments and the at least one middle plate segment are integrally formed with the first and second end plate segments and the at least one middle plate segment.

10. The reciprocating pump of claim 8, wherein the at least one middle plate segment includes only one foot extending from the middle plate bottom wall.

11. The reciprocating pump of claim 8, wherein each end plate segment includes two feet extending from the bottom wall of each of the end plate segments.

12. The reciprocating pump of claim 8, wherein the first and second end plate segments and the at least one middle plate segment each include an opening extending therethrough to support a crankshaft bearing assembly.

13. The reciprocating pump of claim 12, wherein the openings are coaxially aligned.

* * * * *